United States Patent [19]

Satoh et al.

[11] Patent Number: 5,729,708
[45] Date of Patent: Mar. 17, 1998

[54] PORTABLE DATA BUFFER APPARATUS WITH MANUALLY CONTROLLED RECEPTION/TRANSMISSION

[75] Inventors: Makoto Satoh, Tokyo; Takahiro Onsen, Kawasaki, both of Japan

[73] Assignee: Canon Kabushiki Kaisha, Tokyo, Japan

[21] Appl. No.: 218,831

[22] Filed: Mar. 28, 1994

Related U.S. Application Data

[63] Continuation of Ser. No. 622,011, Dec. 4, 1990, abandoned.

[30] Foreign Application Priority Data

| Dec. 4, 1989 | [JP] | Japan | 1-315065 |
| Dec. 4, 1989 | [JP] | Japan | 1-315066 |
| Dec. 4, 1989 | [JP] | Japan | 1-315067 |
| Dec. 4, 1989 | [JP] | Japan | 1-315068 |
| Dec. 4, 1989 | [JP] | Japan | 1-315069 |
| Dec. 4, 1989 | [JP] | Japan | 1-315070 |

[51] Int. Cl.[6] .............. G06F 3/00; G06F 13/00
[52] U.S. Cl. ..................... 395/250; 395/872
[58] Field of Search ................ 395/250, 275, 395/425; 364/200, 900

[56] References Cited

U.S. PATENT DOCUMENTS

| 2,913,705 | 11/1959 | Cox et al. | 395/250 |
| 3,427,595 | 2/1969 | Groth, Jr. | 395/872 |
| 3,798,614 | 3/1974 | Meadows et al. | 395/183.03 |
| 4,048,625 | 9/1977 | Harris, Jr. et al. | 364/900 |
| 4,062,059 | 12/1977 | Suzuki et al. | 364/200 |
| 4,131,940 | 12/1978 | Moyer et al. | 364/200 |
| 4,138,732 | 2/1979 | Suzuki et al. | 364/200 |
| 4,145,755 | 3/1979 | Suzuki et al. | 364/900 |
| 4,176,400 | 11/1979 | Heckel | 395/250 |
| 4,258,418 | 3/1981 | Heath | 364/200 |
| 4,285,038 | 8/1981 | Suzuki et al. | 364/200 |
| 4,378,588 | 3/1983 | Katzman et al. | 364/200 |
| 4,458,316 | 7/1984 | Fry et al. | 364/200 |
| 4,466,065 | 8/1984 | Advani et al. | 395/874 |
| 4,492,956 | 1/1985 | Collmeyer et al. | 340/723 |
| 4,616,338 | 10/1986 | Helen et al. | 364/900 |
| 4,766,534 | 8/1988 | DeBenedictis | 364/200 |
| 4,791,564 | 12/1988 | Takai | 364/200 |
| 4,839,791 | 6/1989 | Ito | 364/200 |
| 4,860,244 | 8/1989 | Bruckert et al. | 364/900 |
| 4,864,495 | 9/1989 | Inaba | 364/200 |
| 4,935,894 | 6/1990 | Ternes et al. | 364/900 |
| 4,942,553 | 7/1990 | Dalrymple et al. | 364/900 |
| 4,954,983 | 9/1990 | Klingman | 364/900 |
| 5,046,039 | 9/1991 | Ugajin et al. | 364/900 |
| 5,117,486 | 5/1992 | Clark et al. | 395/250 |
| 5,121,479 | 6/1992 | O'Brien | 395/250 |
| 5,127,088 | 6/1992 | Takaki | 395/275 |
| 5,155,810 | 10/1992 | McNamara et al. | 395/250 |
| 5,179,663 | 1/1993 | Iimura | 395/275 |
| 5,265,209 | 11/1993 | Kageyama et al. | 395/102 |

*Primary Examiner*—Christopher B. Shin
*Attorney, Agent, or Firm*—Fitzpatrick, Cella, Harper & Scinto

[57] ABSTRACT

Data buffer apparatus comprising two connectors directly fittable respectively with connectors of data transmitting apparatus and receiving apparatus, and accumulating means for accumulating data. In this buffer apparatus, the data buffer apparatus is capable of a function for accumulating data, entered from the data transmitting apparatus through the first connector in a state in which the connector the date transmitting apparatus is fitted with the first connector, in the accumulating means; and a function for transmitting data, accumulated in the accumulating means, to a data receiving apparatus in a state in which the connector of the date receiving apparatus is fitted with the second connector.

10 Claims, 60 Drawing Sheets

FIG. 5

| GENERAL SIGNAL NAMES | PORT TO COMPUTER | | | PORT TO PRINTER | | |
|---|---|---|---|---|---|---|
| | SIGNAL NAMES | INPUT/OUTPUT | NOTE | SIGNAL NAMES | INPUT/OUTPUT | NOTE |
| -STROBE | -STROBE_C | INPUT | PULL UP TO "H" ON NON-CONNECTION | -STROBE_P | OUTPUT | |
| DATA 0~DATA 7 | DATA 0~DATA 7_C | INPUT | PULL UP TO "H" ON NON-CONNECTION | DATA 0~DATA 7_P | OUTPUT | |
| -ACKNLG | -ACKNLG_C | OUTPUT | | -ACKNLG_P | INPUT | PULL UP TO "H" ON NON-CONNECTION |
| BUSY | BUSY_C | OUTPUT | | BUSY_P | INPUTT | PULL UP TO "H" ON NON-CONNECTION |
| PE | PE_C | OUTPUT | | PE_P | INPUTT | PULL UP TO "H" ON NON-CONNECTION |
| SLCT | SLCT_C | OUTPUT | "H" FIXED OUTPOT | SLCT_P | INPUTT | PULL UP TO "H" ON NON-CONNECTION |
| -ERROR | -ERROR_C | OUTPUT | | -ERROR_P | INPUTT | PULL UP TO "H" ON NON-CONNECTION |
| -INIT | -INIT_C | INPUT | RESET ON "L" DETECTION | -INIT_P | OUTPUT | OUTPUT ON TRANSMISSION START |
| -AUTOFEEDXT | -AUTOFEEDXT_C | INPUT | MONITOR/SAVE ON INITIALIZING | -AUTOFEEDXT_P | OUTPUT | OUTPUT ON TRANSMISSION START |
| -SLCTIN | -SLCTIN_C | INPUT | MONITOR/SAVE ON INITIALIZING | -SLCTIN_P | OUTPUT | OUTPUT ON TRANSMISSION START |

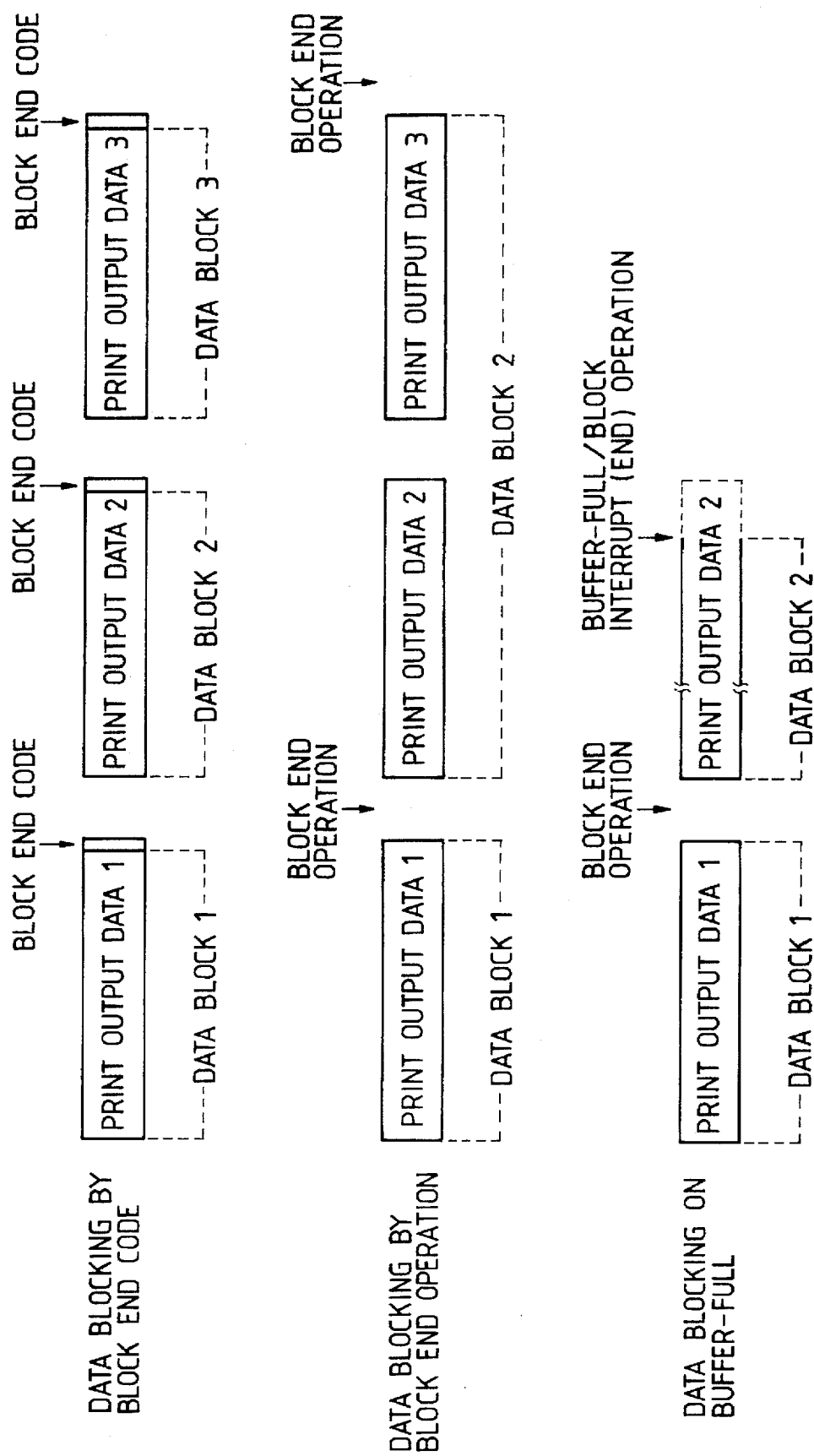

ENVIRONMENT TABLE

| Offset | Field |
|---|---|
| +0 | RBLOCKI |
| +1 | TBLOCKI |
| +2 | RBLOCKS |
| +3 | TBLOCKS |
| +4 | UMEM |
| +7 | RREM |
| +10 | TBLOCKSIZ |
| +13 | TSIZ |
| +16 | TREM |
| +19 | STATE |
| +20 | |

| STATE | 7 · · · 2 | 1 | 0 |
|---|---|---|---|
| | undefined | AFDXT | SLIN |

FIG. 12

RECEPTION ORDER TABLE

| Offset | Entry |
|---|---|
| +140 | RBLOCKSEQ [1] |
| +141 | RBLOCKSEQ [2] |
| +142 | RBLOCKSEQ [3] |
| +143 | ⋮ |
| +140+(i-1) | RBLOCKSEQ [i] |
| +140+i | ⋮ |
| +158 | RBLOCKSEQ [19] |
| +159 | RBLOCKSEQ [20] |
| +160 | |

FIG. 13

TRANSMISSION ORDER TABLE

| Offset | Field |
|---|---|
| +160 | TBLOCKSEQ [1] |
| +161 | TBLOCKSEQ [2] |
| +162 | TBLOCKSEQ [3] |
| +163 | ⋮ |
| +160+(i-1) | TBLOCKSEQ [i] |
| +160+i | ⋮ |
| +178 | TBLOCKSEQ [19] |
| +179 | TBLOCKSEQ [20] |
| +180 | |

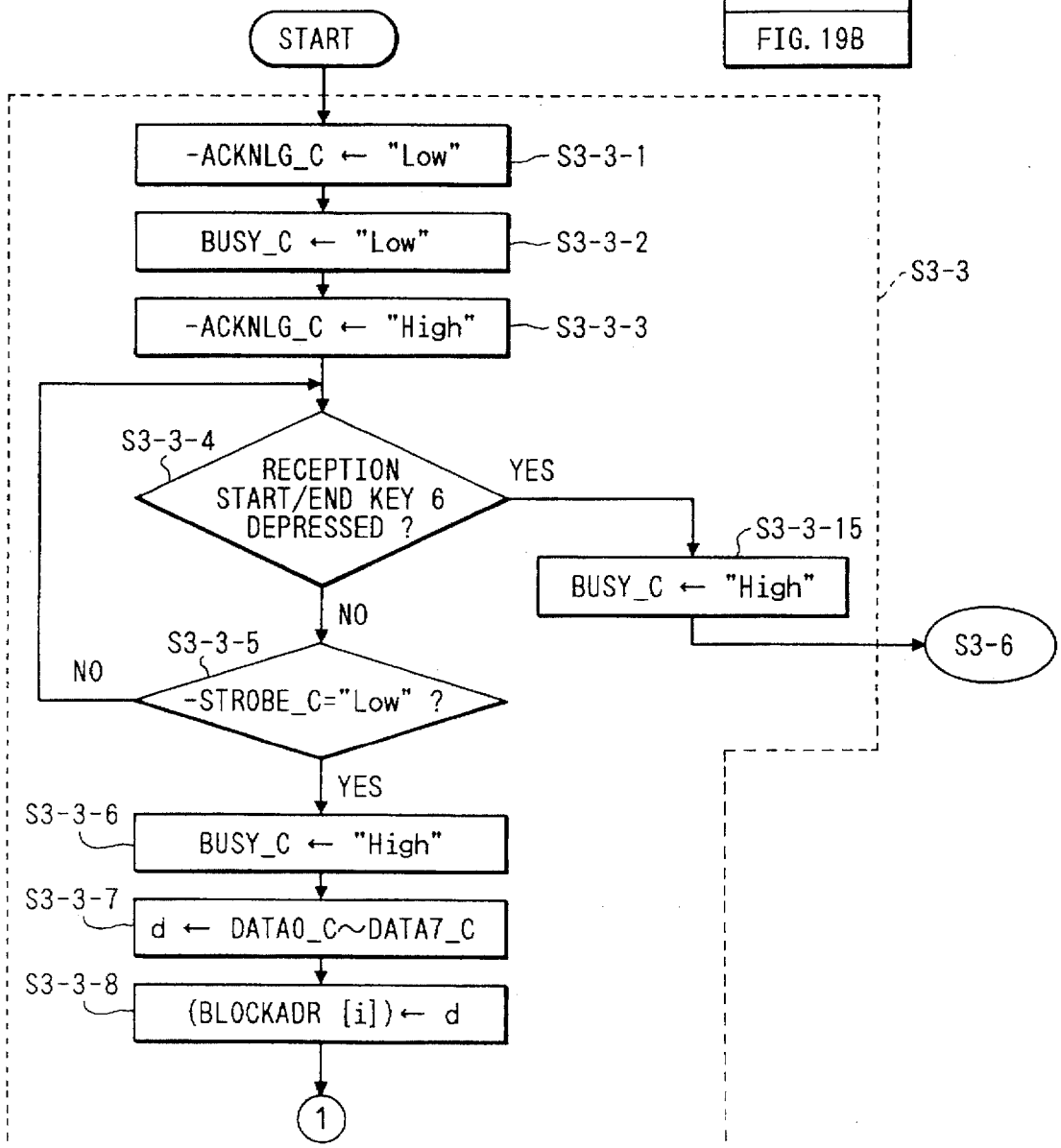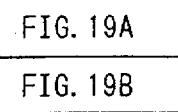

| FIG. 20A |
| FIG. 20B |

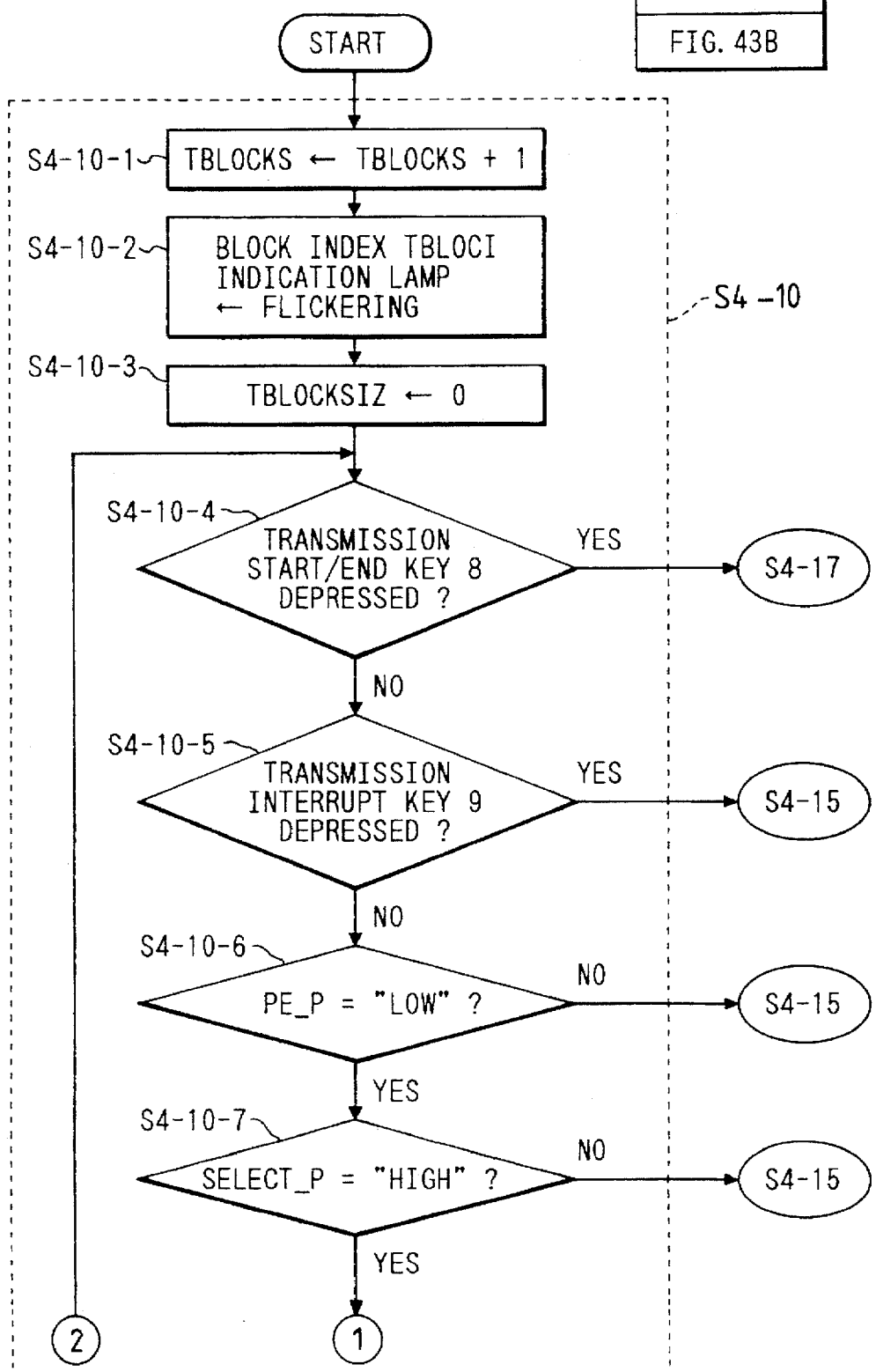

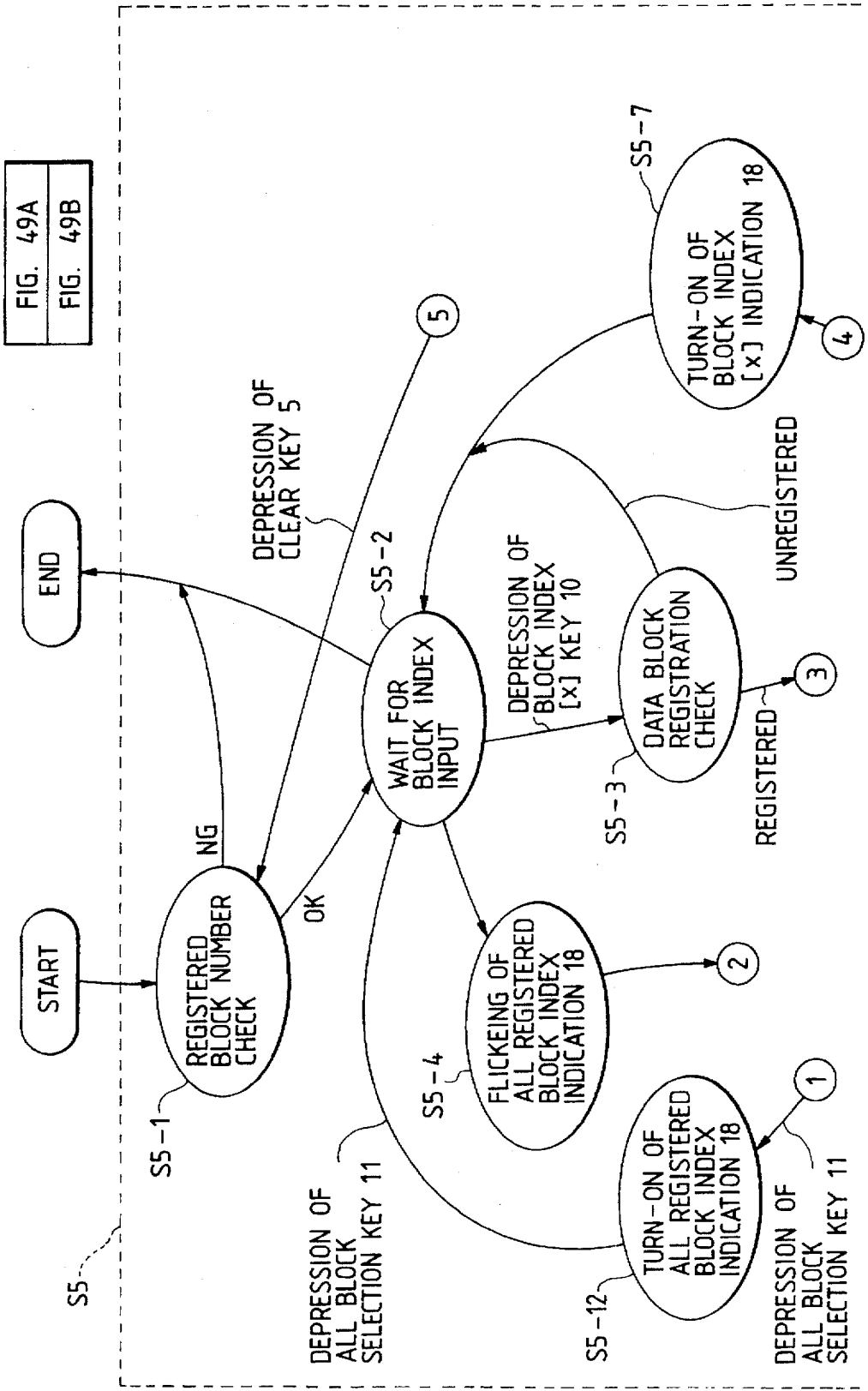

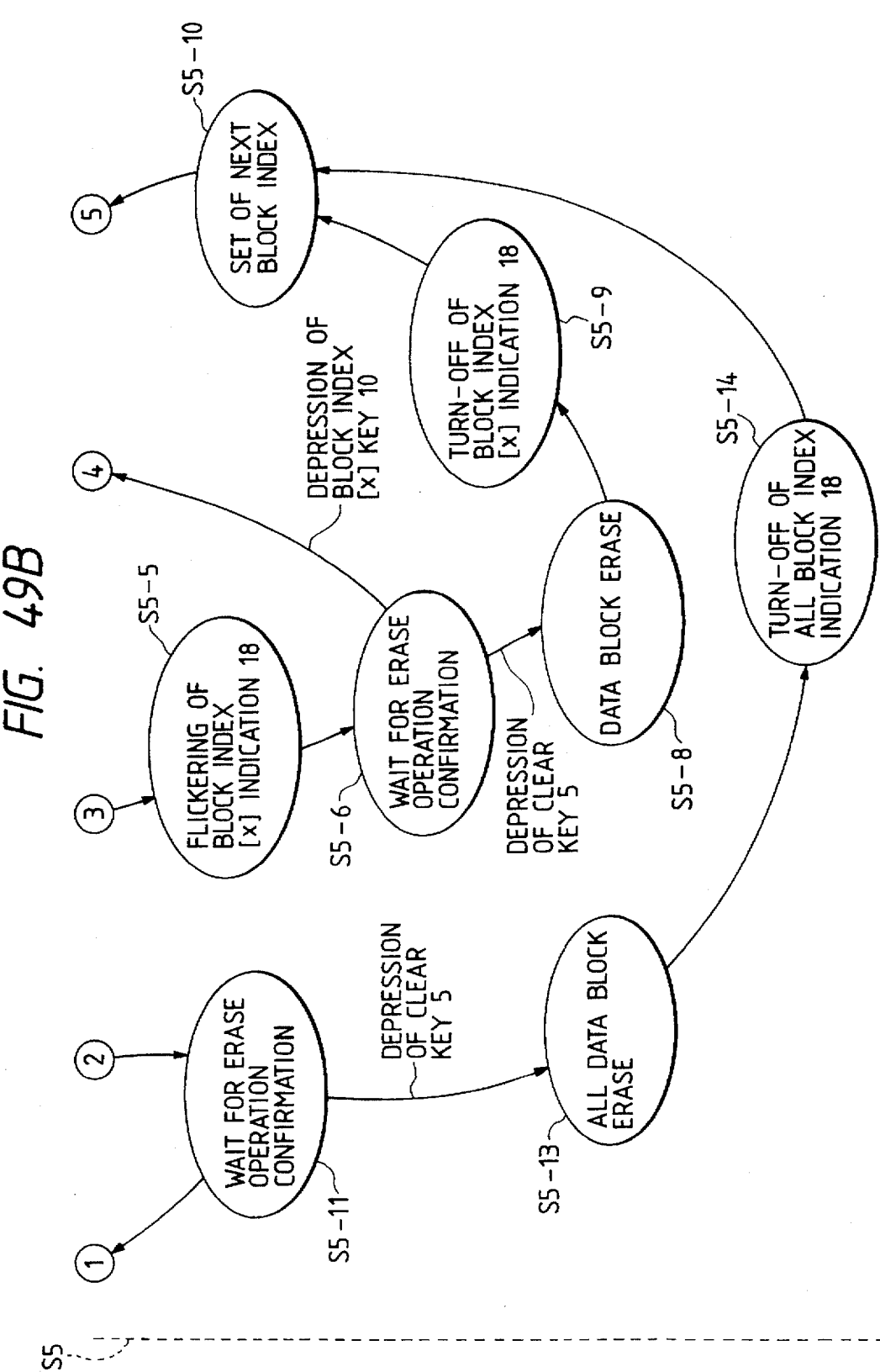

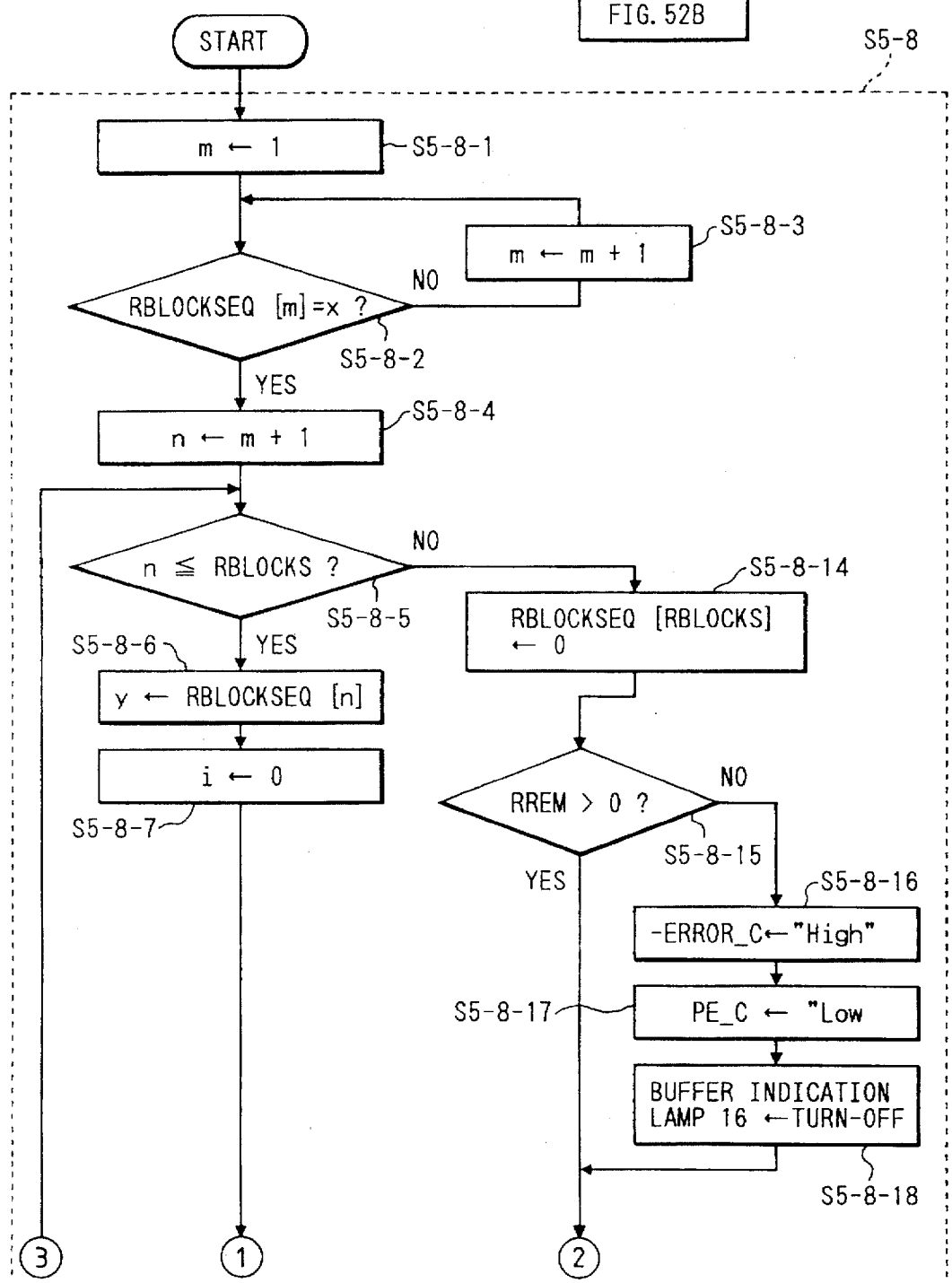

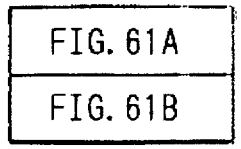
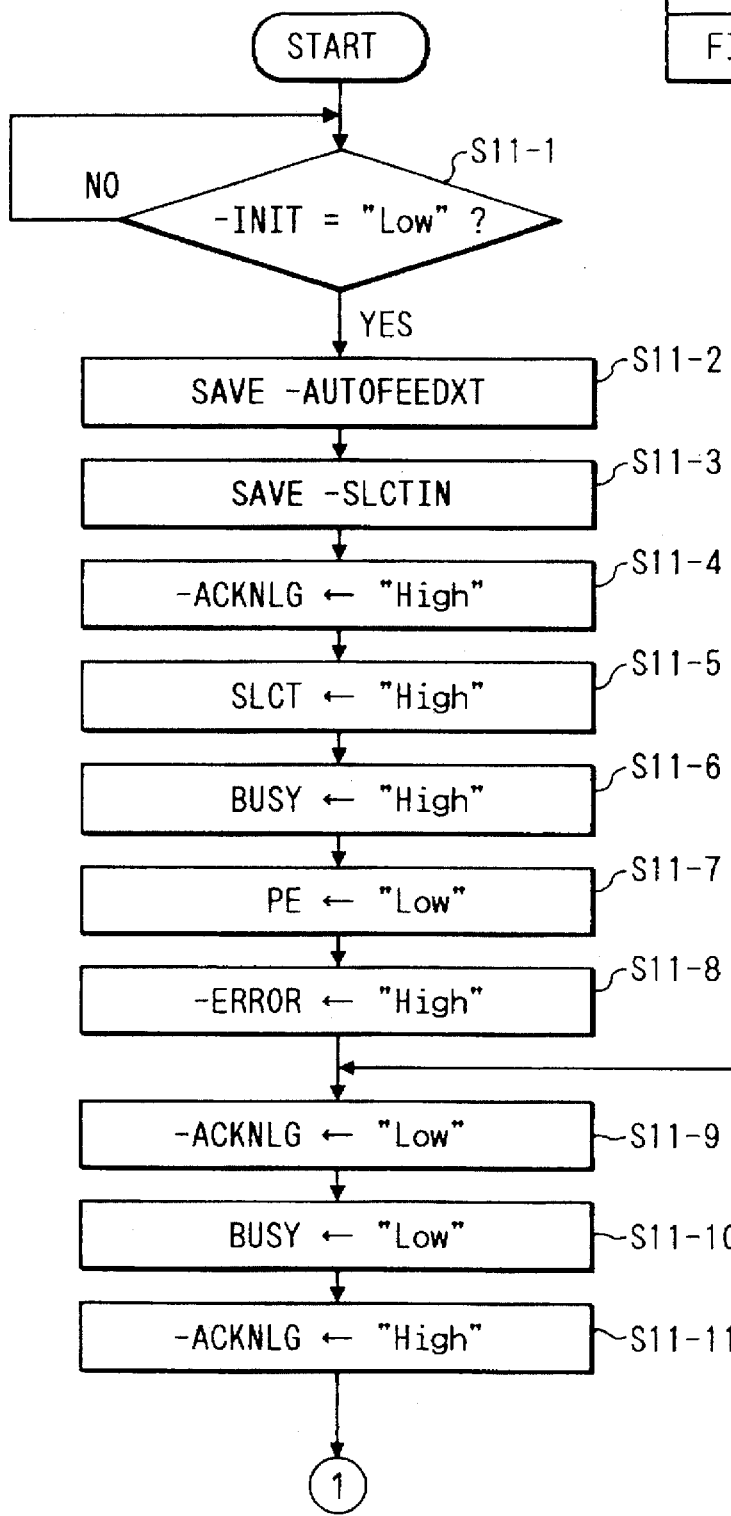
FIG. 61A dd
PORTABLE DATA BUFFER APPARATUS WITH MANUALLY CONTROLLED RECEPTION/TRANSMISSION This application is a continuation of application Ser. No. 07/622,011 filed Dec. 4, 1990 abandoned.

BACKGROUND OF THE INVENTION

1. Field of the Invention

The present invention relates to a data buffer apparatus provided between a data transmitting apparatus such as a computer and a data receiving apparatus such as a printer, for the purpose of achieving efficient transmission and reception of a large quantity of data.

2. Related Background Art

FIG. 58 shows general signal lines for data communication between a computer and a printer, wherein signal lines DATA0–DATA7 transmit bit information constituting parallel byte data transmitted from the computer to the printer. A control signal line -STROBE from the computer to the printer indicates, in the "Low" (assert) state, presence of effective data on the above-mentioned signal lines DATA0–DATA7. A control signal line -ACKNLG from the printer to the computer indicates, in the "Low" (assert) state, that the printer has completed the process of receiving byte data and is ready to receive next byte data. A line for a control signal BUSY from the printer indicates that it is incapable of receiving the byte data in the "High" (assert) state, or capable of receiving the byte data in the "Low" (negate) state. A line for a control signal SLCT from the printer indicates, in the "High" (assert) state, that the printer is in the selected state. A line for a control signal -ERROR from the printer indicates, in the "Low" (assert) state, that the printer is in an error state. A line for a control signal PE from the printer indicates, in the "High" (assert) state while said -ERROR signal line is in the assert state, that the printer is in a paper empty state. A line for a control signal -INIT from the computer to the printer is used for initializing the printer in the "Low" (assert) state. A line for a control signal -AUTOFEEDXT from the computer to the printer causes, in the "Low" (assert) state, the printer to automatically effect a line feeding operation in response to the reception of a carriage return code. However said signal line -AUTOFEEDXT is monitored only in the initial state of the printer. Also a line for a control signal -SLCTIN from the computer is monitored only in the initial state of the printer, and, in the "Low" (assert) state, the printer disregards a DC1 or DC3 control code.

In the following there will be explained a general flow of transmission and reception of print output data utilizing the signal lines shown in FIG. 58. FIG. 59 is a timing chart of principal signal lines. FIG. 60 is a flow chart of transmission of print output data by the computer. At first in a step S10-1, the -STROBE signal line is set in the "High" state to indicate that the transmission is not currently conducted. Then steps S10-2 and S10-3 set the signal lines -AUTOFEEDXT and -SLCTIN in the "High" or "Low" state, and steps S10-4 and S10-5 send a "Low" state pulse to the -INIT signal line to initialize the printer. Subsequently steps S10-6, S10-7 and S10-8 respectively confirm that the printer is in the selected state, that the printer is not in the error state and that the printer is capable of reception, and a step S10-9 sends byte data constituting the print output data to the signal lines DATA0–DATA7. Then steps S10-10 and S10-11 send a "Low" state pulse to the -STROBE signal line to inform the printer of the transmission of the byte data. In a next step S10-12, the computer monitors the -ACKNLG signal line, and identifies the completion of transmission of a set of byte data when the "Low" (assert) state is found. Then a step S10-13 discriminates whether all the byte data constituting the print output data have been transmitted, and, if not, the sequence returns to the step S10-6 to repeat the transmission of the byte data.

The reception of the print output data by the printer is conducted according to a flow chart shown in FIG. 61. At first a step S11-1 awaits that the -INIT signal line reaches the "Low" (assert) state, and, when said "Low" state is reached, steps S11-2 and S11-3 respectively save the states of the signal lines -AUTOFEEDXT and -SLCTIN. Subsequently a step S11-4 sets the -ACKNLG signal line in the "High" (negate) state; a step S11-5 sets the SLCT signal line in the "High" (assert) state; a step S11-6 sets the BUSY signal line in the "High" (assert) state; a step S11-7 sets the PE signal line in the "Low" (negate) state; and a step S11-8 sets the -ERROR signal line in the "High" (negate) state, thereby informing the computer that the printer is currently in the selected state, and is not in the error state but is incapable of reception. The reception of the byte data is conducted as follows. Steps S11-9 to S11-11 send a "Low" state pulse to the -ACKNLG signal line and sets the BUSY signal line in the "Low" (negate) state thereby indicating that the printer is capable of reception. Then a step S11-12 monitors the -STROBE signal from the computer, and, when it reaches the "Low" (assert) state, a step S11-13 sets the BUSY signal line in the "High" (assert) state to indicate that the printer is in the course of reception and is incapable of receiving the next byte data. Then a step S11-14 reads the byte data from the signal lines DATA0–DATA7 and effect an entry operation or a printing operation. Then, if a next step S11-15 identifies the absence of an error, the sequence returns to the step S11-9 to start the reception of next byte data. In the presence of an error, a step S11-16 sets the -ERROR signal line in the "Low" (assert) state, then if a step S11-17 detects the absence of paper, a step S11-18 sets the PE signal line in the "High" (assert) state, and the reception operation is terminated.

The conventional data buffer unit has been used as shown in FIG. 62, wherein shown are a computer 100 constituting a data transmitting apparatus; a printer buffer unit 101; a printer 102 constituting a data receiving apparatus; a cable 103 connecting the computer with the printer buffer unit; a cable 104 connecting the printer with the printer buffer unit; an commercial AC power supply 105; and an AC power supply cable 106.

As shown in FIG. 62, the conventional printer buffer unit 101 is connected between the computer 100 transmitting data and the printer 102 receiving data, through exclusive cables 103, 104, and has an exclusive AC power supply cable 106 for receiving the supply of commercial AC power.

In such connection system, the printer buffer unit 102 receives the output print data from the computer 100 through the cable 103, accumulates said data temporarily in an internal buffer, and sends said data to the printer 102 through the cable 104.

In these operations, the modes of transmission and reception of said output print data are identical with those of between ordinary computer and printer. More specifically, in the reception of the output print data from the computer constituting the data transmitting unit, the printer buffer unit emulates the receiving operations of such ordinary printer, and, in the transmission of the output print data to the printer constituting the data receiving apparatus, the printer buffer unit emulates the transmitting operations of such ordinary computer.

However, in the emulation of the operations of such ordinary printer, the "paper empty" state of the printer is emulated by the remaining capacity of the internal buffer of the printer buffer unit, and, the zero remaining capacity of said internal buffer represents the "paper empty" state.

In practice, the conventional printer buffer unit conducts the transmission reception of the output print data simultaneously, in a mode shown in FIG. 63. At first a step S63-1 discriminates the remaining capacity of the internal buffer, and, if the remaining capacity is zero, the sequence proceeds to a step S63-2 to shift the PE signal line to the "High" level state and then to a step S63-6. On the other hand, if the remaining capacity is not zero, a step S63-2 shifts the PE signal line to the "Low" level state, and a step S63-4 discriminates whether data have been transmitted from the computer. If data have been transmitted, a step S63-5 receives and accumulates said data in the internal buffer, and the sequence then proceeds to a step S63-6. The data reception is conducted by emulating the receiving operations of the above-mentioned ordinary printer.

Then the step S63-6 discriminates whether the printer is in a state capable of data reception. If not, the sequence returns to the step S63-1. If the printer is capable of data reception, the sequence proceeds to a step S63-7 to discriminate whether data are present in the internal buffer. If not, the sequence returns to the step S63-4. On the other hand, if data are present, the sequence proceeds to a step S63-8 for transmitting the output print data, received from the computer and accumulated, to the printer from the beginning of data in first-in-first out mode. The data transmission is conducted by emulating the transmitting operations of said ordinary computer. Then the sequence proceeds to a step S63-9 which erases the output print data, transmitted to the printer, from the internal buffer, thereby releasing said internal buffer for the next data to be received. Thereafter the sequence returns to the step S63-1 and the above-explained procedure is repeated.

The transmission and reception of output print data in the conventional printer buffer unit are conducted in the manner explained above.

However, such conventional printer buffer apparatus has been limited in location of installation by the length of cables, since it has to be constantly connected with the data transmitting computer and the data receiving printer through exclusive cables, and also with the AC power supply source with the power supply cable. Also, though there have been developed printer buffers designed to accommodate a situation of using a printer by plural computers, a situation of using plural printers by a computer, or a situation of using plural printers by plural computers, through suitable combination of the numbers of input and output ports, it is still not possible to connect the units in excess of the number of such ports.

Also in the conventional printer buffers, in the course of reception and accumulation of the output print data transmitted from the data transmitting computer, if the data receiving printer is in a state capable of data reception, the data accumulated in the printer buffer are immediately sent to said printer from the beginning of the data in the first-in-first-out mode. Consequently such printer buffer, not designed to control plural sets of output print data, for example plural files of data, in separate manner is unable to achieve highly sophisticated functions.

Furthermore, since the conventional printer buffer lacks means for receiving and accumulating the output print data from the computer by data blocking (dividing the data into a suitable output unit such as a file), the user is naturally unable to identify the block of the output print data currently received.

Furthermore, in order to interrupt the receiving operation of the printer buffer for the output print data transmitted from the computer, the printer has to be set at the "off-line" state, and the user has to go to the location of said printer.

Also in the conventional printer buffer, the output print data already received from the computer and stored in the printer buffer are not particularly distinguished from the data currently received from the computer. Consequently, even if the user identifies the output print data currently received from the computer as unnecessary, there is no method of erasing the unnecessary data only from the accumulating means of the printer buffer, and, the erasure can only be made by the resetting of the printer buffer which inevitably erases all the data in the accumulating means, including the unnecessary output print data.

Also the conventional printer buffer immediately transmits the "paper empty" error state of the printer to the computer, thereby inhibiting the data transmission therefrom, even if the receiving buffer still has an empty area.

Furthermore, the conventional printer buffer lacks means for erasing a data block, identified as unnecessary by the user, from the accumulating means and the erasure can only be made by resetting the printer buffer, thus erasing all the data in the accumulating means, including said unnecessary data. Also, even if certain means is provided for selectively erasing unnecessary output print data block, it is still not possible to effectively utilize the accumulating means, since the data therein cannot be rearranged after the erasure of the selected block.

Furthermore, there is not provided suitable means for preventing the transmission, to the printer, of the output print data which have been erroneously transmitted from the computer and are stored in the receiving buffer of the printer buffer. Consequently the user has to rely on an extremely inconvenient method of resetting the printer buffer after confirming the start of transmission of such unnecessary data to the printer.

Also the sequence of transmissions of the output print data to the printer has to be identical with that of the transmission from the computer, and the user is unable to alter said sequence at his will.

Besides the user is unable to identify the block of the output print data currently transmitted to the printer.

Furthermore, in the conventional printer buffer, the total number of bytes of the output print data received by the printer buffer from the computer is basically identical with that transmitted from the printer buffer to the printer. Consequently, the proportion of empty area of the receiving buffer, often indicated in the conventional printer buffers, corresponds to that of the output print data already transmitted to the printer.

On the other hand, in the data buffer apparatus of the present invention, the reception and accumulation of the output print data from the computer and the data transmission to the printer may be conducted totally independently in time, and the total amount of data transmitted to the printer does not necessarily coincide with that of data accumulated in the receiving buffer. Consequently the proportion of empty area of the receiving buffer at data reception and the proportion of data already transmitted in the data transmission have to be derived by different calculating processes.

Also in the conventional printer buffer, the output print data already transmitted to the printer are basically immediately erased from the receiving buffer. For this reason, if same output print data are to be printed twice on the printer, said data have to be transmitted twice from the computer to the printer buffer.

Furthermore, the conventional printer buffer is incapable of distinguishing the output print data currently transmitted to the printer from the data not yet transmitted and still accumulated in the receiving buffer. Thus, even when the user identifies the output print data currently transmitted from the print buffer to the printer as unnecessary, the user cannot effect so-called skipping operation, for interrupting the transmission of said unnecessary data and starting the transmission of next print data accumulated in the receiving buffer.

SUMMARY OF THE INVENTION

An object of the present invention is to provide a data buffer apparatus enabling data transfer between a data transmitting apparatus and a data receiving apparatus which are installed in mutually distant locations.

Another object of the present invention is to provide a data buffer apparatus capable of handling the data from the data transmitting apparatus in a block unit, and allowing the user to identify the data block currently in reception.

Still another object of the present invention is to provide a data buffer apparatus capable of easily interrupting and restarting the data reception, and providing improved operability.

Still another object of the present invention is to provide a data buffer apparatus allowing to erase only unnecessary data in the accumulating means, thereby improving the convenience of use.

Still another object of the present invention is to provide a data buffer apparatus capable of receiving and accumulating data from the data transmitting apparatus as long as an empty area is available in the accumulating means of said data buffer apparatus, regardless of the state of the data receiving apparatus.

Still another object of the present invention is to provide a data buffer apparatus capable of erasing only the data of a block which has not been completely accumulated, for example when an empty area is no longer available in the accumulating means of said data buffer apparatus.

Still another object of the present invention is to provide a data buffer apparatus capable of identifying registered blocks, selectively erasing unnecessary blocks therein, and effectively utilizing the accumulating means without waste.

Still another object of the present invention is to provide a data buffer apparatus capable of transmitting data of desired blocks among the accumulated data.

Still another object of the present invention is to provide a data buffer apparatus capable of interrupting the transmission of unnecessary data and transmitting the necessary data only.

The foregoing and still other objects of the present invention, and the advantages thereof, will becomes fully apparent from the following detailed description which is to be taken in conjunction with the attached drawings.

BRIEF DESCRIPTION OF THE DRAWINGS

FIG. 5 is a table showing data and control signals in the ports of the printer buffer of said embodiment;

FIG. 6 is a view showing the concept of data block in the printer buffer of said embodiment;

FIG. 12 is a view showing the structure of a reception order table shown in FIG. 8;

FIG. 13 is a view showing the structure of a transmission order table shown in FIG. 8;

FIGS. 17 and 17A–17C are a schematic flow chart of the control sequence in a reception operation of a step S3 in FIG. 14;

FIGS. 19 and 19A–19B are a flow chart of the control sequence in a step S3-3 for starting byte reception in FIG. 17;

FIGS. 34 and 34A-34B are a schematic flow chart of the control sequence in a transmission step S4 in FIG. 14;

FIGS. 43 and 43A-43B are a flow chart of the control sequence of a step S4-10 for data block transmission in FIG. 34;

FIGS. 49 and 49A-49B are a schematic flow chart of a data block selective clearing step S5 in FIG. 14;

FIGS. 52 and 52A-52B are flow chart of the control sequence of a step S5-6 for data block erasure in FIG. 49;

FIGS. 61 and 61A-61B is a flow chart of reception of output print data by a printer, for data transfer between ordinary computer and printer;

DETAILED DESCRIPTION OF THE PREFERRED EMBODIMENTS (I) FIGS. 1 to 57 show an embodiment of the present invention.

FIGS. 1 and 2 are respectively an external view and a plan view of a printer buffer constituting an embodiment of the present invention, wherein shown are a main body 1 of the printer buffer; a connector 2 for the ports to printer; a connector 3 for the ports to computer; a reset button 4; a clear button 5; a reception start/end button 6; a reception interruption button 7; a transmission start/end button 8; a transmission interruption button 9; twenty block index buttons 10 numbered from "1" to "20"; an all-block selection button 11; a power supply indicator lamp 12; an in-reception indicator lamp 13; an in-transmission indicator lamp 14; a buffer empty status indicator lamp 15; a buffer full status indicator lamp 16; a remaining buffer capacity/untransmitted data capacity indicator lamp 17, capable of displaying integers from "0" to "100"; twenty block index indicator lamps 18, numbered from "1" to "20"; and a power switch 19.

FIG. 3 is a block diagram of the printer buffer of said embodiment, wherein a power supply unit 21 is composed for example of a battery and a regulator. There are also shown a power switch 19 connected to the power supply unit, for controlling the power supply to the system; a power supply indicator lamp 12 connected to power supply unit 21, for indicating the on/off state of power supply; a CPU 22 for controlling the functions of said printer buffer; a bus 23 connected to said CPU 22 for data transfer with various functions blocks to be explained later; a ROM 24 storing control programs to be executed by the CPU 22; a timer 25 for enabling the CPU 22 to measure the lapse of a predetermined time; ports 26 to printer, for the read/write operations by the CPU 22 on the data/control signal lines of the aforementioned connector 2; ports 27 to computer, for the read/write operations by the CPU 22 on the data/control signal lines of the aforementioned connector 3 and for notifying the CPU 22 of the active status of -INIT_C signal by a reset interruption signal line 28; and a reset interruption signal line 28 mentioned above.

Figure 1:
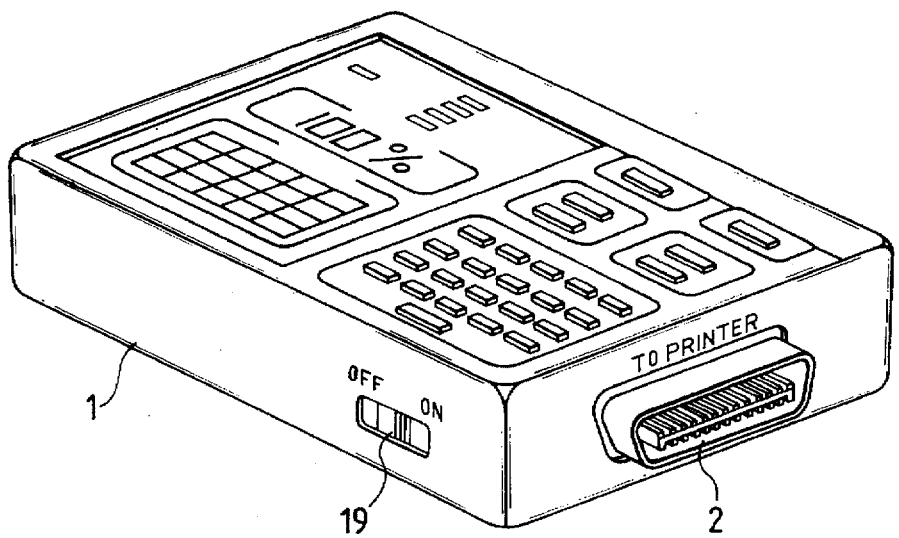
FIG. 1 is a perspective view of a printer buffer embodying the present invention.

An input panel 29 is equipped with the above-mentioned reset button 4, clear button 5, reception start/end button 6, reception interruption button 7, transmission start/end button 8, transmission interruption button 9, block index buttons 10 and all block selection button 11. An input port 30 enables the CPU 22 to read the operation status of each button (whether depressed or not) on said input panel 29, and notifies the CPU 22 of the depression of said reset button 4 through the reset interruption signal line 28. A display panel 31 is equipped with the aforementioned in-reception indicator lamp 13, in transmission indicator lamp 14, buffer empty status indicator lamp 15, buffer full status indicator lamp 16, remaining buffer/untransmitted data capacity indicator lamps 17 and block index indicator lamps 18. An output port 32 enables the CPU 22 to select the status of each lamp (on/flicker/off) on said display panel 31.

A main memory 33 is principally used as a receiving buffer for the output print data, and partly as a memory for a control parameter table to be explained later.

Figure 4:
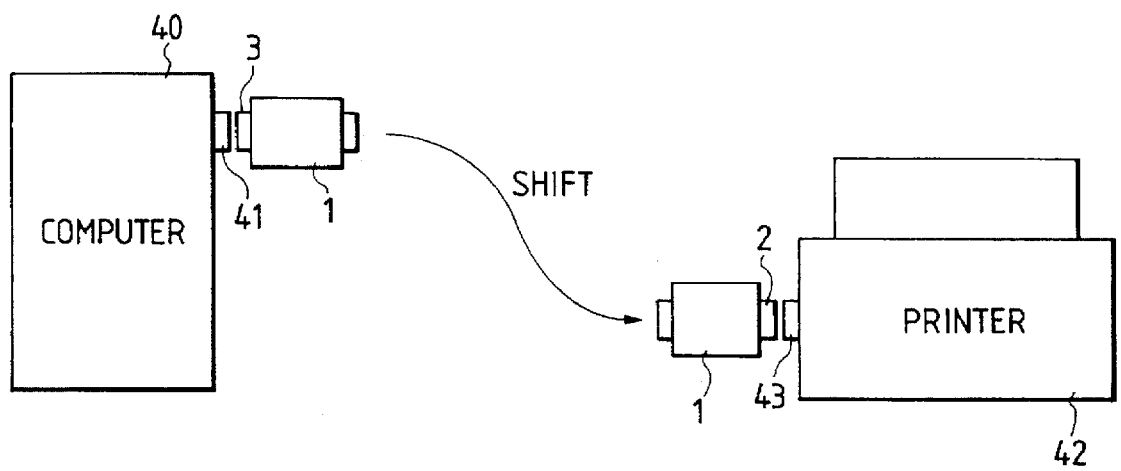
FIG. 4 is a schematic view showing the mode of use of the printer buffer of said embodiment.
Figure 2:
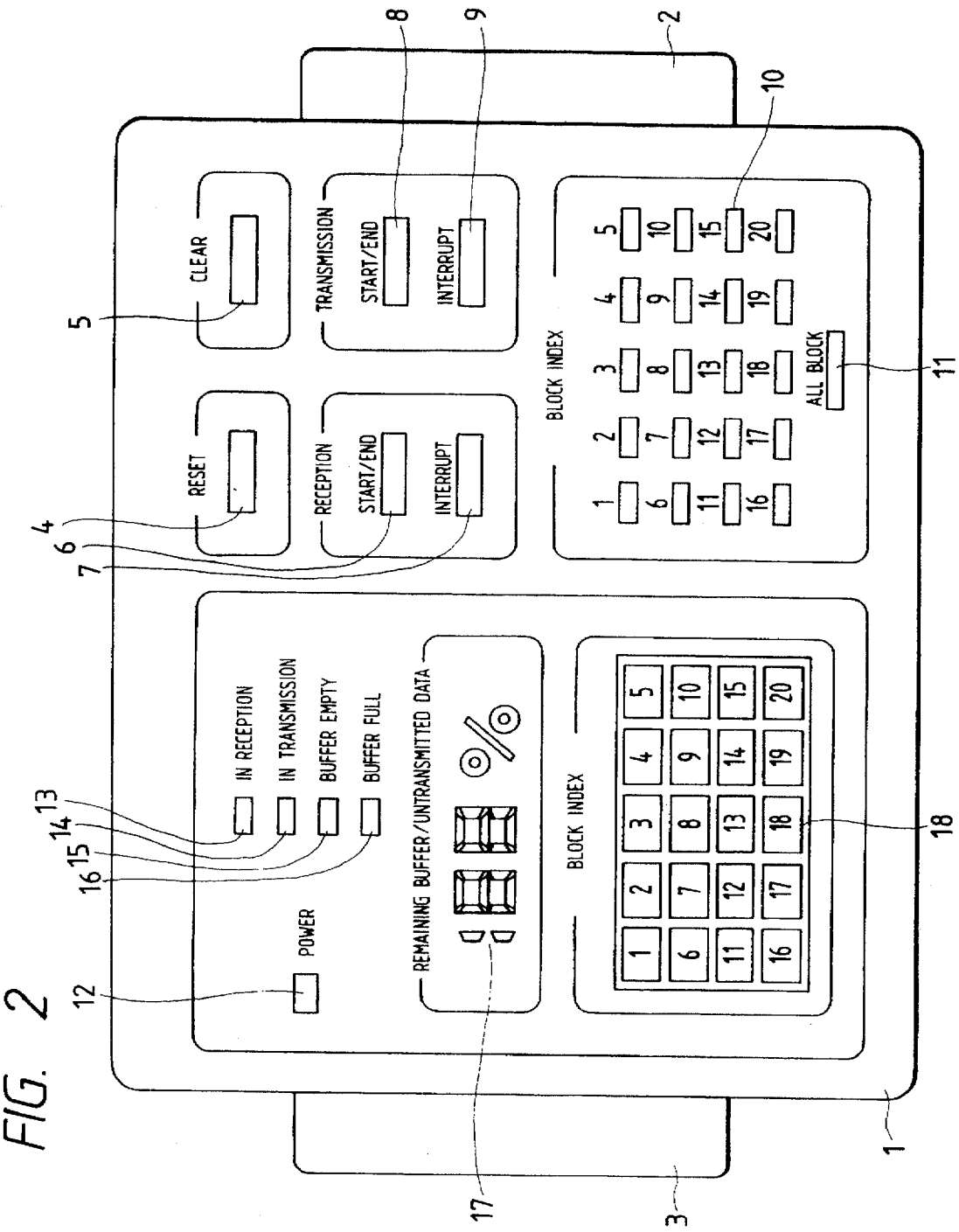
FIG. 2 is a plan view of the printer buffer of said embodiment.
Figure 3:
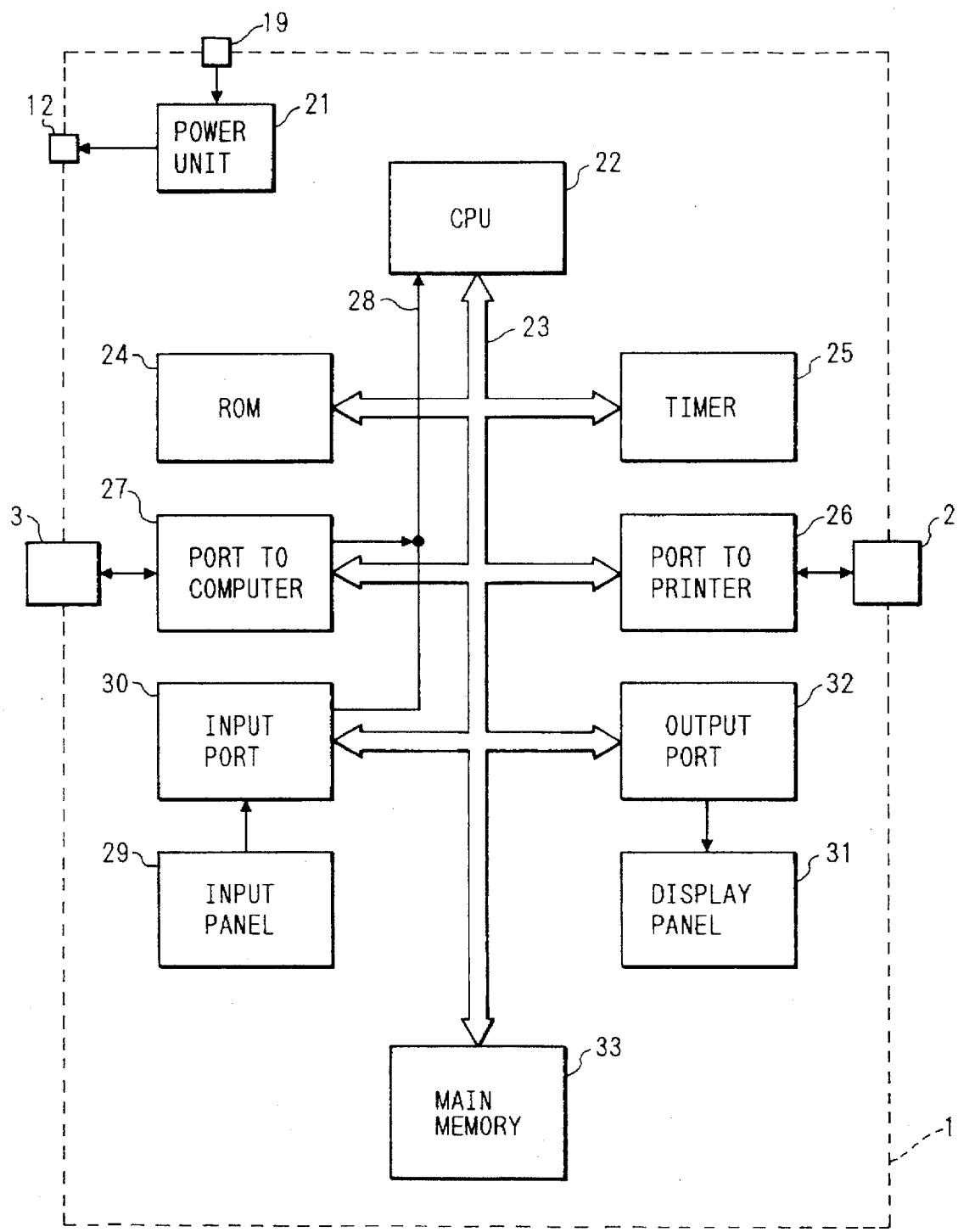
FIG. 3 is a block diagram of the printer buffer of said embodiment.

FIG. 4 illustrates the mode of use of the printer buffer 1 of the present embodiment.

The left-hand half in FIG. 4 shows the mode of use in the reception of the output print data from a computer serving adds a data transporting apparatus. A computer 40 transmitting said output print data is equipped with a printer port connector 41, to which the printer buffer 1 is connected through said connector 3 to computer ports. After the connection is made as explained above, the printer buffer 1 receives the output print data released from said computer 40.

The right-hand half in FIG. 4 shows the mode of use in the transmission of the output print data to a printer serving as a data receiving apparatus. A printer 42, for receiving said output print data and printing said data, is equipped with a computer port connector 43, to which the printer buffer 1 is connected through said connector 2 to printer ports. After the connection is made as explained above, the output print data which were received from the computer 40 and accumulated in the printer buffer 1 transmitted therefrom to said printer 42, for obtaining a printout therein.

FIG. 5 summarizes the arrangements of the data and control signal lines in the ports 2 to computer and the port 3 to printer, in the printer buffer of the present embodiment.

As will be apparent from this table, each port is electrically pulled up, so as to assume the "High" level state when not connected to the computer or the printer. Two control signal lines -AUTOFEEDXT_C and -SLCTIN_C in the ports to computer are only monitored at the initialization, and the obtained information are stored in the main memory 33.

A control signal line -INIT_C of the ports to computer is handled as a reset signal line. When a "Low" level state is entered from the computer, the aforementioned reset interruption signal line 28 is asserted to give a notice to the CPU 22, which then enters an initializing operation.

Among the output signal lines, a control signal line SLCT_C of the ports to computer is always maintained at the "High" level state. Three control signal lines -INIT_P, -AUTOFEEDXT_P and -SLCTIN_P of the ports to printer release signals only at the start of transmission operation.

FIG. 6 shows the concept of a data block in the printer buffer of the present embodiment.

The upper row shows the case of data blocking by a block end code, in which the output print data from the computer are terminated by a predetermined block end code. In such case the printer buffer identifies the end of a data block upon detection of such block end code. In such case, the blocks of data transmitted from the computer correspond completely to the data blocks controlled in the printer buffer.

The middle row shows the case of data blocking by a block ending operation. In this case the output print data transmitted from the computer are not terminated by the above-mentioned block end code, but a data block is terminated in the printer buffer by a predetermined block ending operation to be conducted by the user. As shown in the illustrated example, a data block controlled in the printer buffer may be composed of plural sets of output print data, so that the output print data may not correspond completely to the data blocks.

The lower row shows the case of data blocking in case the receiving buffer is full. In this case the printer buffer detects, in the course of reception of the output print data, that the receiving buffer for storing said data has become full, and terminates the data block by a predetermined block interrupting or ending operation to be conducted by the user.

In any of these cases, the data block serves as the unit of the output print data administered in the printer buffer.

Figure 7:
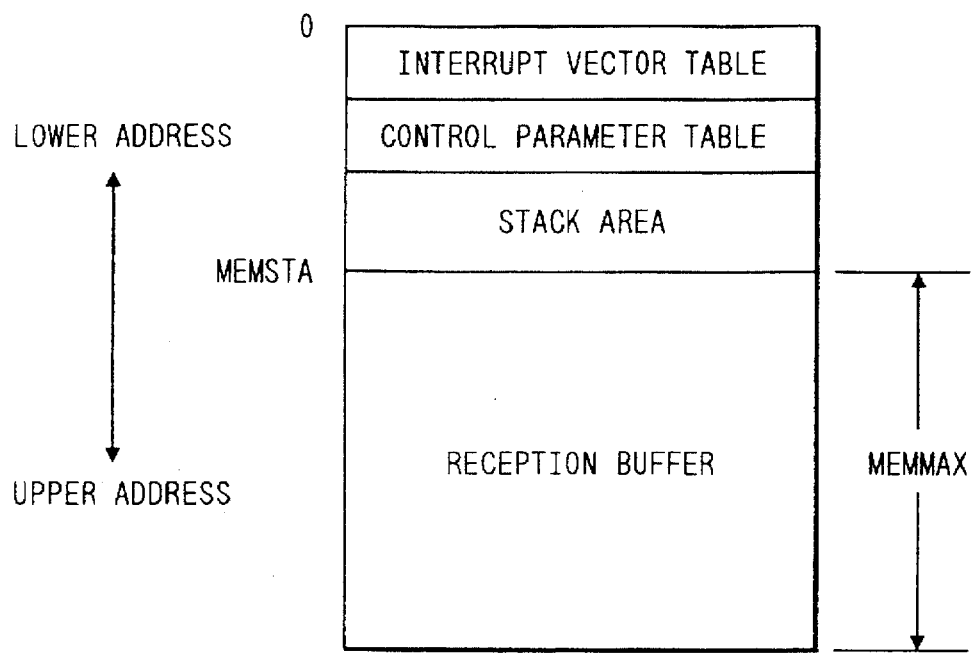
FIG. 7 is a view showing the structure of a main memory 33 in the printer buffer of said embodiment.

FIG. 7 illustrates the content of the above-mentioned main memory 33 in the printer buffer of the present embodiment.

In said main memory there are provided an interruption vector table for storing pointers for exceptional processes and external interruption service routines of the CPU; a control parameter table for storing various parameters required for the control of the printer buffer; a stack area for the CPU 22; and a reception buffer for storing the data blocks received by the printer buffer from the computer. For the purpose of convenience, the start address and the size (in number of bytes) thereof will be respectively indicated by MEMSTA and MEMMAX.

Figure 8:
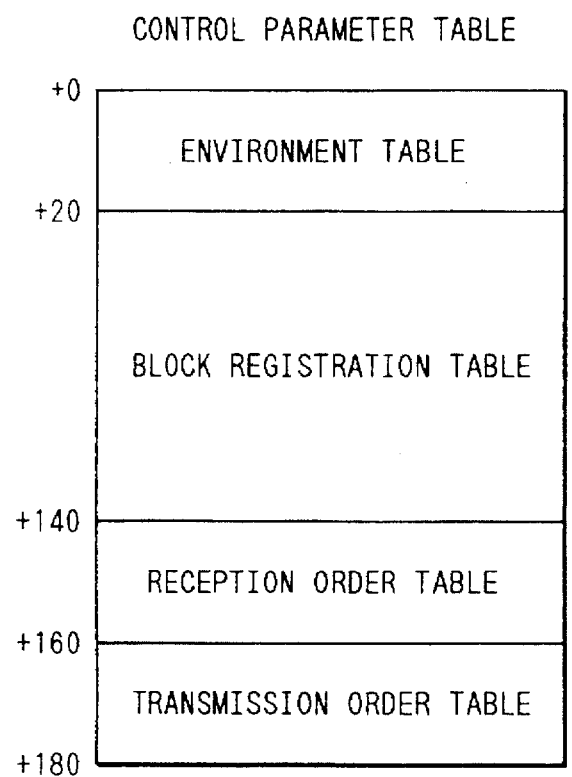
FIG. 8 is a view showing the structure of a control parameter table.

FIG. 8 schematically shows the structure of said control parameter table provided on said main memory 33. As shown in FIG. 8, the control parameter table consists of four areas, namely an environment table, a block registration table, a reception order table, and a transmission order table. The environment table is composed of parameters representing the environment of operations in the control of the printer buffer. The block registration table is composed of parameters of the individual data blocks which are received from the computer and registered. The reception order table is composed of parameters indicating the order of reception of the data blocks which are received from the computer and registered. The transmission order table is composed of parameters indicating the order of transmission of the data blocks to be transmitted to the printer.

Figures 9, 10:
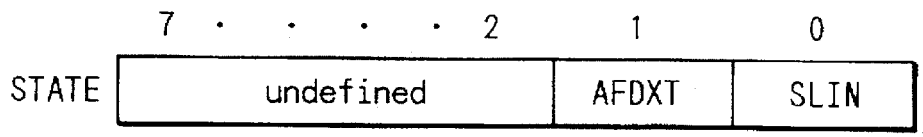
FIG. 9 is a view showing the structure of an environment table shown in FIG. 8.
FIG. 10 is a bit structure map of an initial state STATE in a control signal line of a port to computer.

FIG. 9 shows the details of said environment table shown in FIG. 8.

A 1-byte area RBLOCKI stores a block index to be given to a data block which is to be received next from the computer or is currently in reception, and can assume one of the values from "1" to "20". At the initialization, a default value "1" is stored therein.

A 1-byte area TBLOCKI stores a block index of a data block to be transmitted next to the printer or currently in transmission to the printer, and can assume one of the values from "1" to "20". At the initialization, a default value "1" is set therein.

A 1-byte area REBLOCKS stores the total number of data blocks already received and registered, and can assume one of the values from "0" to "20". A value "0" indicates that no data block has been registered, while a value "20" indicates that the number of registered data blocks has reached the maximum number of registrations. Said area is cleared to "0" at the initialization.

A 1-byte area TBLOCKS stores the total number of data blocks already transmitted to the printer since the start of transmission operation, including the block currently in transmission, and can assume one of the values from "0" to "20", but said value does not exceed the above-mentioned value RBLOCKS of registered blocks. Thus:

$$0 \geq TBLOCKS \geq RBLOCKS \geq 20.$$

A value "0" indicates that the transmission from the printer buffer to the printer has not been conducted. A value equal to that of the area RBLOCKS indicates that all the registered data blocks have been transmitted to the printer or the last data block is being transmitted to the printer. It is cleared to "0" at the initialization.

A 3-byte (24-bit) area UMEM stores the size (in number of bytes) of said reception buffer available for storage of the data blocks to be received by the printer buffer from the computer, and a value MEMMAX is set at the initialization.

A 3-byte (24-bit) area RREM stores the remaining memory capacity (in number of bytes) obtained by subtracting the number of bytes of the area storing the data blocks already received from the computer, from the total number of bytes of said reception buffer, and can assume any of the values from "0" to said size MEMMAX of the reception buffer. A value equal to MEMMAX indicates that the remaining buffer capacity is at maximum, namely the "buffer empty" state, while a value "0" indicates that the remaining buffer capacity is none, namely the "buffer full" state. The value MEMMAX is set at the initialization.

A 3-byte (24-bit) area TBLOCKSIZ stores the number of bytes of the data already transmitted to the printer in a data block currently in transmission, and can assume one of values from "0" to the size (in bytes) of said data block. A value "0" indicates that the transmission of said data block to the printer has not yet been conducted, while a value equal to the size of said data block indicates that the transmission thereof to the printer has been completed. Said area is cleared to "0" at the initialization.

A 3-byte (24-bit) area TSIZ stores the total sizes (in number of bytes) of all the data blocks to be transmitted to the printer. A value "0" indicates the absence of data blocks to be transmitted to the printer. Said area is cleared to "0" at the initialization.

A 3-byte (24-bit) area TREM stores the remaining memory capacity (in bytes), obtained by subtracting the number of bytes of the data already transmitted to the printer from the total byte number TSIZ of all the data blocks to be transmitted to the printer, and can assume one of the values from "0" to said total byte number TSIZ. A value equal to TSIZ indicates that no data have yet been transmitted since the start of transmission operation, while a value "0" indicates that all the data blocks to be transmitted have been transmitted. Said area is cleared to "0" at the initialization.

A 1-byte (8-bit) area STATE stores the status of control signal lines of the ports to computer, at the initialization.

FIG. 10 shows the bit structure of the area STATE representing the initial status of the control signal lines of said ports to computer.

A bit-0 SLIN represents the status of the control signal line -SLCTIN_C ("High" or "Low"), while a bit-1 AFDXT represents the status of the control signal line -AUTOFEEDXT_C ("High" or "Low"). Five bits from bit-7 to bit-2 are undefined and not used.

Figure 11:
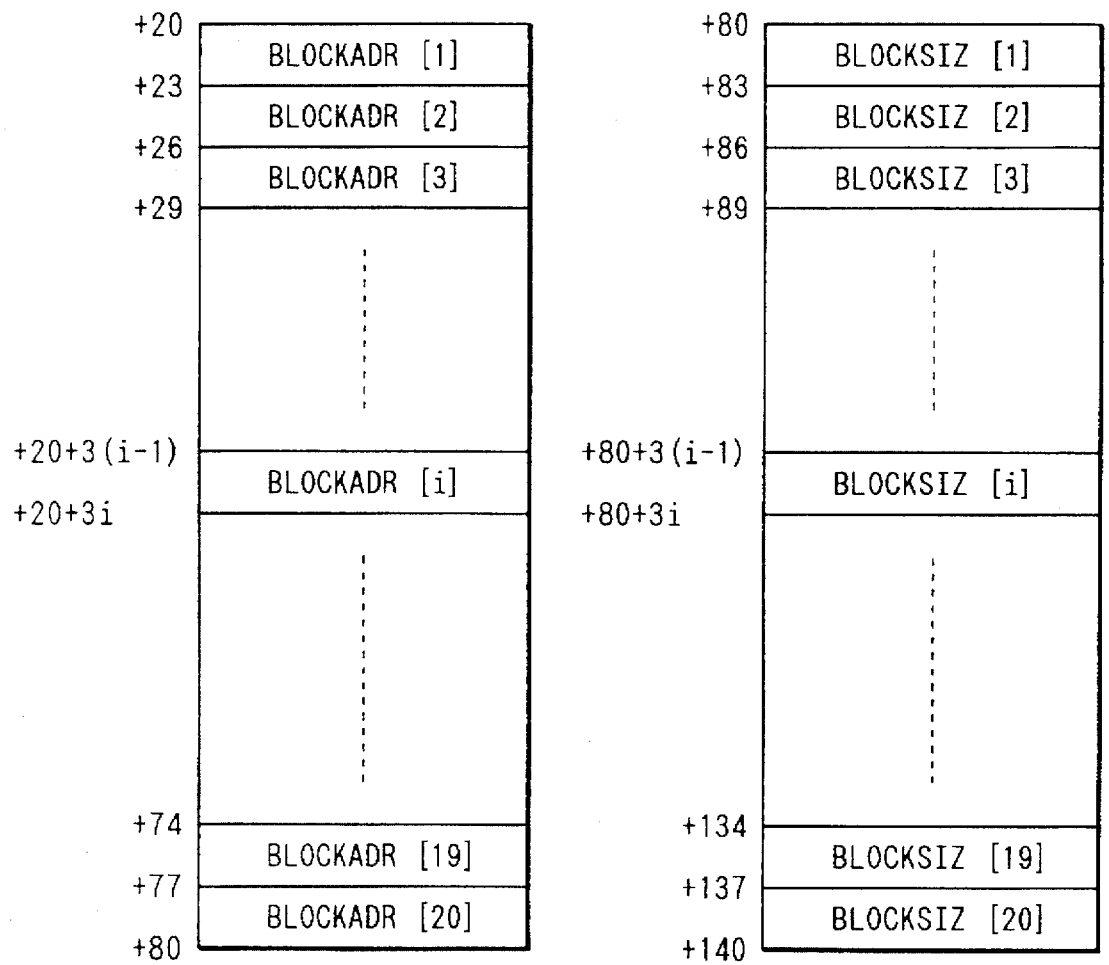
FIG. 11 is a view showing the structure of a block registration table shown in FIG. 8.

FIG. 11 shows the details of the block registration table shown in FIG. 8.

3-byte (24-bit) areas BLOCKADR [i] ($1 \leq i \leq 20$) respectively store start addresses, in the reception buffer, of the data blocks registered (or under reception from the computer) with block indexes i. 3-byte (24-bit) areas BLOCKSIZ [i] ($1 \leq i \leq 20$) store the sizes (in number of bytes) of said data blocks. At the initialization, the area BLOCKADR [1] stores the start address MEMSTA of said reception buffer as a default value, and the area BLOCKSIZ [1] is cleared to "0".

FIG. 12 shows the details of the reception order table shown in FIG. 8.

Each of 1-byte areas RBLOCKSEQ [m] ($1 \leq m \leq 20$) stores the block index of a data block received in the m-th order after the start of reception, and can assume one of the values from "1" to "20". For example, RBLOCKSEQ [3]=4 indicates that a data block received and registered as 3rd block has a block index 4. A value "0" indicates the absence of registered data blocks.

In view of representing the sequential order, said table is so controlled that effective data do not appear after an area of "0" when inspected sequentially from the area RBLOCKSEQ [1]. More specifically, if RBLOCKSEQ [N]$\neq$0 and RBLOCKSEQ [N+1]=0, all the succeeding area RBLOCKSEQ IN [N+2]=RBLOCKSEQ [N+3]= . . . =RBLOCKSEQ [20]=0. In this case the number of registered data blocks (value of RBLOCKS in the environment table) is N.

Also any non-zero value does not appear twice. At the initialization, all the areas arecleared to "0", namely:

RBLOCKSEQ [m]=0($1 \leq m \leq 20$).

FIG. 13 shows the details of the transmission order table shown in FIG. 8.

Each of 1-byte areas TBLOCKSEQ [m] ($1 \leq m \leq 20$) stores the block index of a data block to be transmitted at the m-th order after the start of transmission, and can assume one of the values from "1" to "20". For example, TBLOCKSEQ [3]=4 indicates that a data block to be transmitted in the 3rd order has a block index 4. A value "0" indicates the absence of data blocks to be transmitted.

In view of representing the sequential order, said table is so controlled that effective data do not appear after an area of "0" when inspected sequentially from the area TBLOCKSEQ [1]. More specifically, if TBLOCKSEQ IN [N]$\neq$0 and TBLOCKSEQ [N+1]=0, all the subsequent areas TBLOCKSEQ IN[+2]=TBLOCKSEQ [N+3]= . . . =TBLOCKSEQ [20]=0.

In this case the number of data blocks to be transmitted (value of TBLOCKS in the environment table) is N.

Also any non-zero value does not appear twice. At the initialization, all the areas are cleared to "0", namely:

TBLOCKSEQ [m]=0 ($1 \leq m \leq 20$).

(II) In the following there will be explained control sequences of the printer buffer of the above-explained embodiment, with reference to FIGS. 14 to 57.

Figure 14:
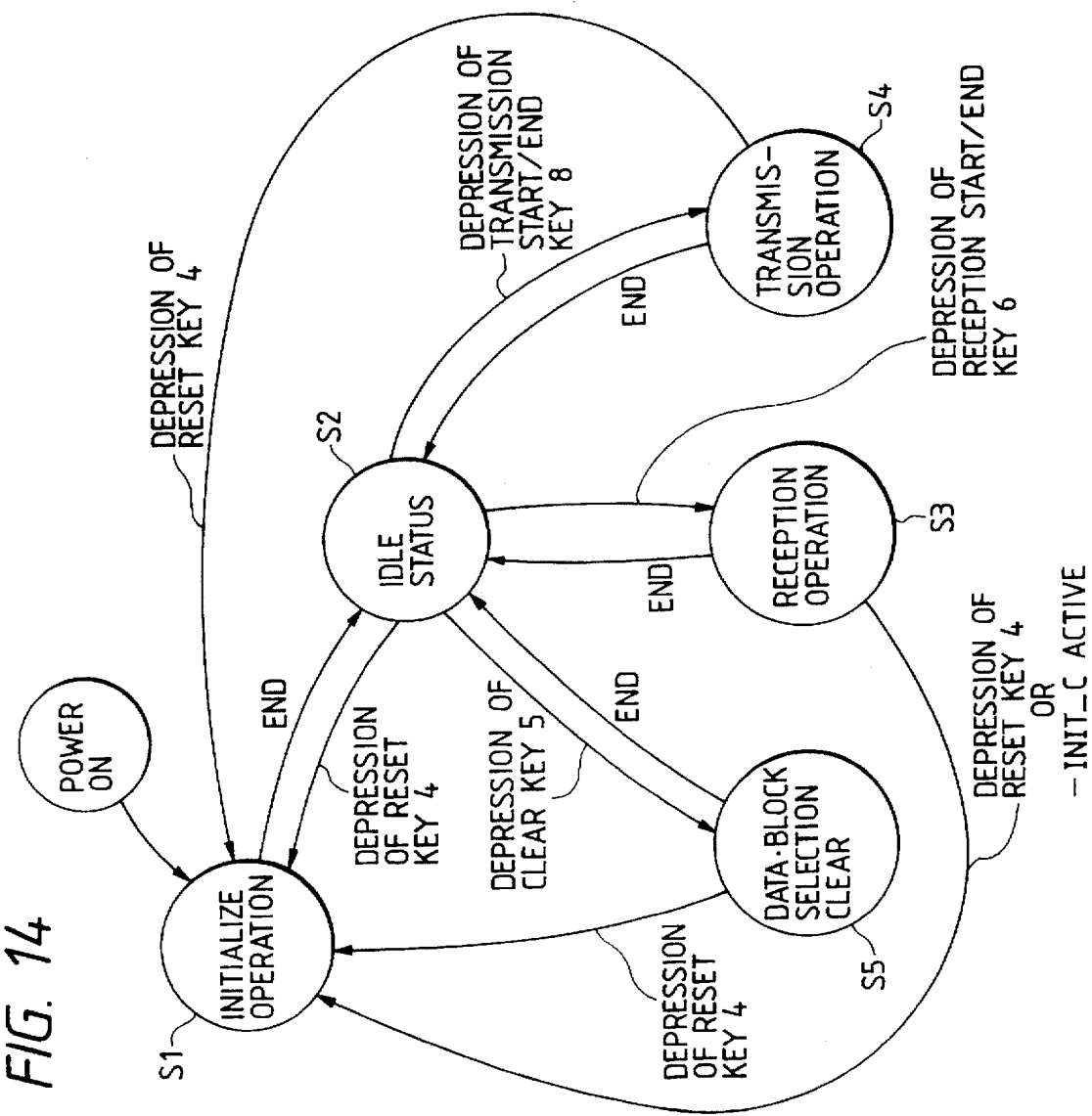
FIG. 14 is a schematic view of the flow of control in the printer buffer of the present embodiment.

FIG. 14 shows the outline of the control sequence of the printer buffer of the present embodiment.

As shown in FIG. 14, if the power supply is turned on, or if the reset button 4 is depressed in the course of any operation or if the control signal line -INIT_C of the ports to computer is activated in the course of reception, the control sequence of said printer buffer immediately moves to a step S1 to effect an initializing operation. After said initialization, the sequence proceeds to a step S2 to enter an idle status awaiting an instruction. If the reception start/end button 5 is depressed in this state, the sequence proceeds to a step S3 to initiate the reception operation. Also if said transmission start/end button 6 is depressed in the state of the step S2, the sequence proceeds to a step S4 to initiate the transmission operation. Also if the clear button 5 is depressed in said state, the sequence proceeds to a step S5 to initiate the selective clearing operation of data blocks. After the operation in said step S3, S4 or S5, the sequence returns to the idle status in the step S2 and awaits a next instruction.

Figure 15:
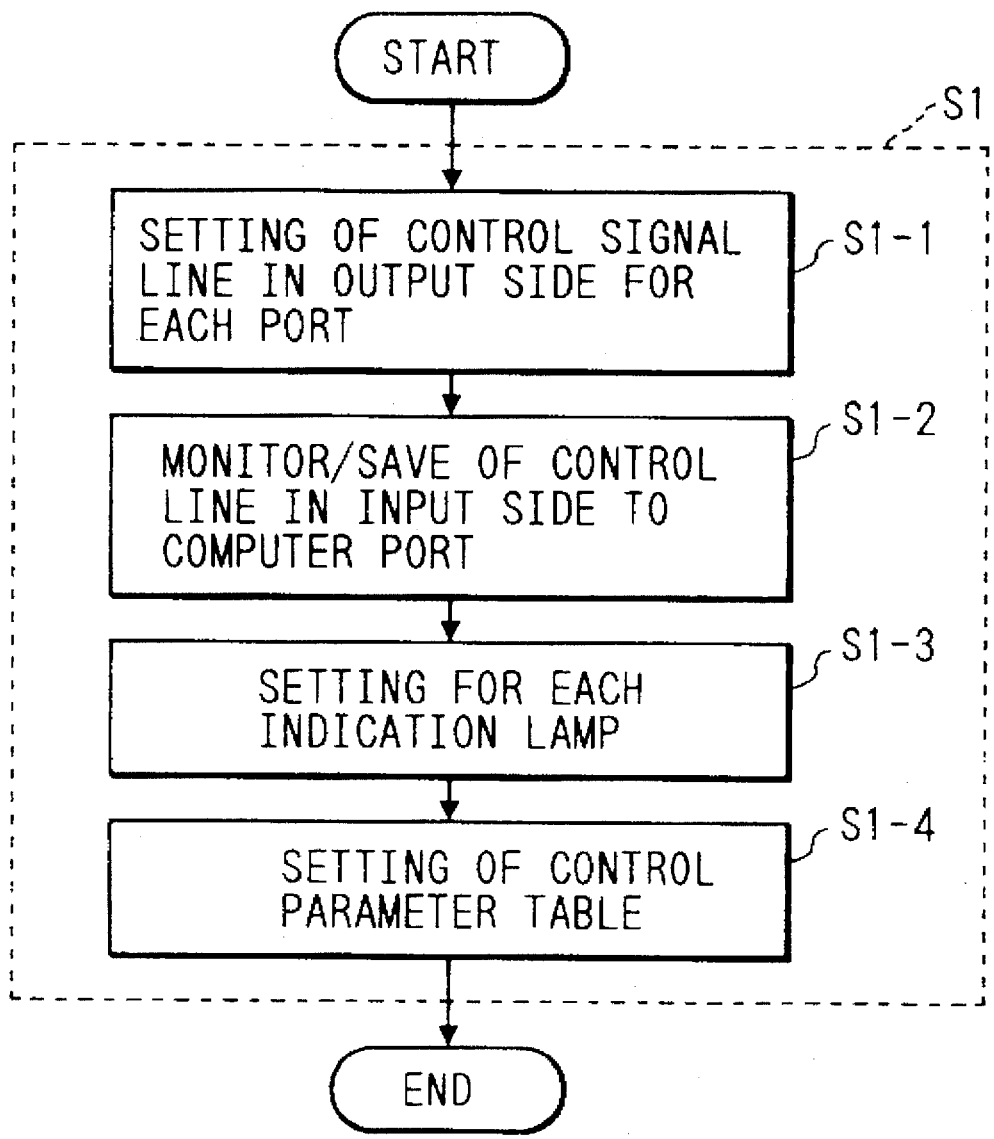
FIG. 15 is a flow chart of the control sequence in an initializing operation of a step S1 shown in FIG. 14.

FIG. 15 is a schematic flow chart of the control sequence of the initialization in the step S1 shown in FIG. 14. At first a step S1-1 sets the outputs of control signal output lines of the ports to computer and the ports 26 to printer in the following manner:

| (1) Control signal lines of ports to computer: | |
|---|---|
| -ACKNLG_C | ← "High" |
| BUSY_C | ← "Low" |
| PE_C | ← "High" |
| -ERROR_C | ← "High" |

| (2) Control signal lines of ports to printer: | |
|---|---|
| -STROBE_P | ← "High" |
| -INIT_P | ← "High" |
| -AUTOFEEDXT_P | ← "High" |
| -SLCTIN_P | ← "High" |

The setting (1) of the control signal lines of the ports to computer indicates that the printer buffer is not in the "paper empty" status, but it is in the "busy" status by the "High" level state of the BUSY_C signal line. On the other hand, the setting (2) of the control signal lines of the ports to printer indicates that the printer buffer is not transmitting the output print data.

Then a step S1-2 reads the status ("High" or "Low") of the input control signal lines -AUTOFEEDXT_C and -SLCTIN_C of the ports 27 to computer, and stores the obtained information in the area STATE in the aforementioned environment table (FIG. 9). This operation can be represented as:

| AFDXT ← -AUTOFEEDXT_C |
|---|
| SLIN ← -SLIN_C |

A next step S1-3 sets the status ("on", "flicker" or "off") of the indicator lamps on the display panel 31 in the following manner:

| in-reception indicator lamp 13 | ← "off" |
|---|---|
| in-transmission indicator lamp 14 | ← "off" |
| buffer empty indicator lamp 15 | ← "on" |
| buffer full indicator lamp 16 | ← "off" |
| remaining buffer/untransmitted data capacity indicator lamp 17 | ← "100%" |
| block index indicator lamps 18 | ← all "off". |

The above-explained display status tells the user that neither transmission nor reception is currently in progress and that the reception buffer is empty.

A next step S1-4 initializes the control parameter table (FIG. 8) in the following manner:

| (1) Environment table (FIG. 9) | |
|---|---|
| RBLOCKI | ← "1" |
| TBLOCKI | ← "1" |
| RBLOCKS | ← "0" |
| TBLOCKS | ← "0" |
| UMEM | ← "MEMMAX" |
| RREM | ← "MEMMAX" |
| TBLOCKSIZ | ← "0" |
| TSIZ | ← "0" |
| TREM | ← "0" |

| (2) Block registration table (FIG. 11) | |
|---|---|
| BLOCKADR [1] | ← "MEMSTA" |
| BLOCKADR [2]-[20] | ← "0" |

-continued

| (3) Reception order table (FIG. 12) | |
|---|---|
| RBLOCKSEQ [1]-[20] | ← "0" |

| (4) Transmission order table (FIG. 13) | |
|---|---|
| TBLOCKSEQ [1]-[20] | ← "0" |

However the area STATE in the environment table is excluded from the above-mentioned initialization, since the values thereof area already set in the step S102.

The initializing operation of the step S1 is thus completed.

Figure 16:
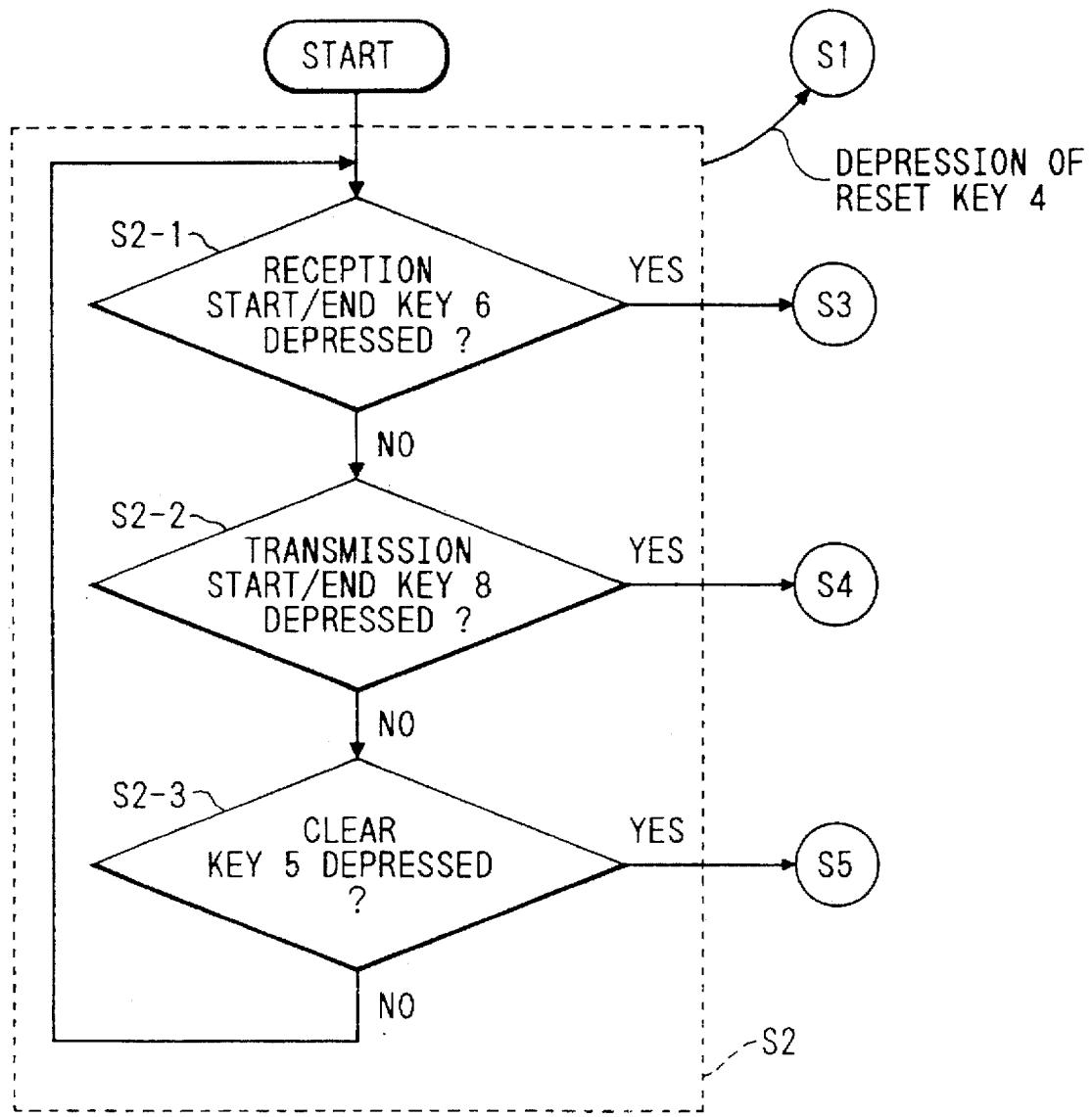
FIG. 16 is a flow chart of the control sequence in an idle status of a step S2 shown in FIG. 14.

FIG. 16 is a flow chart of the control sequence in the idle status in the step S2 shown in FIG. 14. At first a step S2-1 discriminates whether the reception start/end button 6 has been depressed, and, if depressed, the sequence proceeds to a step S3 to effect the reception operation. If said button has not been depressed, a step S2-2 discriminates whether the transmission start/end button 8 has been depressed, and, if depressed, the sequence proceeds to a step S4 to effect the transmission operation. If not depressed, a step S203 discriminates whether the clear button 5 has been depressed, and, if depressed, the sequence proceeds to a step S5 to effect the selective clearing of data blocks. If not depressed, the sequence returns to the step S201. Thus this routine awaits the depression of the reception start/end button 6, transmission start/end button 7 or clear button 5. However, if the reset button 4 is depressed, the control immediately moves to the step S1 for initialization by an interruption sequence.

Figure 17A:
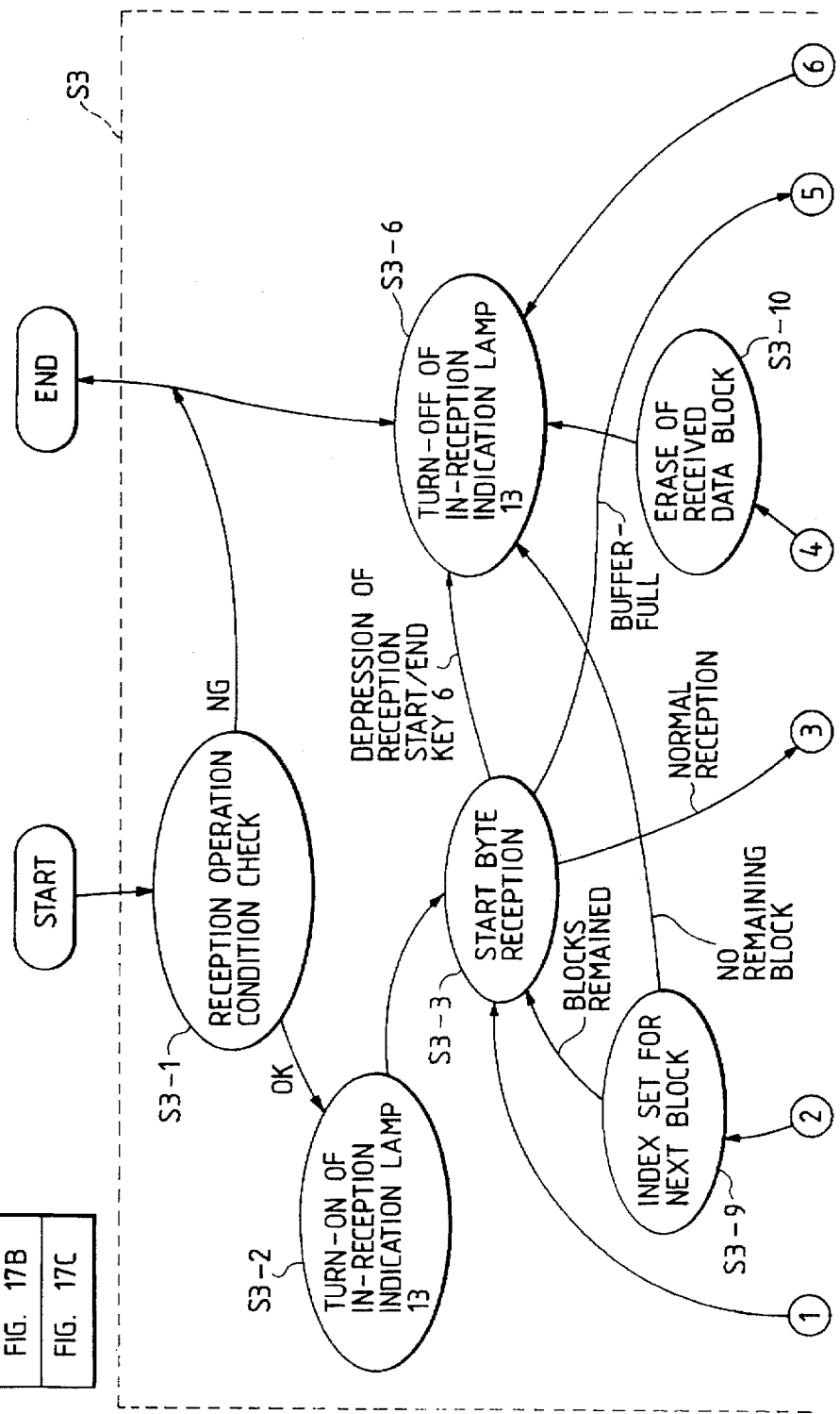
Figure 17B:
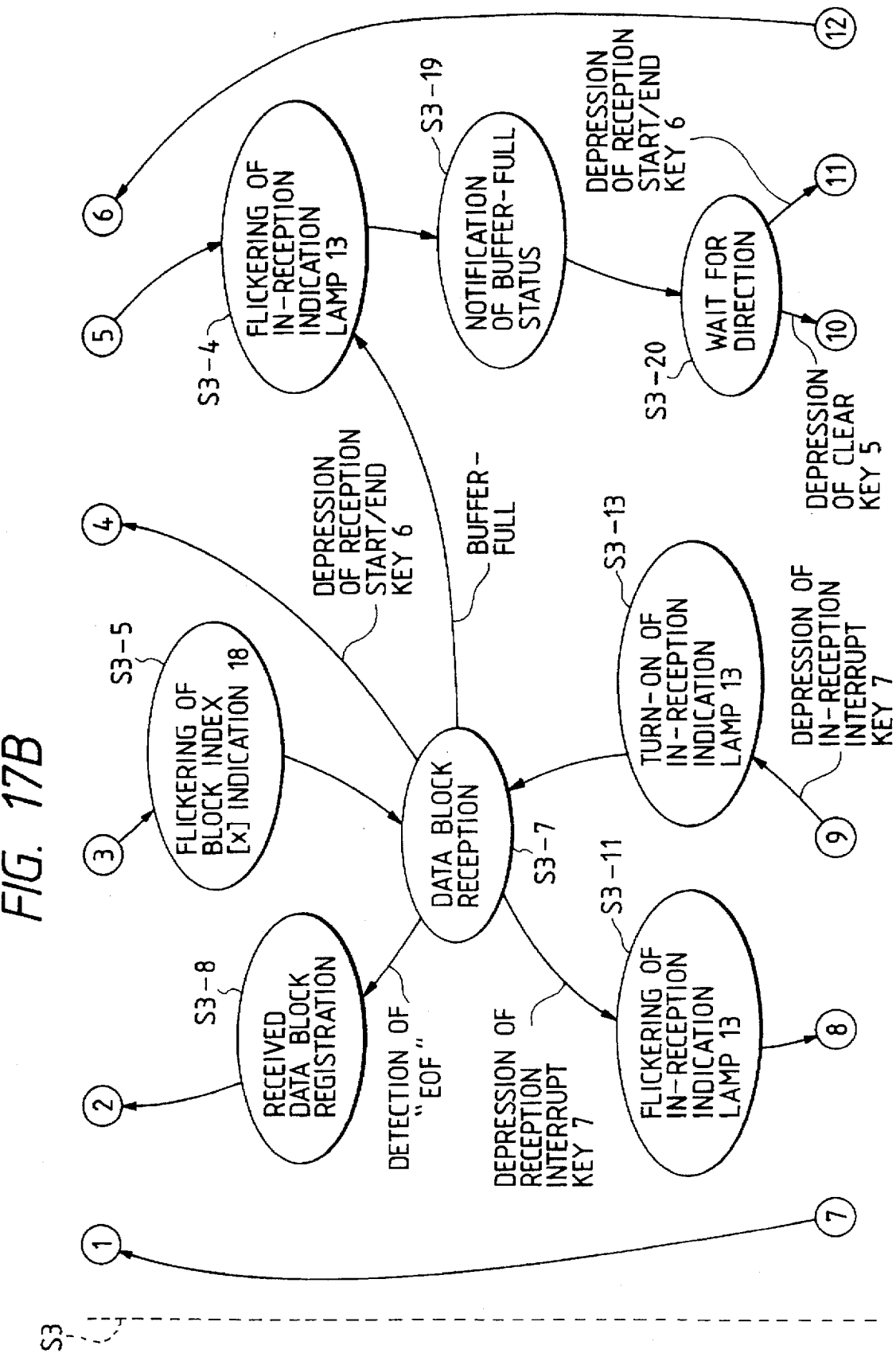
Figure 17C:
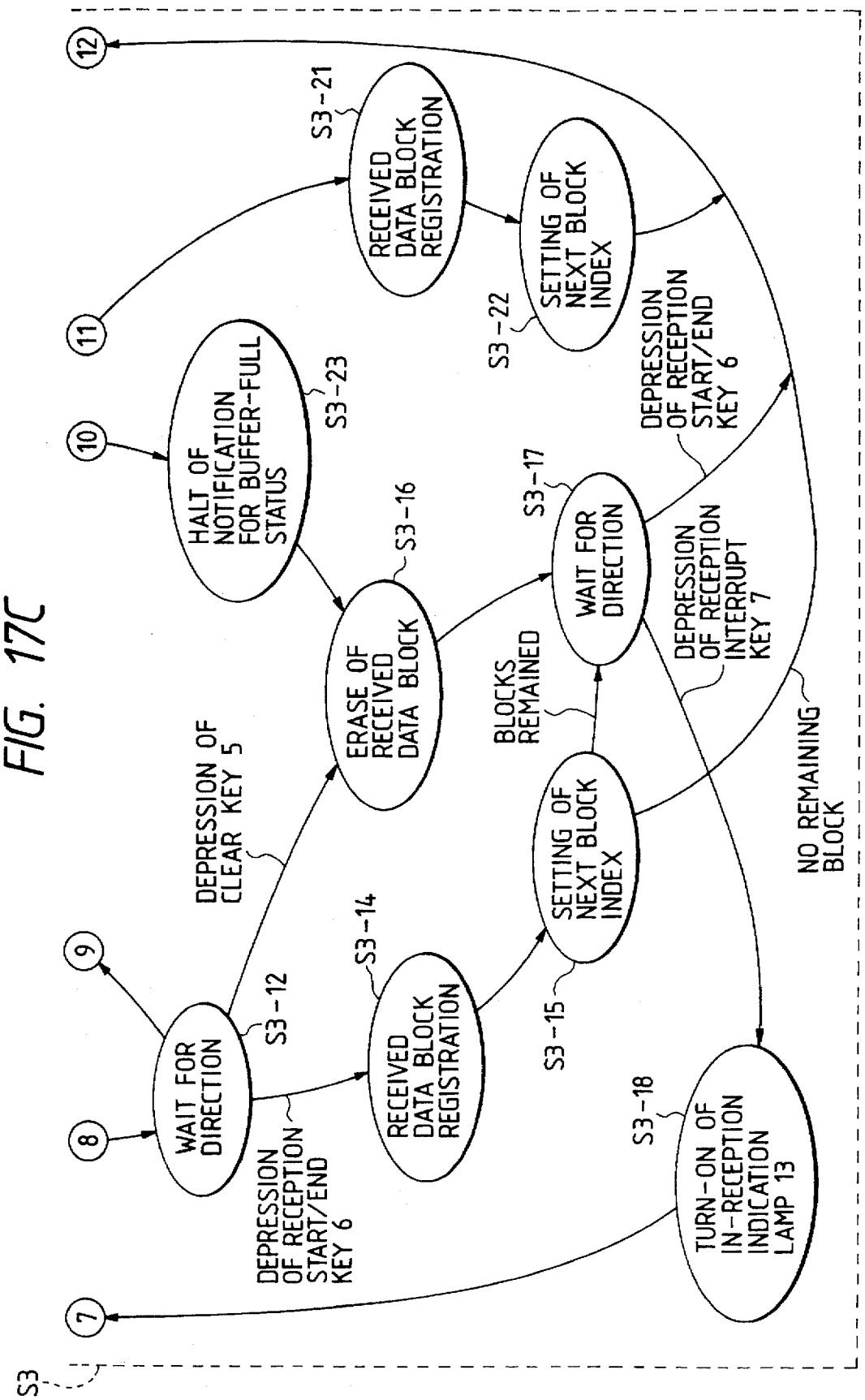

FIG. 17 shows the outline of control sequence of the reception step S3 in FIG. 14. At first a step S3-1 discriminates the condition for reception operation.

Figure 18:
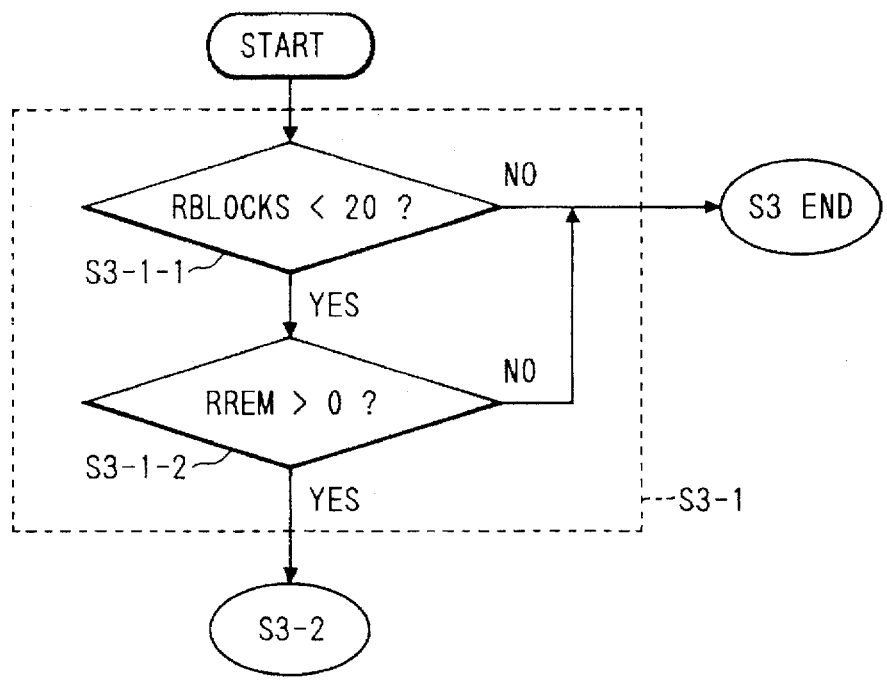
FIG. 18 is a flow chart of the control sequence in a step S3-1 for discriminating the condition for reception operation in FIG. 17.

FIG. 18 is a flow chart of the control sequence of said discrimination step S3-1. As shown in FIG. 18, there are identified the number of registered blocks and the remaining capacity of the reception buffer. A step S3-1-1 discriminates whether the number RBLOCKS of registered blocks is less than the maximum registration number "20", namely:

RBLOCKS<20, and a step S3-1-2 discriminates whether the remaining capacity of the reception buffer is not zero, namely:

RREM<0.

If these two conditions are satisfied, the sequence proceeds to a step S302. However, if either of said conditions is not satisfied, the reception step S3 is terminated.

Again referring to FIG. 17, a step S3-2 turns on the in-reception indicator lamp 13, thereby informing the user that the reception has been started, and the sequence proceeds to a step S3-3.

Figure 19B:
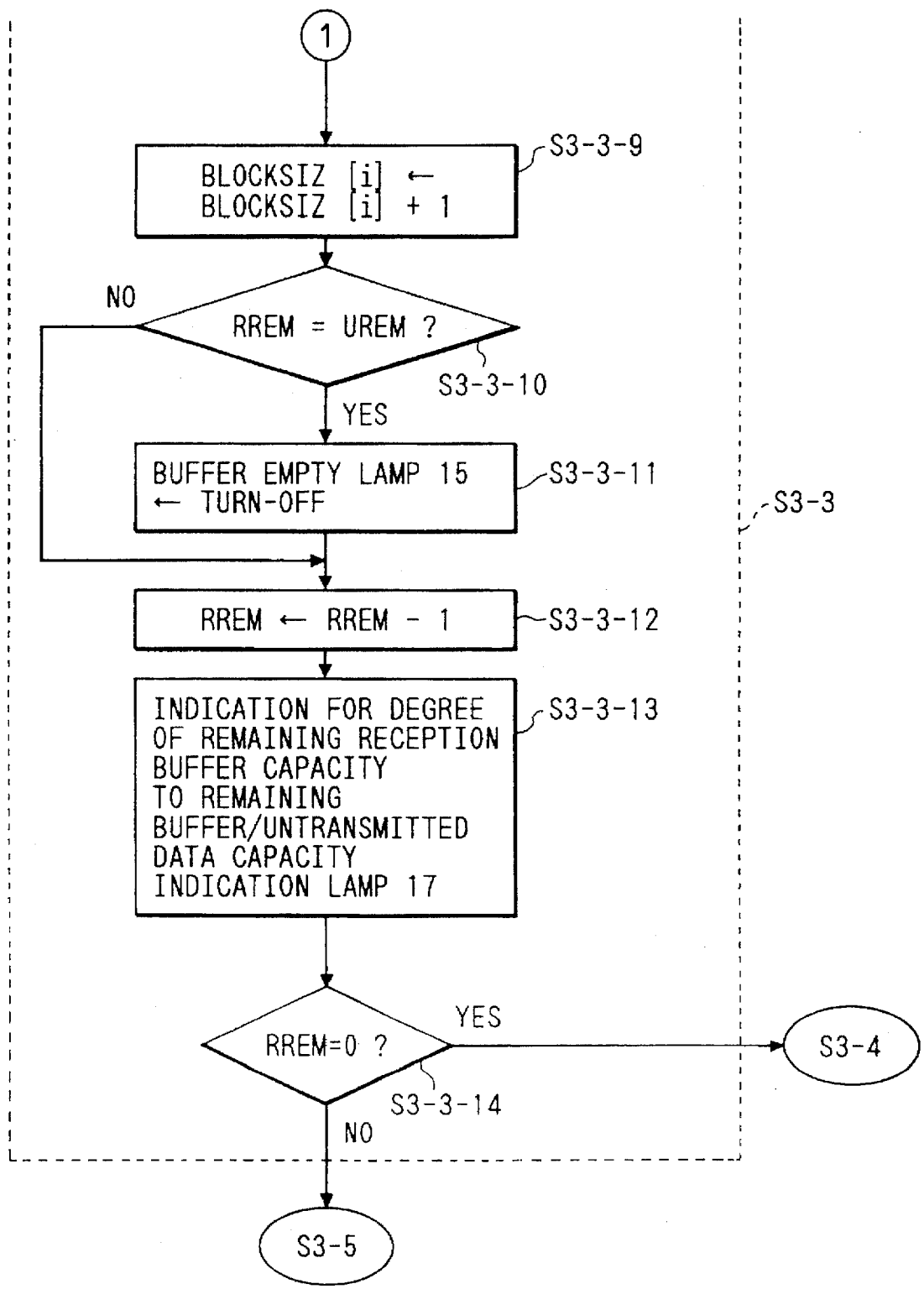

FIG. 19 is a flow chart of the control sequence of the start byte reception step S3-3 shown in FIG. 17. Said step S3-3 effects reception of initial byte data of a data block with a block index i. The reception of said byte data is conducted, as shown in FIG. 19, by a sequence consisting of the assertion of -ACKNLG_C (step S3-3-1), negation of BUSY_C (step S3-3-2), negation of -ACKNLG_C (step S3-3-3), detection of assertion of -STROBE_C (step S3-3-5), assertion of BUSY_C (step S3-3-6), and byte data readout from DATA0_C - DATA7_C (step S3-3-7). The byte data d read in said step S3-3-7 are stored, in a step S3-3-8, in a reception buffer area indicated by a memory address BLOCKADR [i]. Then a step S3-3-9 adds "1" to the data block size BLOCKSIZ [i]. If a step S3-3-10 identifies that the byte data stored in the step S3-3-8 are the initial byte data stored the reception buffer, namely if the buffer is in the empty state in which the remaining capacity RREM of reception buffer is equal to the reception buffer size UMEM prior to the step S3-3-10, a step S3-3-11 turns off the buffer empty indicator lamp 15, since such "buffer empty" status has been cancelled by the storage of the byte data d in the step S3-3-8. Then a step S3-3-12 subtracts "1" from the remaining capacity RREM of the reception buffer. A subsequent step S3-3-13 displays the percentage of the remaining capacity RREM of the reception buffer to the reception buffer size UMEM by the remaining buffer/untransmitted data capacity indicator lamps 17. Said percentage is calculated by the following equation:

$$\text{Percent of remaining buffer} = \text{integral part}\left(\frac{RREM}{UMEM} \times 100\right)$$

Finally a step S3-3-14 discriminates whether the remaining buffer capacity RREM has reached "0", namely whether the "buffer full" status has been reached. If the buffer full status has been reached, the sequence proceeds to a step S3-4, but, if not, the start byte is considered to have been properly received and the sequence proceeds to a step S3-5. On the other hand, if the step S3-3-4 detects the assertion of -STROBE_C and the reception start/end button 6 is depressed prior to the step S3-3-5, the reception is considered to have been interrupted. Thus a step S3-3-15 asserts BUSY_C, then a step S3-6 turns off the in-reception indicator lamp 13 and the reception step S3 is terminated.

Again referring to FIG. 17, after the proper reception of the start byte in the step S3-3 as explained above, the step S3-5 starts the flickering of the block index indicator lamp 18 corresponding to the block index i, thereby informing the user that a data block of the block index i is being in reception, and the sequence thereafter proceeds to a step S3-7.

Figure 20:
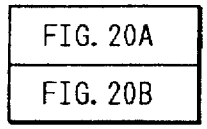
FIGS. 20 and 20A-20B are a flow chart of the control sequence in a step S3-7 for data block reception in FIG. 17.
Figure 20A:
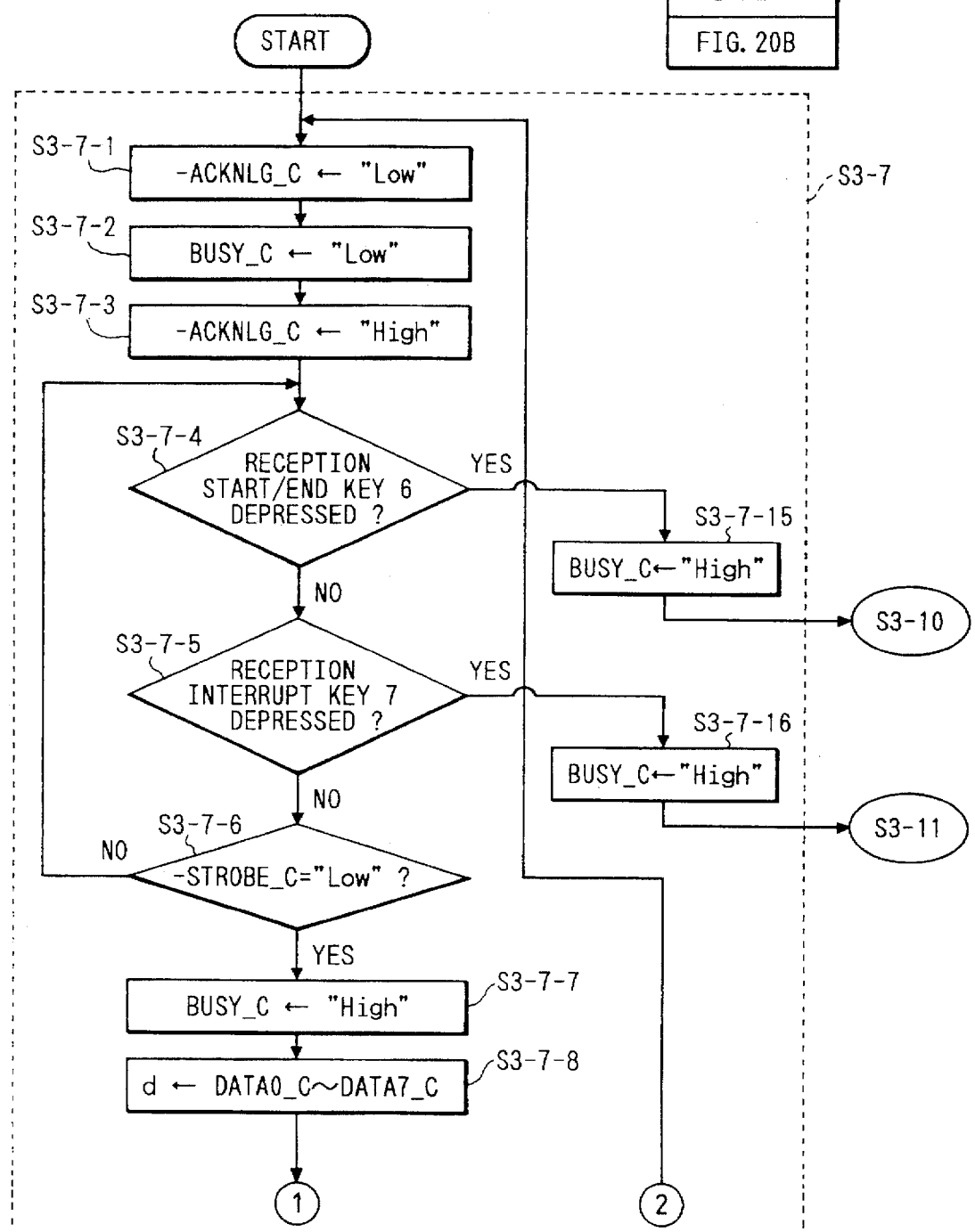
Figure 20B:
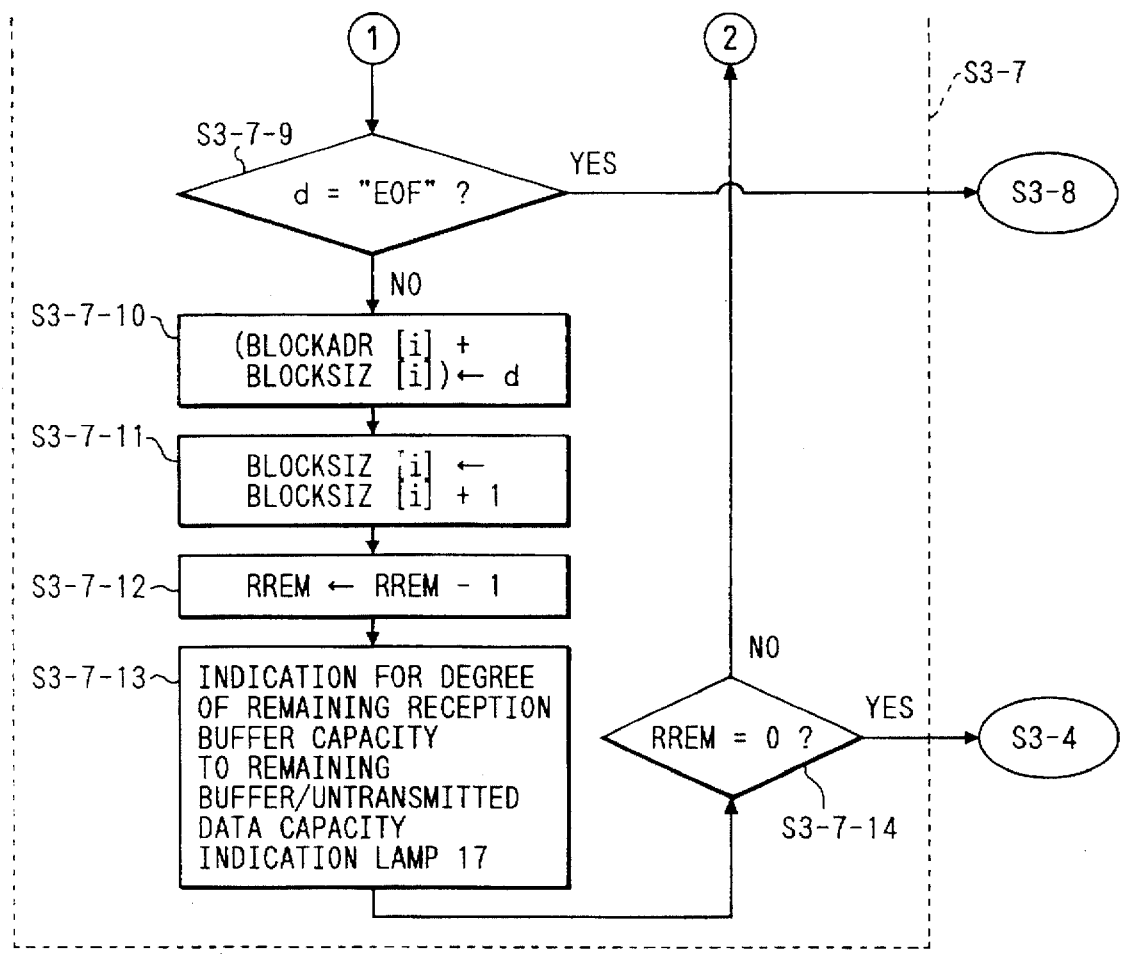

FIG. 20 is a flow chart of the control sequence in the data block reception step S3-7 shown in FIG. 17, for receiving the data block with the block index i. The reception of the byte data is conducted, as shown in FIG. 20, by a sequence consisting of the assertion of -ACKNLG_C (step S3-7-1), negation of BUSY_C (step S3-7-2), negation of -ACKNLG_C (step S3-7-5), detection of assertion of -STROBE_C (step S3-7-6), assertion of BUSY_C (step S3-7-7), and readout of byte data from DATA0_C-DATA7_C (step S3-7-8). Then a step S3-7-9 discriminates whether the byte data d read in the step S3-7-8 are a code "EOF" (=0BH) indicating the end of a data block, and, if "EOF" is found, the reception of the data block of the block index i in current reception is considered to have been completed and the sequence proceeds to a step S3-8. If "EOF" is not found, a step S3-7-10 stores the byte data, read in the step S3-7-8, in an area indicated by a memory address BLOCKARD [i]+ BLOCKSIZ [i] in the reception buffer. The a step S3-7-11 adds "1" to the data block size BLOCK-SIZ [i], and a step S3-7-12 subtracts "1" from the remaining buffer capacity RREM. Subsequently a step S3-7-13 displays, by the remaining buffer/untransmitted data capacity indicator lamps 17, the percentage of the remaining capacity RREM of the reception buffer to the reception buffer size UMEM. Said percentage is calculated in the same manner as in the aforementioned step S3-3-13. Finally a step S3-7-14 discriminates whether the remaining buffer capacity RREM has reached "0", namely whether the "buffer full" status has been reached. If the buffer is full the sequence proceeds to the step S3-4, but, if not, the sequence returns to the step S3-7-1 for receiving the next byte data. If the reception start/end button 6 is depressed in the step S3-7-4 prior to the step S3-7-6 for detecting the assertion of -STROBE_C, the reception operation is considered to have been interrupted and, after the assertion of BUSY_C in a step S3-7-15, the sequence proceeds to a step S3-10 to erase the data block in current reception. Similarly, if the reception interruption button 7 is depressed in the step S3-7-5, the reception is considered to have been interrupted, and, after the assertion of BUSY_C in a step S3-7-16, the sequence proceeds to a step S3-11.

In case the block end code "EOF" is received in the aforementioned data block reception step S3-7, the sequence proceeds to a step S3-8 for registration of the received data block.

Figure 21:
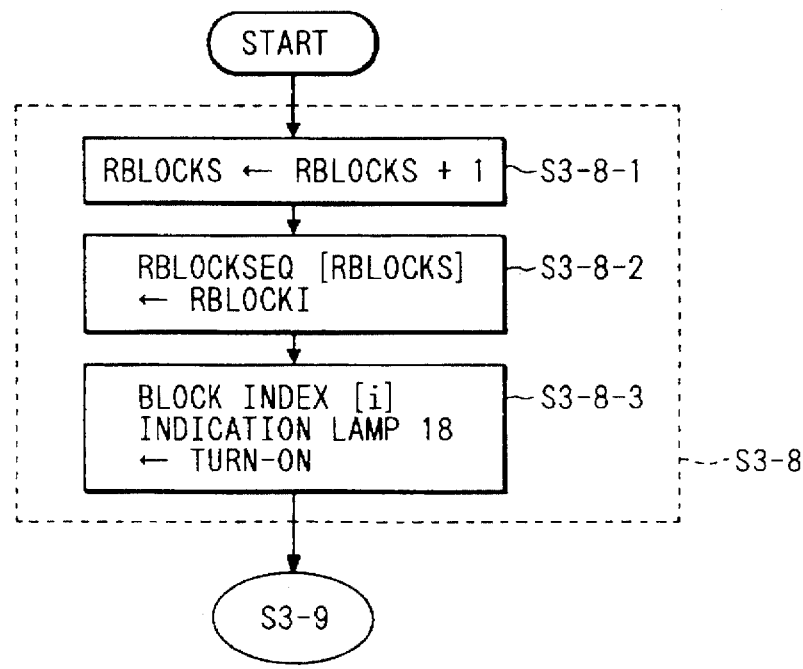
FIG. 21 is a flow chart of the control sequence in a step S3-8 for received data block registration in FIG. 17.

FIG. 21 is a flow chart of the control sequence in the received data block registration step S3-8 shown in FIG. 17. At first a step S3-8-1 adds "1" to the registered block number RBLOCKS, and a step S3-8-2 stores the block index i of the registered data block in the reception order table. In this operation, the storage position (1–20) in the reception order table RBLOCKSEQ [1]–[20] is represented by the value of the registered block number RBLOCKS already increased in the step S3-8-1, so that the storage area can be represented by RBLOCKSEQ [RBLOCKS]. Also the block index i is the value stored in RBLOCKI. Thus the above-explained operation can be represented as:

RBLOCKSEQ [RBLOCKS]←RBLOCKI.

Subsequently a step S3-8-3 turns on the block index indicator lamp 18, corresponding to the block index i, which has been flickering, thereby indicating to the user that the data block of the block index i has been registered, and then the sequence proceeds to a step S3-9.

Figure 22:
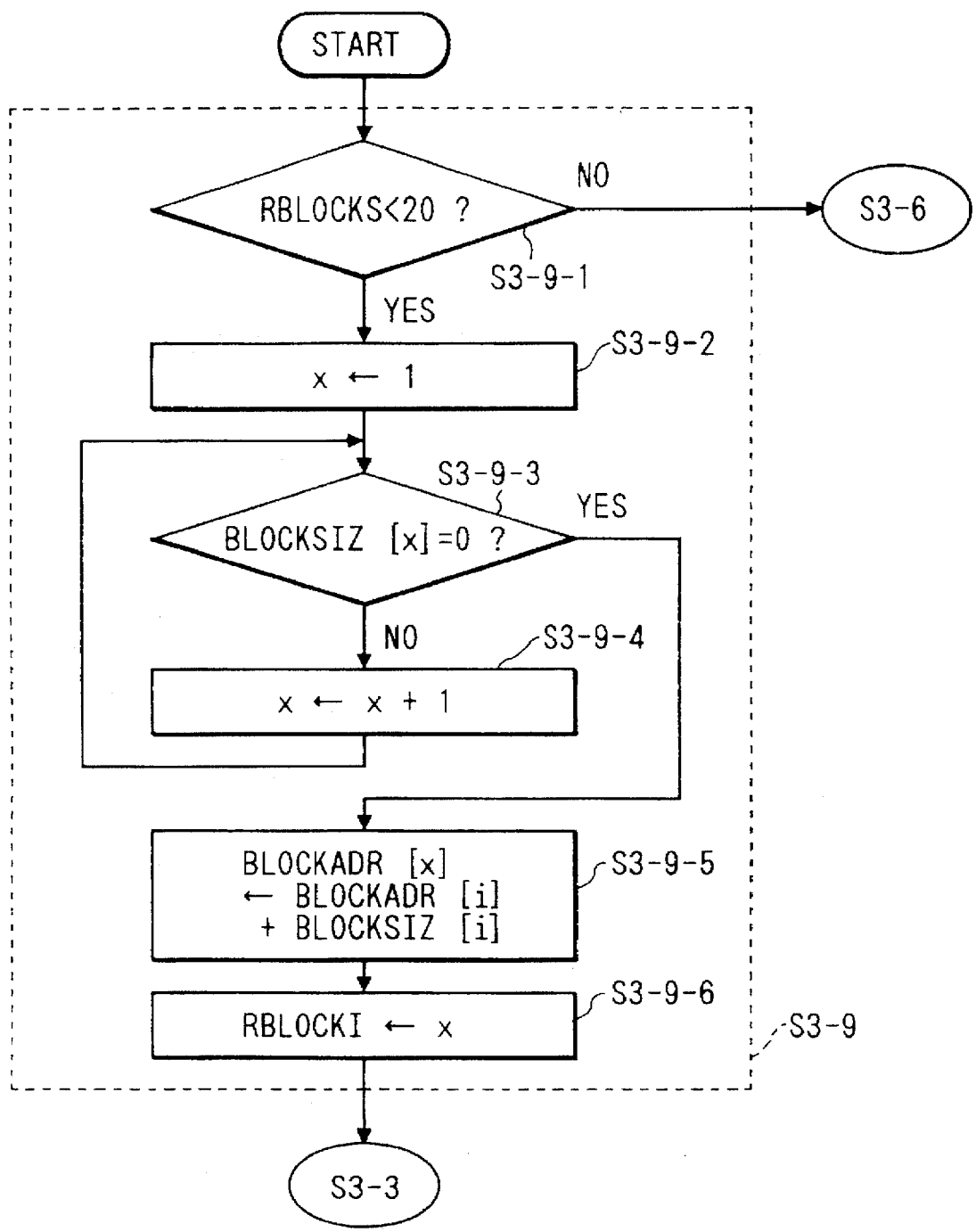
FIG. 22 is a flow chart of the control sequence in a step S3-9 for index setting for next block in FIG. 17.

FIG. 22 is a flow chart of the control sequence of a next block index setting step S3-9 shown in FIG. 17.

The step S3-9 sets the block index RBLOCKI to be given to the data block to be received next from the computer. As shown in FIG. 22, at first a step S3-9-1 discriminates whether the number RBLOCKS of data blocks currently registered is less than the maximum registerable number "20", and, if not, the sequence proceeds to the step S3-6 to immediately terminate the reception operation. If said discrimination turns out affirmative, a step S3-9-2 selects "1" as the first candidate of the unused block index x. Then a step S3-9-3 discriminates whether the data block of a block index x has already been registered, by whether the size BLOCK-SIZ [x] thereof is "0". If it is "0", the data block of the block index x is considered to have not been registered, and a step S3-9-5 sets the start address BLOCKADR [x] in the reception buffer, for storing the data block of the block index x. The start address selected in said step is equal to the sum of the start address BLOCKADR [i] for the data block of a block index i received most recently in the step S3-7 and the size BLOCKSIZ [i] thereof, namely:

BLOCKADR [x]←BLOCKADR [i]←BLOCKSIZ [i].

This means that the data block to be received next will be stored, in the reception buffer, in succession to the data block received and registered last. After said start address setting step S3-9-5, a step S3-9-6 sets x in the block index RBLOCKI to be given to the data block to be received next. On the other hand, if the step S3-9-3 identifies that the BLOCKSIZ [x] is not "0", indicating that the data block of the block index x has already been registered, the sequence proceeds to a step S3-9-4 for adding "1" to the candidate block index x, and the discrimination of the step S3-9-3 is repeated. This procedure always provides a block index x corresponding to the unregistered data block, since the discrimination in the step S3-9-1 indicates that there is at least one unused block index. After the setting of the block index RBLOCKI in the step S3-9-6 for the new data block to be received from the computer in the above-explained manner, the sequence returns to the step S3-3 to receive the start byte data of the new data block.

In case the aforementioned data block reception step S3-7 discriminates that the reception start/end button 6 has been depressed, the sequence proceeds to a step S3-10 for forced erasure of the data block in the course of reception.

Figure 23:
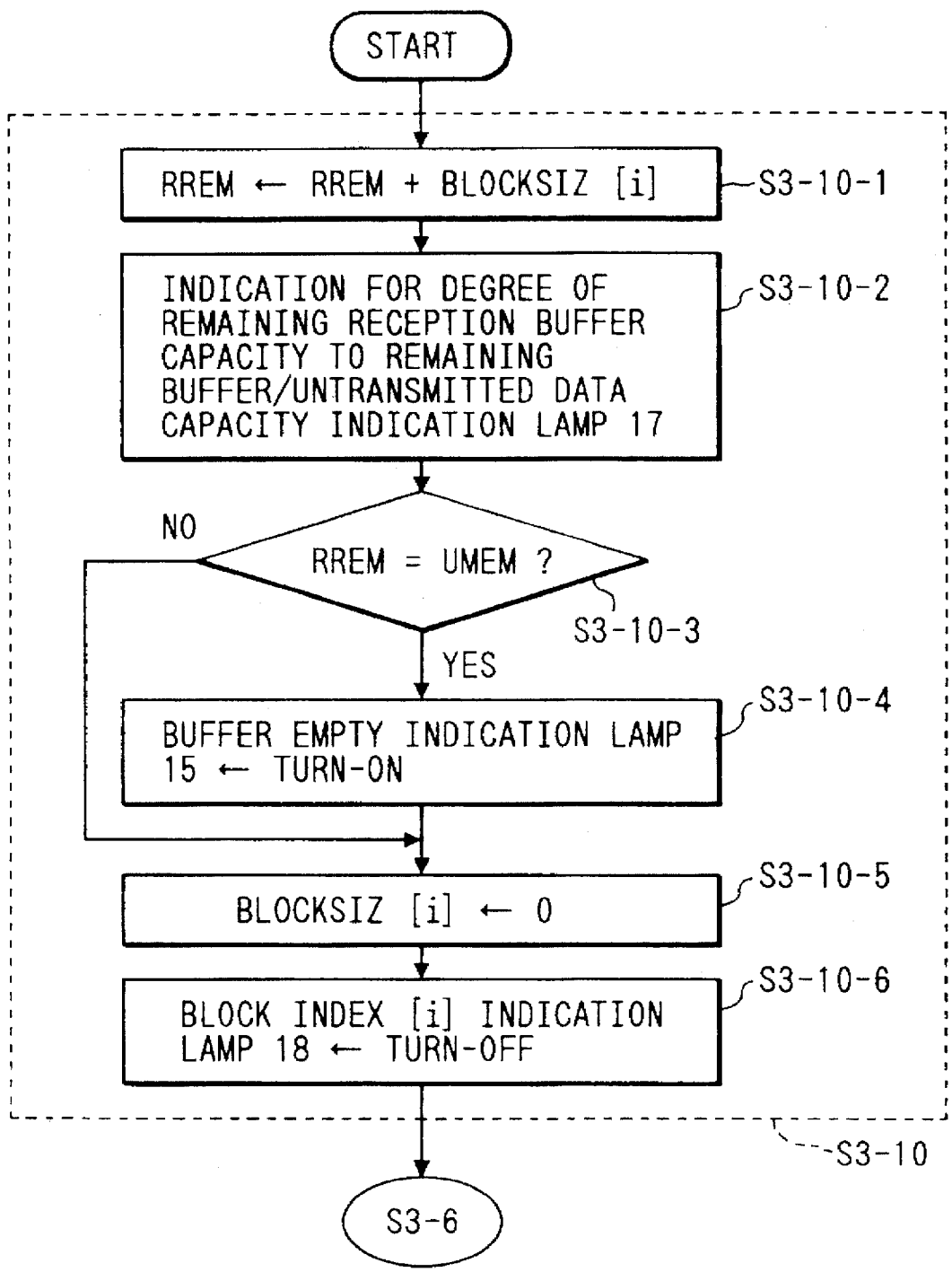
FIG. 23 is a flow chart of the control sequence in a step S3-10 for received data block erasure in FIG. 17.

FIG. 23 is a flow chart of the control sequence in the received data block erasing step S3-10 shown in FIG. 17. At first a step S3-10-1 adds, to the remaining buffer capacity RREM, the data block BLOCKSIZ [i] of the block index i that has been received in the step S3-7 up to this moment, thereby restoring the value of the remaining capacity RREM of the reception buffer to the start at the start of reception of the data block of the block index i. Then a step S3-10-2 displays the percentage of the remaining buffer capacity RREM restored in said step S3-10-2 to the reception buffer size UMEM, by the remaining buffer/untransmitted data capacity indicator lamps 17. Said percentage can be calculated in the same manner as in the aforementioned step S3-3-13. Then a step S3-10-3 discriminates whether the restored remaining buffer capacity RREM is equal to the reception buffer size UMEM, corresponding to the "buffer empty" status, and, if the buffer is empty, a step S3-10-4 turns on the buffer empty indicator lamp 15. Then a step S3-10-5 clears the size BLOCKSIZ [i] of the data block of block index i that has been in reception in the step S3-7 to "0", thereby completing the erasure of the received data block. Then a step S3-10-6 turns off the flickering block index indicator lamp 18 corresponding to the block index i, thereby informing the user of the erasure of the data block of block index i. Thereafter the sequence proceeds to the step S3-6, thereby completing the reception operation.

In case the aforementioned data block reception step S3-7 identifies that the reception interruption button 7 has been depressed, the sequence proceeds to a step S3-11 to shift the in-reception indicator lamp 13 which has been turned on to the flickering state, thereby informing the user that the reception operation is being interrupted, and the sequence then proceeds to a step S3-12.

Figure 24:
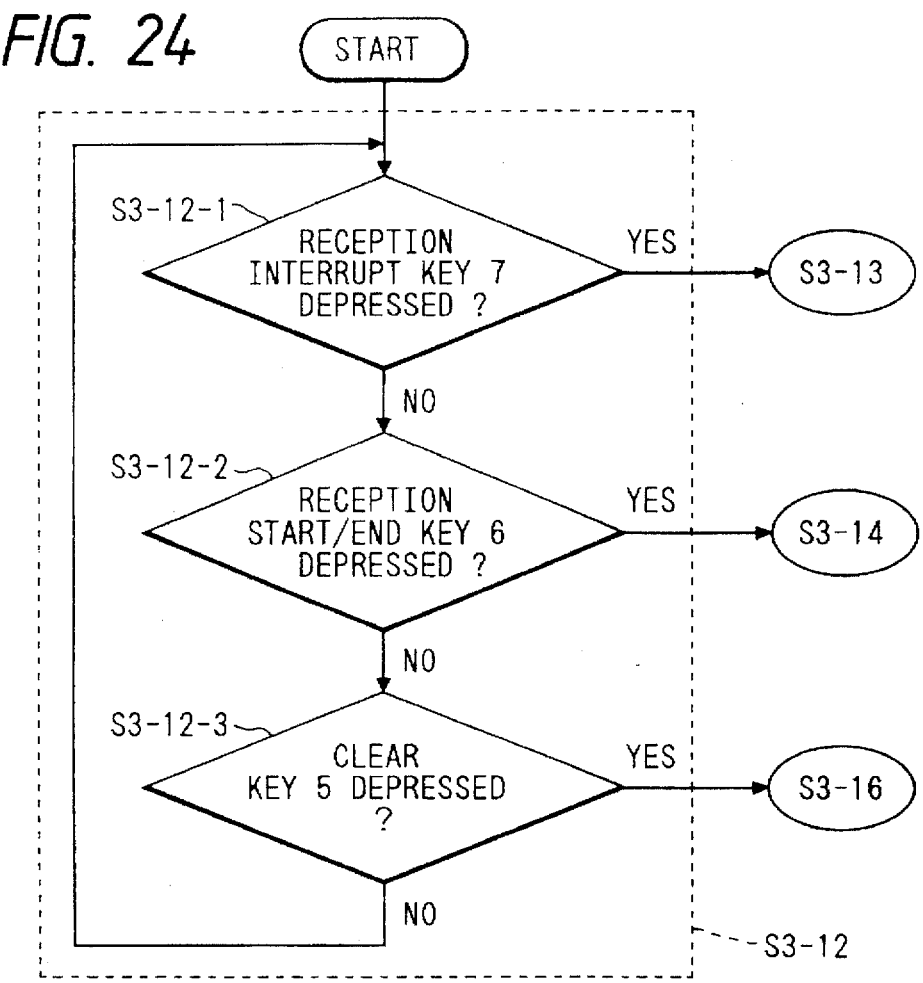
FIG. 24 is a flow chart of the control sequence in a step S3-12 for awaiting instruction in FIG. 17.

FIG. 24 is a flow chart of the control sequence of the instruction awaiting step S3-12.

Said step S3-12 awaits an instruction for operation during the interruption of the reception operation, and, as shown in FIG. 24, the waiting state continues until any of the operation instructing buttons is depressed. If the reception interruption button 7 is depressed (step S3-12-1), the sequence proceeds to a step S3-13. If the reception start/end button 6 is depressed (step S3-12-2), the sequence proceeds to a step S3-14. If the clear button 5 is depressed (step S3-12-3), the sequence proceeds to a step S3-16.

The depression of the reception interruption button 7 during the waiting state in the step S3-12 is regarded as the re-start of reception (cancellation of interruption), whereupon the control proceeds to a step S3-13 to turn on the flickering in-reception indicator lamp 13, thereby informing the use of the re-start of the reception operation. Then the sequence returns to the step S3-7 to continue the reception of the data block of block index i.

On the other hand, if the reception start/end button 6 is depressed during the waiting state of the step S3-12, the sequence proceeds to a step S3-14 to effect registration of the received data block.

Figure 25:
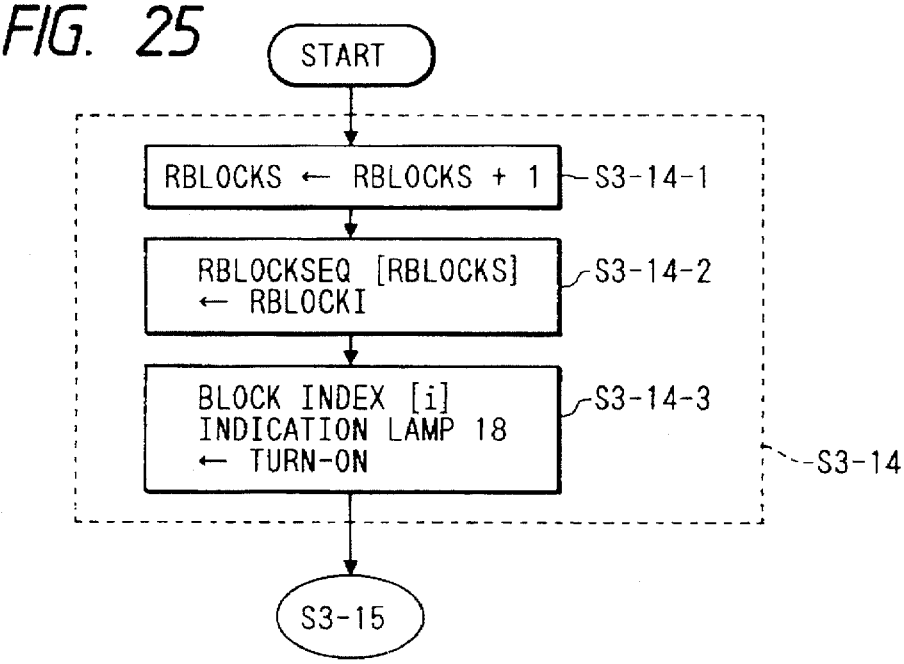
FIG. 25 is a flow chart of the control sequence in a step S3-14 for received data block registration in FIG. 17.

FIG. 25 is a flow chart of the control sequence of the received data block registering step S3-14 shown in FIG. 17. Said flow chart is similar to that of the aforementioned received data block registering step S3-8, and consists of adding "1" to the number RBLOCKS of registered blocks (step S3-14-1), storing the block index i (=RBLOCKI) in the reception order table (RBLOCKSEQ [RBLOCKS]) (step S3-14-2), and turning on the block index indicator lamp 18 corresponding to the block index i (step S3-14-3). Thereafter the sequence proceeds to a step S3-15.

Figure 26:
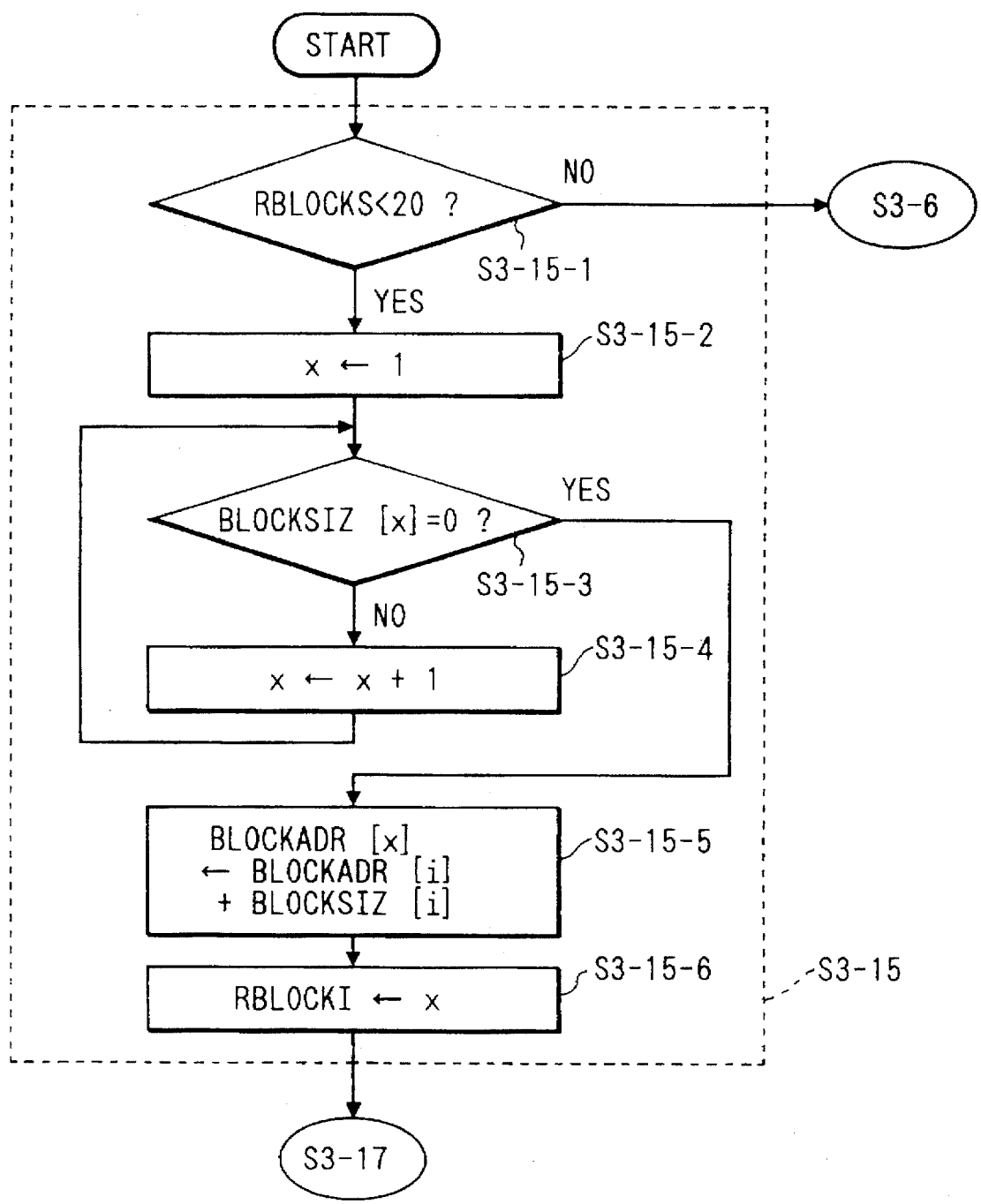
FIG. 26 is a flow chart of the control sequence in a step S3-15 for index setting for next block in FIG. 17.

FIG. 26 is a flow chart of the control sequence of the next block index setting step S3-15 shown in FIG. 17.

Said step S3-15 sets the block index RBLOCKI to be given to a data block to be received next from the computer. This flow chart is similar to the aforementioned next block index setting step S3-9. As shown in FIG. 26, there is discriminated that the number RBLOCKS of the registered blocks is less than the maximum registrable number "20" (step S3-15-1), and, if this condition is not satisfied, the sequence proceeds to the step S3-6 to immediately terminate the reception operation. If said condition is satisfied, an initial value "1" is selected as the candidate for the unused block index x (step S3-15-2) then there is discriminated whether the data block of block index x has already been registered (step S3-15-3), and, if not registered yet, the start address BLOCKADR [x] is set for the reception buffer (step S3-15-5) and x is stored in the block index RBLOCKI (step S3-15-6). On the other hand, if the step S3-15-3 identifies that the data block of block index x has already been registered, "1" is added to the candidate block index x (step S3-15-4) and the discrimination of the step S3-15-3 is repeated. After the setting of the block index RBLOCKI for the data block to be newly received from the computer in the above-explained manner, the sequence proceeds to a step S3-17.

Figure 27:
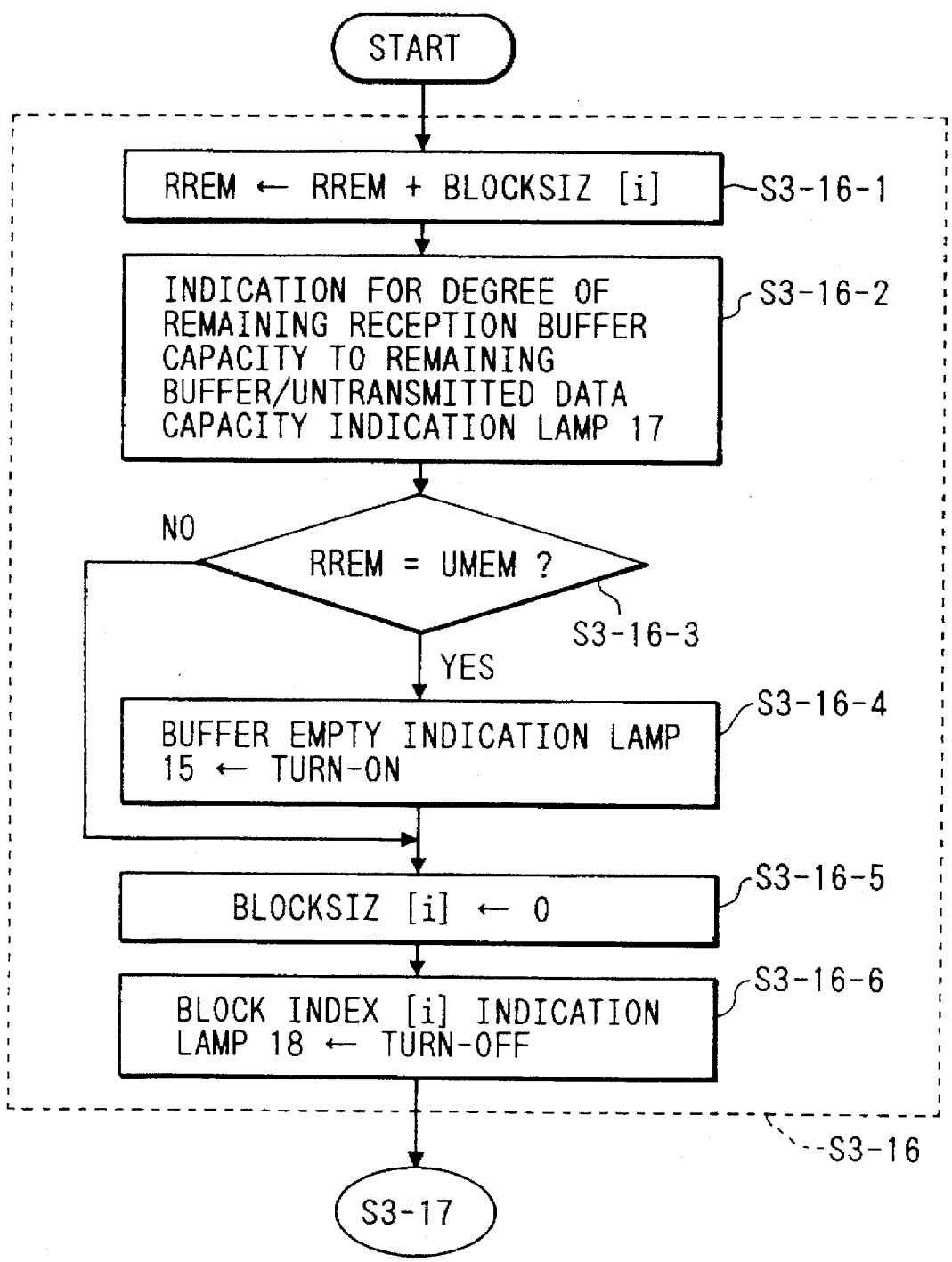
FIG. 27 is a flow chart of the control sequence in a step S3-16 for received data block erasure in FIG. 17.

On the other hand, if the clear button 5 is depressed in the waiting state in the step S3-12 shown in FIG. 17, the sequence proceeds to the step S3-16 for forced erasure of the data block received up to this moment. FIG. 27, is a flow chart of the control sequence in the received block data erasing step S3-16 shown in FIG. 17.

Said flow chart is similar to that of the received data block erasing step S3-10 explained above. At first the remaining buffer capacity RREM is restored to the status at the start of reception of the tack block with block index i (step S3-16-1), then the percentage of thus restored remaining buffer capacity RREM to the reception buffer size UMEM is displayed by the remaining buffer/untransmitted data capacity indicator lamps 17 (step S3-16-2), and there is discriminated whether the buffer is in the empty status (step S3-16-3). If the buffer is empty, a step S3-16-4 turns on the buffer empty indicator lamp 15. Then the size of the data block of block index i that have been received in the step S3-7 is cleared to "0" (step S3-16-5), and the flickering block index indicator lamp 18 corresponding to the block index i is turned off (step S3-16-6). Thereafter the sequence proceeds to a step S3-17.

Figure 28:
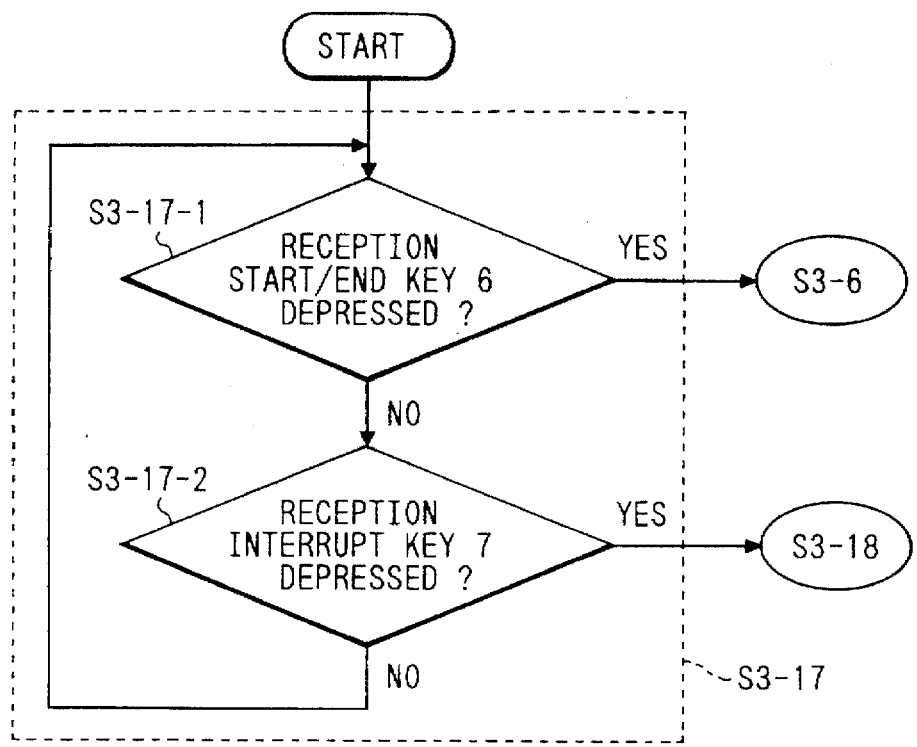
FIG. 28 is a flow chart of the control sequence in a step S3-17 for awaiting instruction in FIG. 17.

FIG. 28 is a flow chart of the control sequence of the instruction awaiting step S3-17 shown in FIG. 17.

The step S3-17 is an instruction awaiting state after the interruption of reception operation, and waits until any of the operation instruction buttons is depressed as shown in FIG. 28. The depression of the reception start/end button 6 (step S3-17-1) is regarded as the termination of the reception operation, and the sequence proceeds to the step S3-6 to terminate the reception. The depression of the reception interruption button 7 (step S3-17-2) is regarded as the re-start of the reception operation, whereby the sequence proceeds to a step S3-18 to turn on the flickering in-reception indicator lamp 13, thereby informing the use of the re-start of the reception operation, and the sequence returns to the step S3-3 to effect reception of the start byte data of a new data block.

Referring to FIG. 17, if the buffer full status is identified in the start byte reception step S3-3 or in the data block reception step S3-7, the sequence proceeds to the step S3-4 to shift the in-reception indicator lamp 13 from the turned-on state to the flickering state, thereby informing the user that the reception operation is being interrupted, and the sequence then proceeds to a step S3-19.

Figure 29:
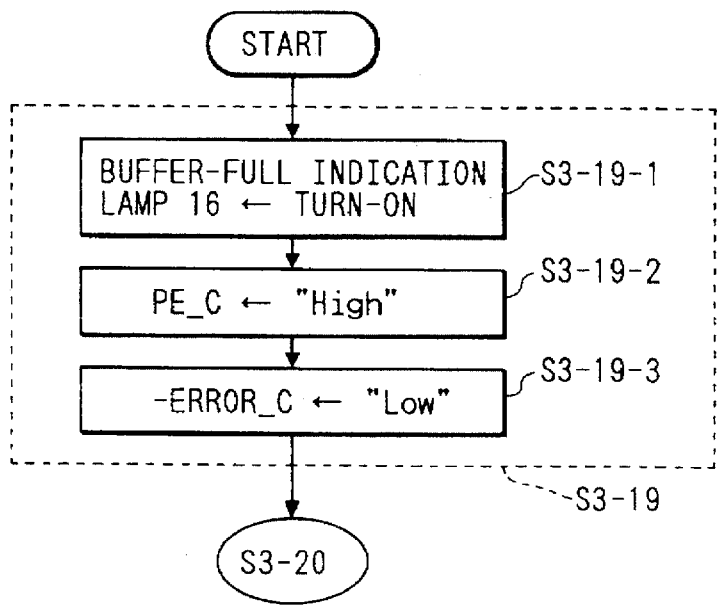
FIG. 29 is a flow chart of the control sequence in a step S3-19 for notifying full-buffer status in FIG. 17.

FIG. 29 is a flow chart of the control sequence of a buffer full status notifying step S3-19 shown in FIG. 17.

Said step S3-19 effects notification of the buffer full status. At first a step S3-19-1 turns on the buffer full indicator lamp 16, thereby informing the user that the buffer full status has been reached. Then steps S3-19-2 and S3-19-3 respectively assert the control signal lines PE_C and -ERROR_C to notify the computer that the printer buffer has reached the "paper empty" status. Subsequently the sequence proceeds to a step S3-20.

Figure 30:
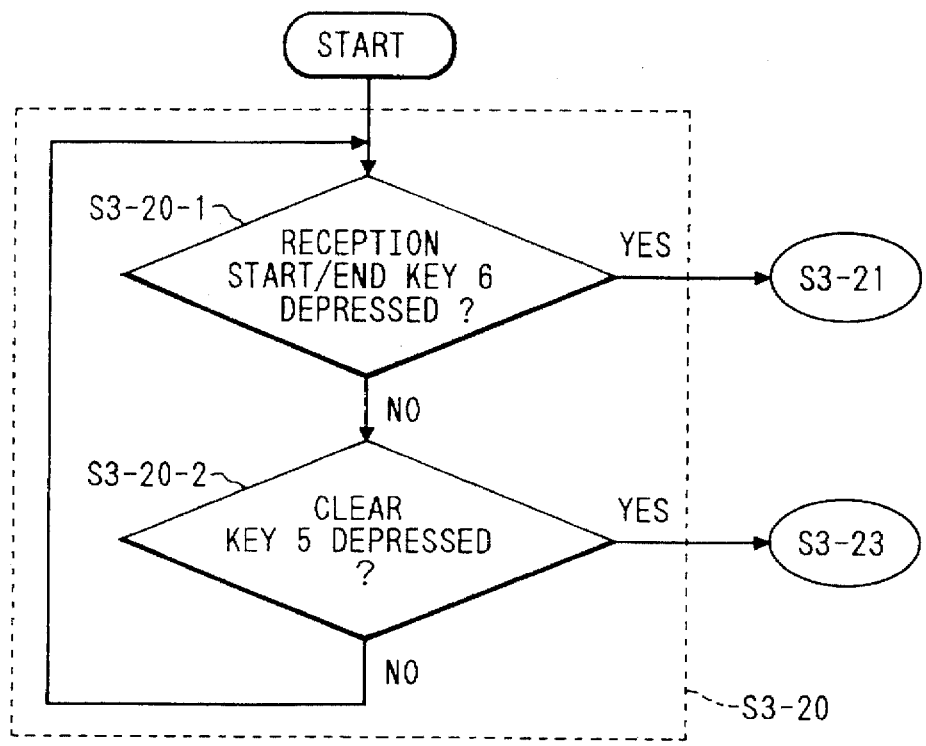
FIG. 30 is a flow chart of the control sequence in a step S3-20 for awaiting instruction in FIG. 17.

FIG. 30 is a flow chart of the control sequence of the instruction awaiting step S3-20 shown in FIG. 17.

The step S3-20 is an instruction awaiting step in the buffer full status, and continues the waiting state until any of the operation instructing buttons is depressed. When the reception start/end button 6 is depressed (step S3-20-1), the sequence proceeds to a step S3-21, and, when the clear button 5 is depressed (step S3-20-2), the sequence proceeds to a step S3-23.

When the reception start/end button 6 is depressed in the waiting state in the buffer full status in the step S3-20, the sequence proceeds to the step S3-21 to register the data block that has been received until the buffer full status is reached.

Figure 31:
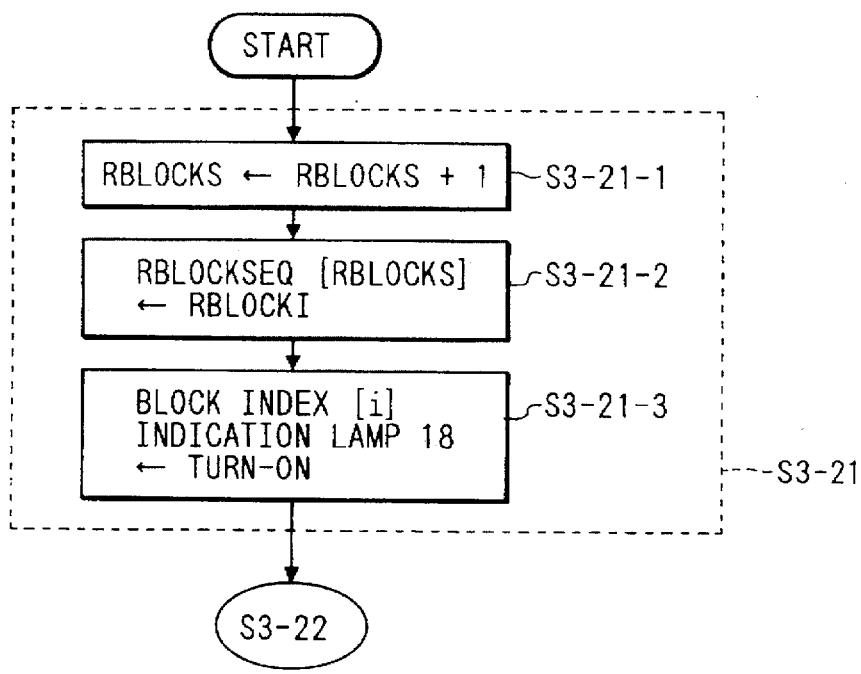
FIG. 31 is a flow chart of the control sequence in a step S3-21 for received data block registration in FIG. 17.

FIG. 31 is a flow chart of the control sequence in the received data block registration step S3-21 in FIG. 17.

Said flow chart is similar to that of the aforementioned received data block registration step S3-8, and is composed, as shown in FIG. 31, of adding "1" to the registered block number RBLOCKS (step S3-21-1), storing the block index i (=RBLOCKI) in the reception order table (RBLOCKSEQ [RBLOCKS]) (step S3-21-2), and turning on the flickering block index indicator lamp 18 corresponding to the block index i (step S3-21-3). Subsequently the sequence proceeds to a step S3-22.

Figure 32:
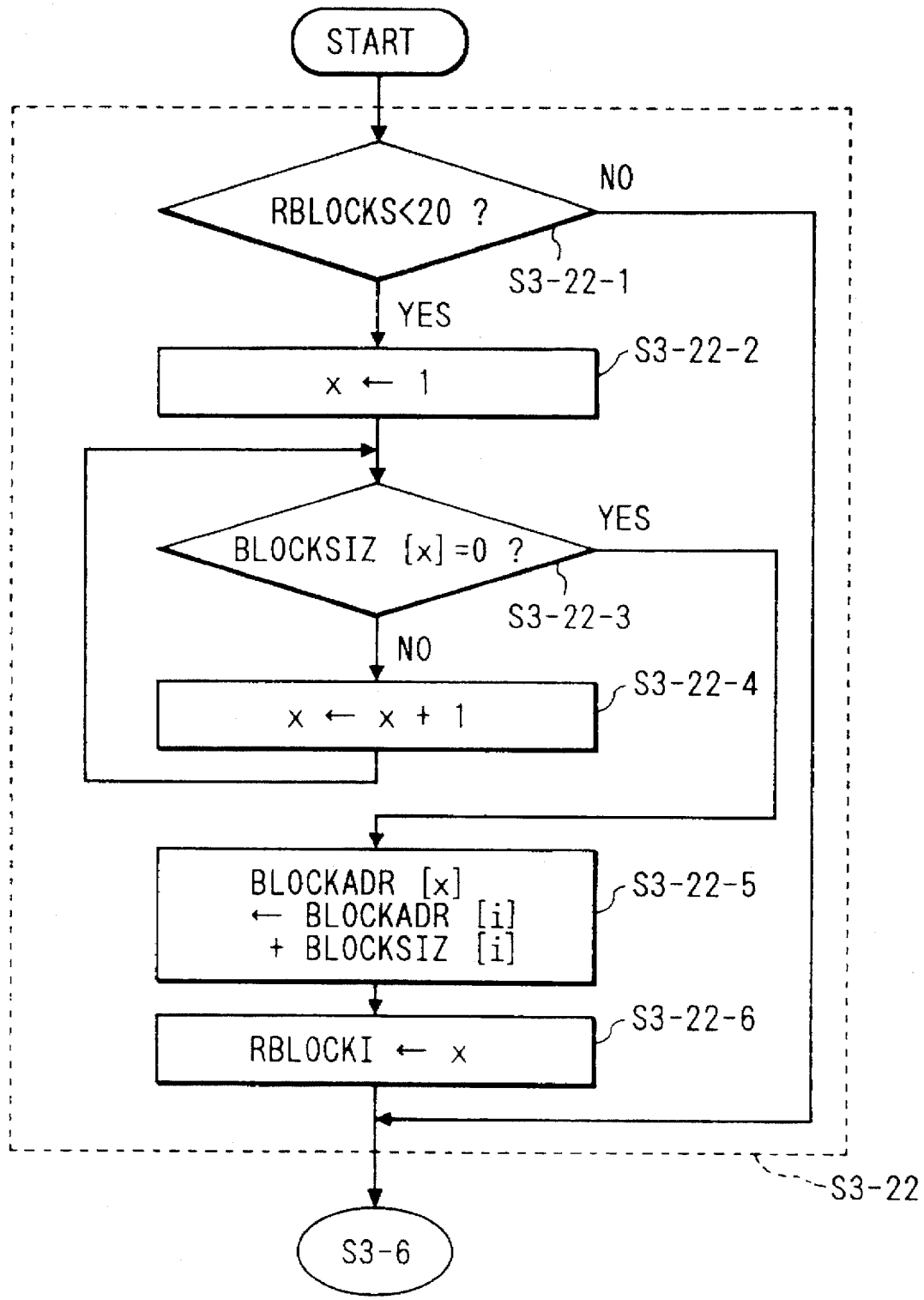
FIG. 32 is a flow chart of the control sequence in a step S3-22 for index setting for next block in FIG. 17.

FIG. 32 is a flow chart of the control sequence of a next block index setting step S3-22 shown in FIG. 17.

The step S3-22 sets the block index RBLOCKI to be given to the data block to be received next from the computer. This flow chart is similar to that of the aforementioned next block index setting step S3-9. As shown in FIG. 32, there is discriminated whether the number RBLOCKS of the registered data blocks is less than the maximum registerable number "20" (step S3-22-1), and, if this condition is not satisfied, the sequence proceeds to the step S3-6 to immediately terminate the reception operation. If said condition is satisfied, "1" is selected as an initial value for the candidate of the unused block index x (step S3-22-2), and then there is discriminated whether the data block of the block index x has already been registered (step S3-22-3). If not yet registered, the start address BLOCKADR [x] of the reception buffer is set (step S3-22-5) and x is stored as the block index RBLOCKI (step S3-22-6). On the other hand, if already registered, "1" is added to the candidate block index x (step S3-22-4) and the discrimination of the step S3-22-3 is repeated. After the setting of the block index RBLOCKI for the data block to be newly received from the computer in the above-explained manner, the sequence proceeds to the step S3-6 to terminate the reception operation.

In case the clear button 5 is depressed in the waiting state during the buffer full status in the step S3-21, the control proceeds to a step S3-23 for terminating the notification of the buffer full status.

Figure 33:
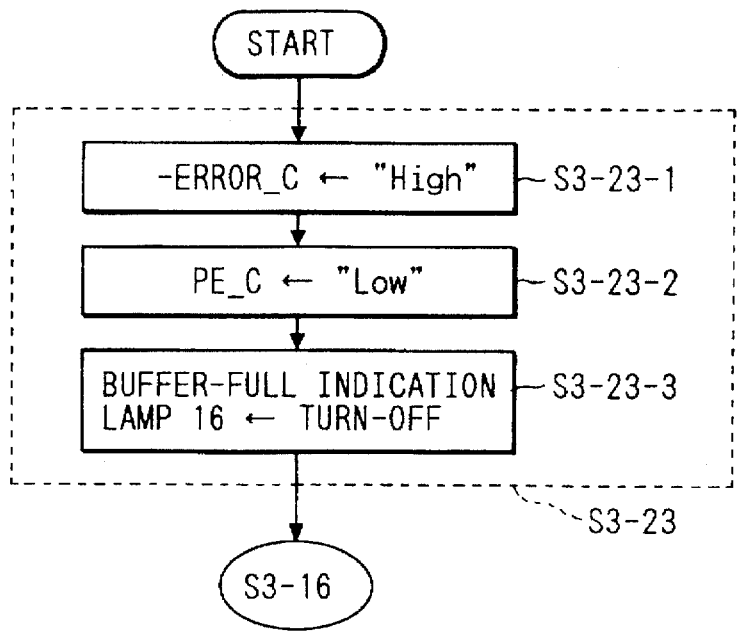
FIG. 33 is a flow chart of the control sequence in a step S3-23 for halting notification for full-buffer status in FIG. 17.

FIG. 33 is a flow chart of the control sequence of the step S3-23 for terminating the notification of the buffer full status, shown in FIG. 17.

Steps S3-23-1 and S3-23-2 respective negate the control signal lines to computer -ERROR_C and PE_C, thereby informing the computer that the printer buffer has recovered from the "paper empty" status, and a step S3-23-3 turns off the buffer full indicator lamp 16 to inform the user that the buffer full status has been cancelled. Then the sequence proceeds to the received data block erasing step S3-16, for effecting forced erasure of the data block which has been received until the buffer full status is encountered.

The foregoing explanation covers the flow in the reception operation step S3.

Figure 34A:
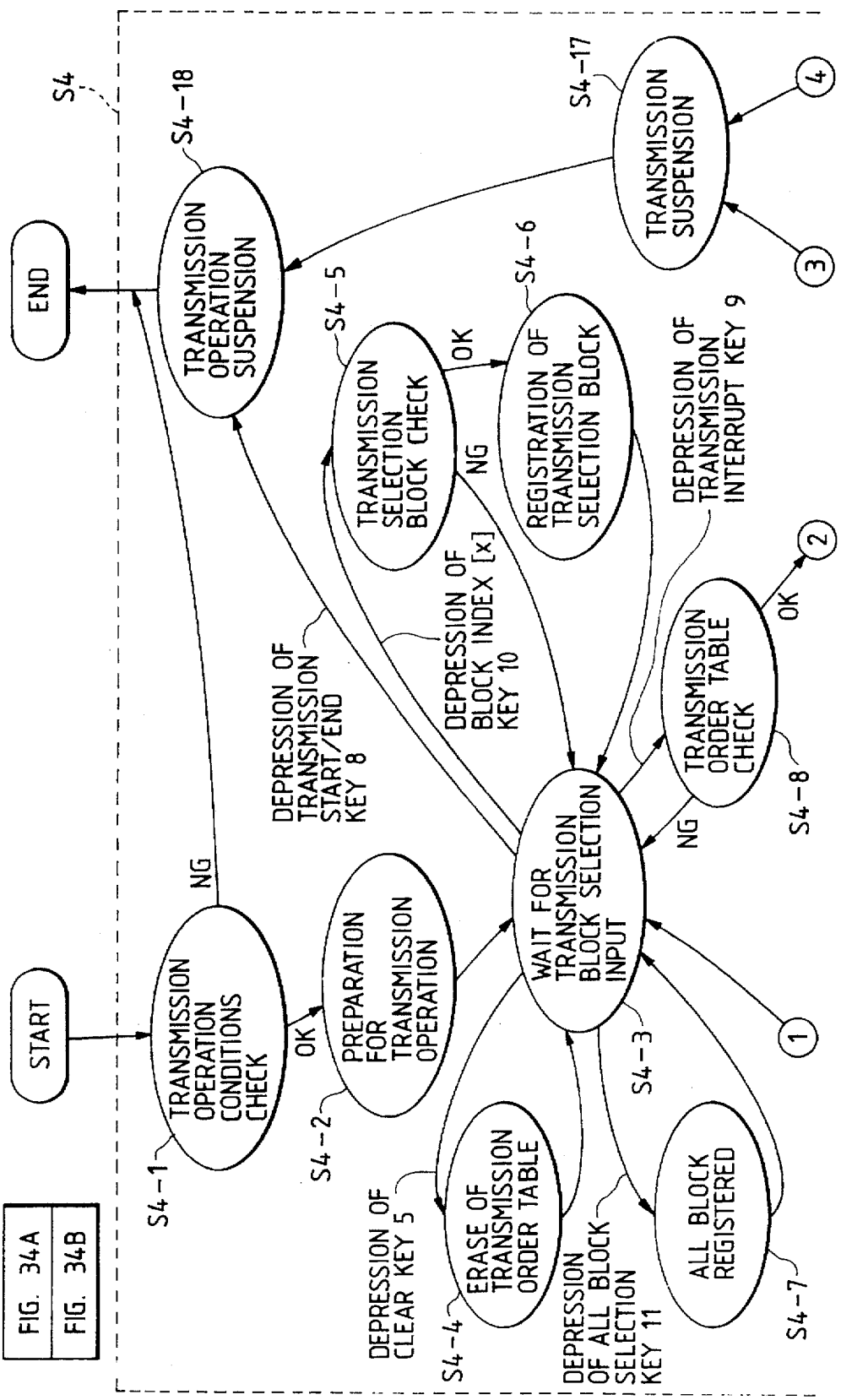
Figure 34B:
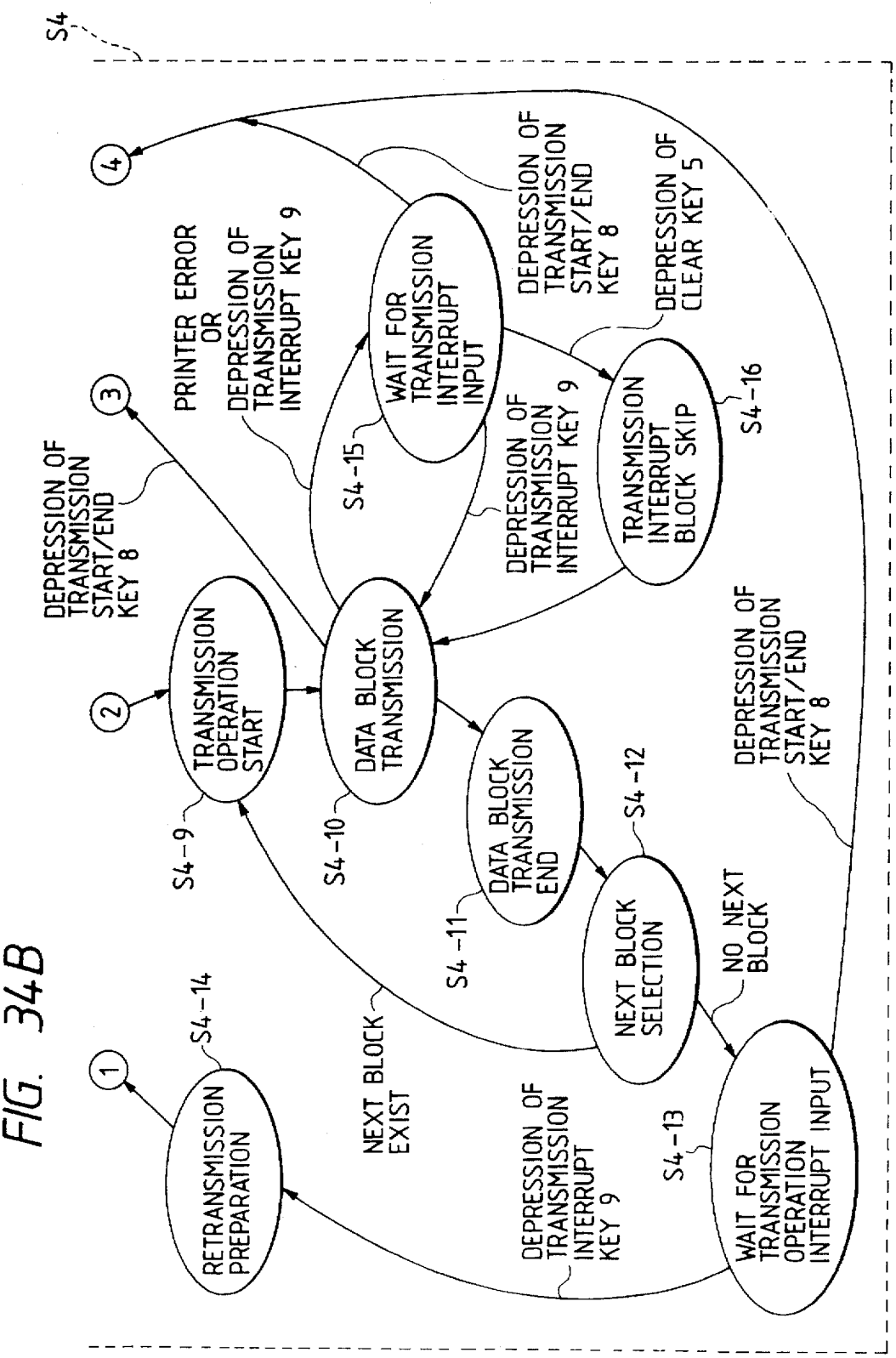

FIG. 34 shows the outline of the control sequence in the transmission operation S4 shown in FIG. 14. In said step S4, at first a step S4-1 effects discrimination of the transmission condition.

Figure 35:
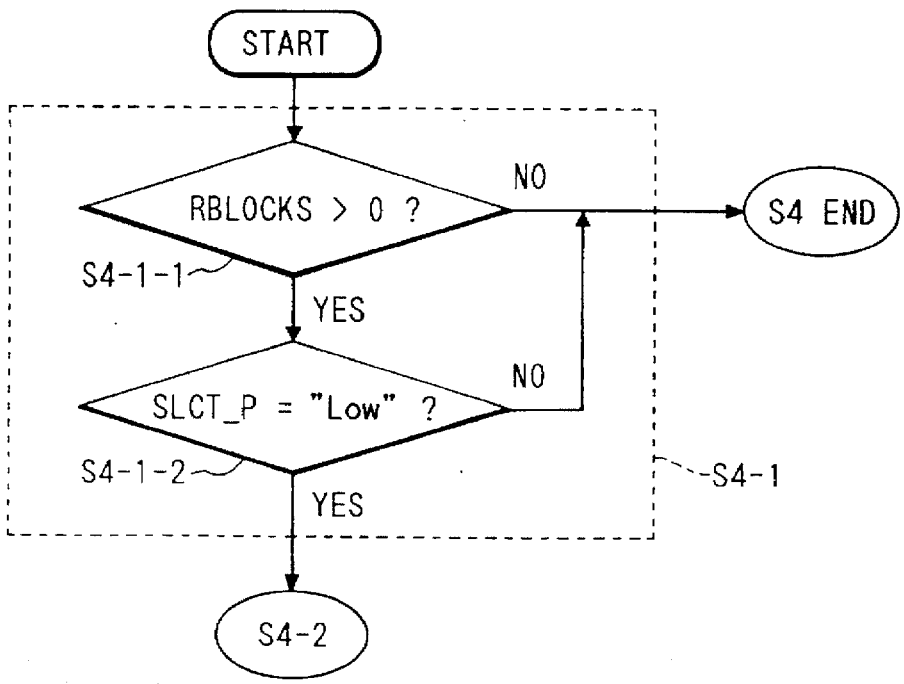
FIG. 35 is a flow chart of the control sequence in a step S4-1 for discriminating the condition for transmission operation in FIG. 34.

FIG. 35 is a flow chart of the control sequence of the step S4-1 for discriminating the transmission condition, shown in FIG. 34.

As shown in FIG. 35, said step discriminates the number of registered blocks and the status of the control signal line SLCT_P of the ports to printer. A step S4-1-1 discriminates whether the number RBLOCKS of registered blocks is larger than zero, namely:

RBLOCKS>0 and a step S4-1-2 discriminates whether the line SLCT_P is in the negate status, namely:

SLCT_P="Low".

If these two conditions are satisfied, the sequence proceeds to a step S4-2, but, if either is not satisfied, the transmission operation step S4 is terminated.

The step S4-2 effects preparation for the transmission operation.

Figure 36:
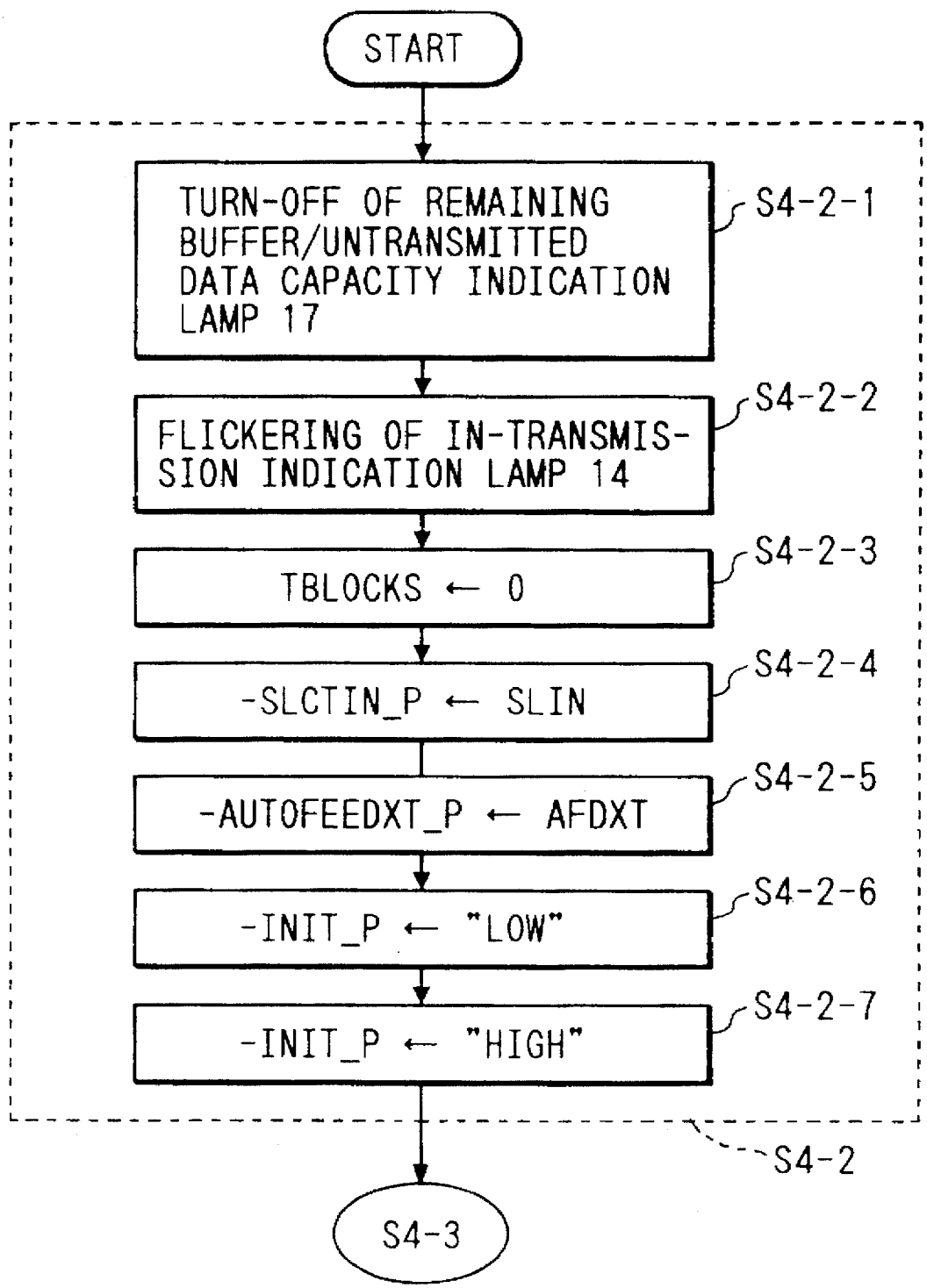
FIG. 36 is a flow chart of the control sequence in a step S4-2 for preparation for transmission operation in FIG. 34.

FIG. 36 is a flow chart of the control sequence in the transmission preparation step S4-2 shown in FIG. 34. At first a step S4-2-1 turns off the remaining buffer/untransmitted data capacity indicator lamps 17, and a step S4-2-2 causes the in-transmission indicator lamp 14 to flicker, thereby informing the user that the transmission operation has been started. Then a step S4-2-3 clears the total number TBLOCKS of transmitted data blocks to "0", a step S4-2-4 releases the value of SLIN, stored in the foregoing step S1-2, to the control signal line -SLCTIN_P of the ports to printer, and a step S4-2-5 releases the value of AFDXT, stored in the foregoing step S1-2, to the control signal line -AUTOFEEDXT_P of the ports to printer. The operations of said steps S4-2-3 - S4-2-5 can be represented as:

$TBLOCKS \leftarrow 0$ $-SLCTIN\_P \leftarrow SLIN$

-continued

-AUTOFEEDXT_P ← AFDXT

Then a step S4-2-6 asserts the control signal line -INIT_P to printer and a step S4-2-7 negates said line -INIT_P, thereby sending a "Low" level pulse signal and initializing the printer connected to the ports to printer.

Subsequently the sequence proceeds to a step S4-3 for awaiting the input for selecting the transmitted block.

Figure 37:
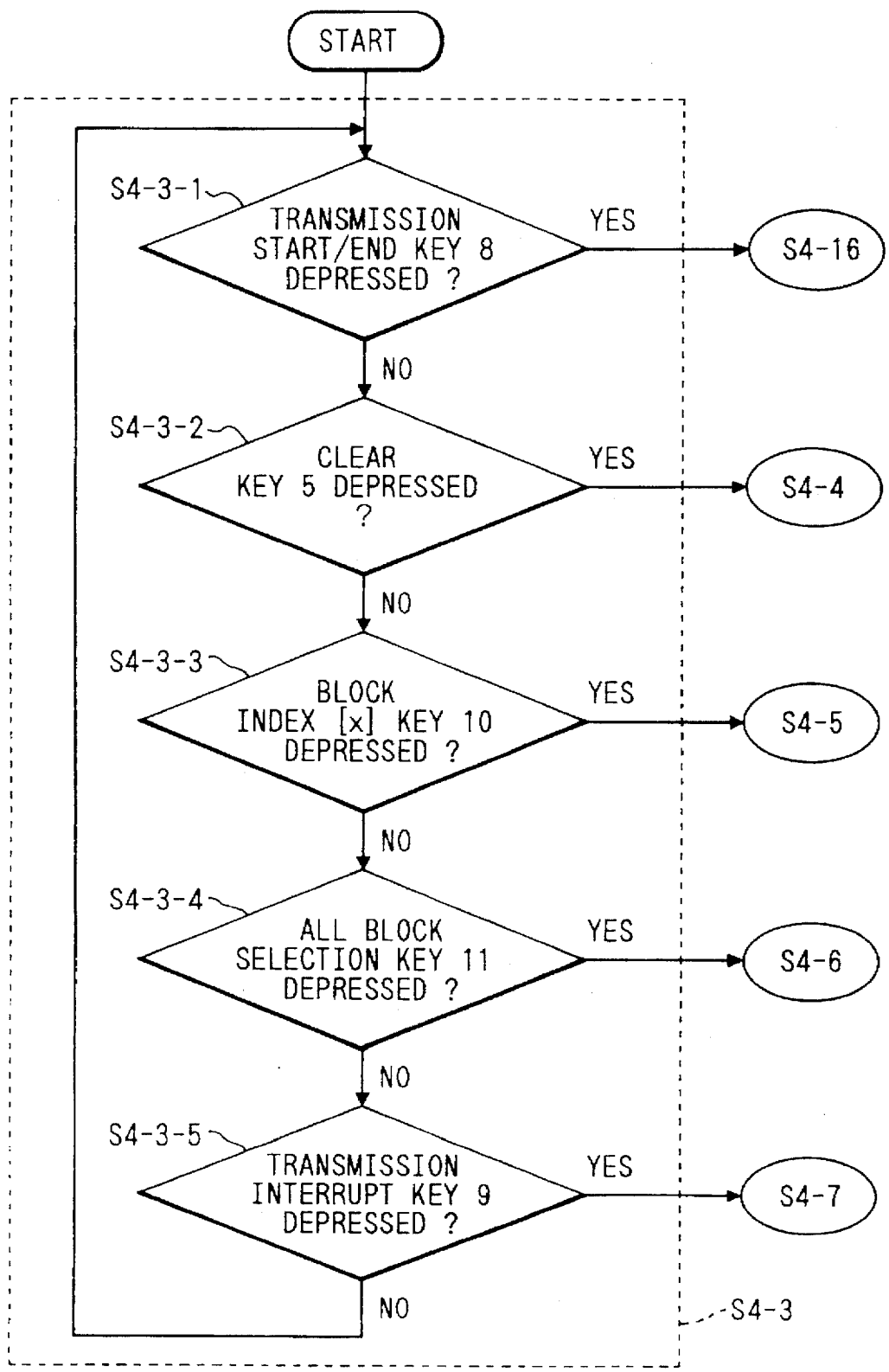
FIG. 37 is a flow chart of the control sequence in a step S4-3 for awaiting input for transmission block selection in FIG. 34.

FIG. 37 is a flow chart of the control sequence in the step S4-3 for awaiting the transmission block selecting input.

As shown in FIG. 37, said step S4-3 continues the waiting state until any of the operation instructing buttons is depressed.

If the transmission start/end button 8 is depressed (step S4-3-1), the transmission is considered to have been terminated, and the sequence proceeds to the step S4-16 to terminate the transmission operation. If the clear button 5 is depressed (step S4-3-2), the sequence proceeds to a step S4-4 to erase the transmission order table. If one of twenty block index buttons 10 is depressed (step S4-3-3), the sequence proceeds to a step S4-5 to identify the block selected for transmission (for the purpose of explanation, the block index corresponding to the block index button depressed in the step S4-3-3 is represented as "x"). If the all block button 11 is depressed (step S4-3-4), the sequence proceeds to a step S4-6 to register all the received blocks. If the interruption button 9 is depressed (step S4-3-6), the sequence proceeds to a step S4-7 to discriminate the transmission order table.

When the clear button 5 is depressed during the waiting step S4-3, the sequence proceeds to the step S4-4 to clear the transmission order table TBLOCKSEQ [i] (i=1, 2, ..., 20).

Figure 38:
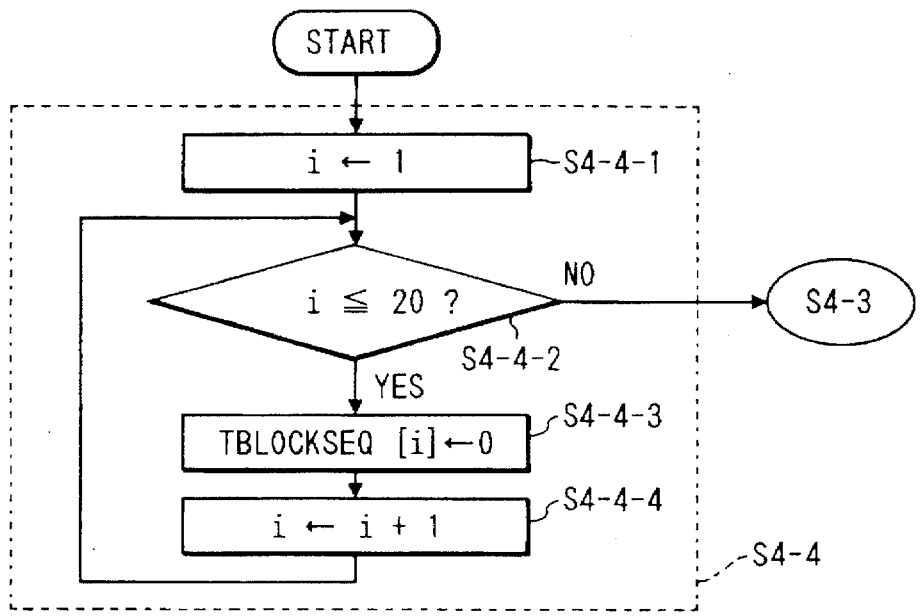
FIG. 38 is a flow chart of the control sequence in a Step S4-4 for erasing transmission order table in FIG. 34.

FIG. 38 is a flow chart of the control sequence in the transmission order table erasing step S4-4 shown in FIG. 34.

The transmission order table is cleared to "0" by executing:

TBLOCKSEQ [i]←0 (i=1, 2, ..., 20)

in steps S4-4-1 to S4-4-4. Subsequently the sequence returns to the step S4-3.

When one of the block index button 10 is depressed during the waiting state in the step S4-3, the sequence proceeds to the step S4-5 to discriminate the block index x selected for transmission.

Figure 39:
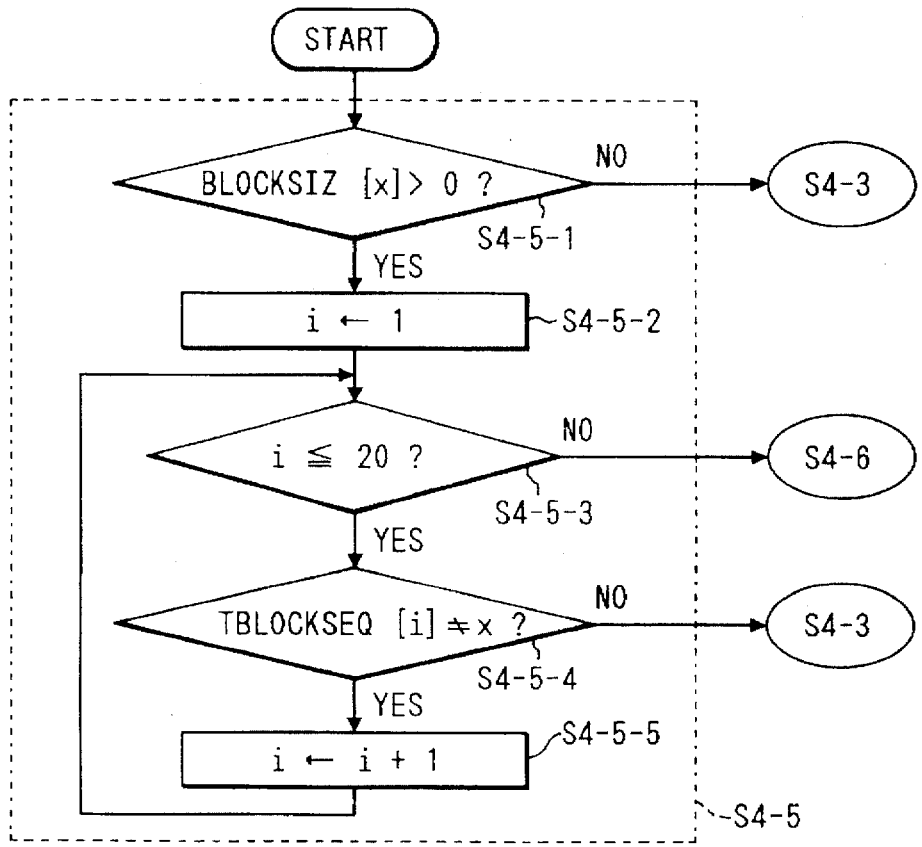
FIG. 39 is a flow chart of the control sequence in a step S4-5 for discriminating selected transmission block in FIG. 34.

FIG. 39 is a flow chart of the control sequence of the step S4-5.

As shown in FIG. 39, discrimination is made on two conditions that the data block corresponding to the block index x is already received and registered, namely the size BLOCKSIZ [x] of said data block is at least 1 byte or:

BLOCKSIZ [x]>0          (step S4-5-1)

and that said data block corresponding to the block index x is not registered for transmission, namely said data block index x is not registered in the transmission order table TBLOCKSEQ [i] (i=1, 2, ..., 20) or:

TBLOCKSEQ [i]≠x (i =1, 2, ..., 20)     (steps S4-5-2 to S4-5-5).

If either of said conditions is not satisfied, the sequence returns to the step S4-3 to await the input for selecting the transmission block.

If both conditions are satisfied, the sequence proceeds to a step S4-6 to register the block index x in the transmission order table.

Figure 40:
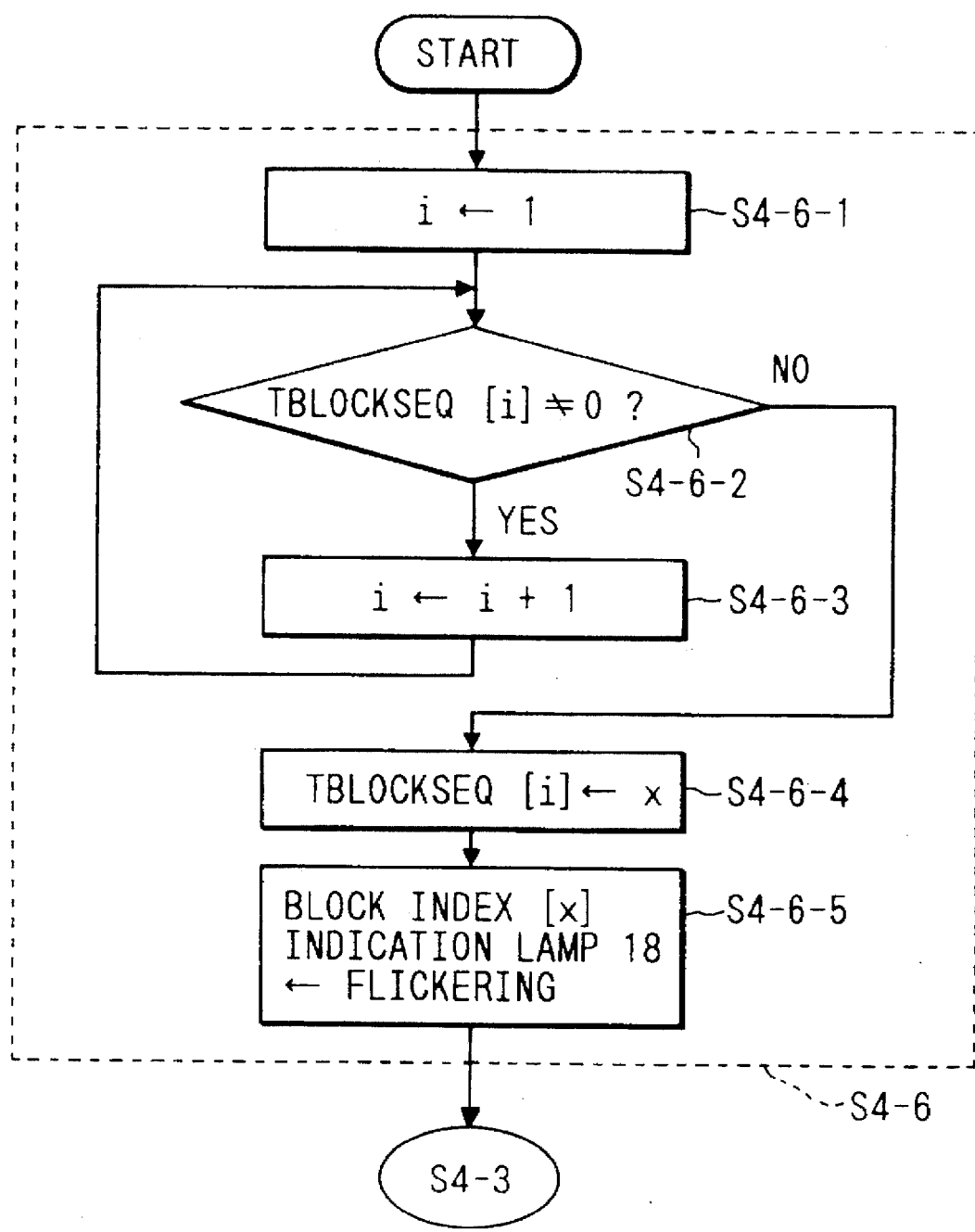
FIG. 40 is a flow chart of the control sequence in a step S4-6 for registration of selected transmission block in FIG. 34.

FIG. 40 is a flow chart of the control sequence of the step S4-6 for registering the block selected for transmission.

Said step S4-6 registers the block index x selected for transmission in the transmission order table. At first, in order to identify the sequential order of the selected block index x in the transmission, a step S4-6-1 sets "1" as the initial value for the transmission order i. Then a step S4-6-2 discriminates whether the content of an i-th area TBLOCKSEQ [i] of the transmission order table is "0". If "0", the block index x is regarded to be selected for transmission in the i-th order, and the sequence proceeds to a step S4-6-4. If not "0", a step S4-6-3 adds "1" to the order i and the discrimination of the step S4-6-2 is repeated. Successive search in the transmission order table is conducted in this manner. The search in said steps S4-6-1 to S4-6-4 always provides a value i satisfying TBLOCKSEQ [i]=0, since the number of block indexes registered in the transmission order table is identified, in the aforementioned step S4-5, as 19 or less.

The step S4-6-4 registers the block index x selected for transmission, in an i-th area of the transmission order table, namely:

TBLOCKSEQ [i]←x.

Then a step S4-6-5 turns on a block index indicator lamp 18 corresponding to the selected block index x, thereby informing the user that the data block of block index x has been selected for transmission. Subsequently the sequence returns to the step S4-3 to await the input for selecting the transmission.

When the all block selection button 11 is depressed in the waiting step S4-3, the sequence proceeds to a step S4-7 to register all the received and registered block indexes in the transmission order table.

Figure 41:
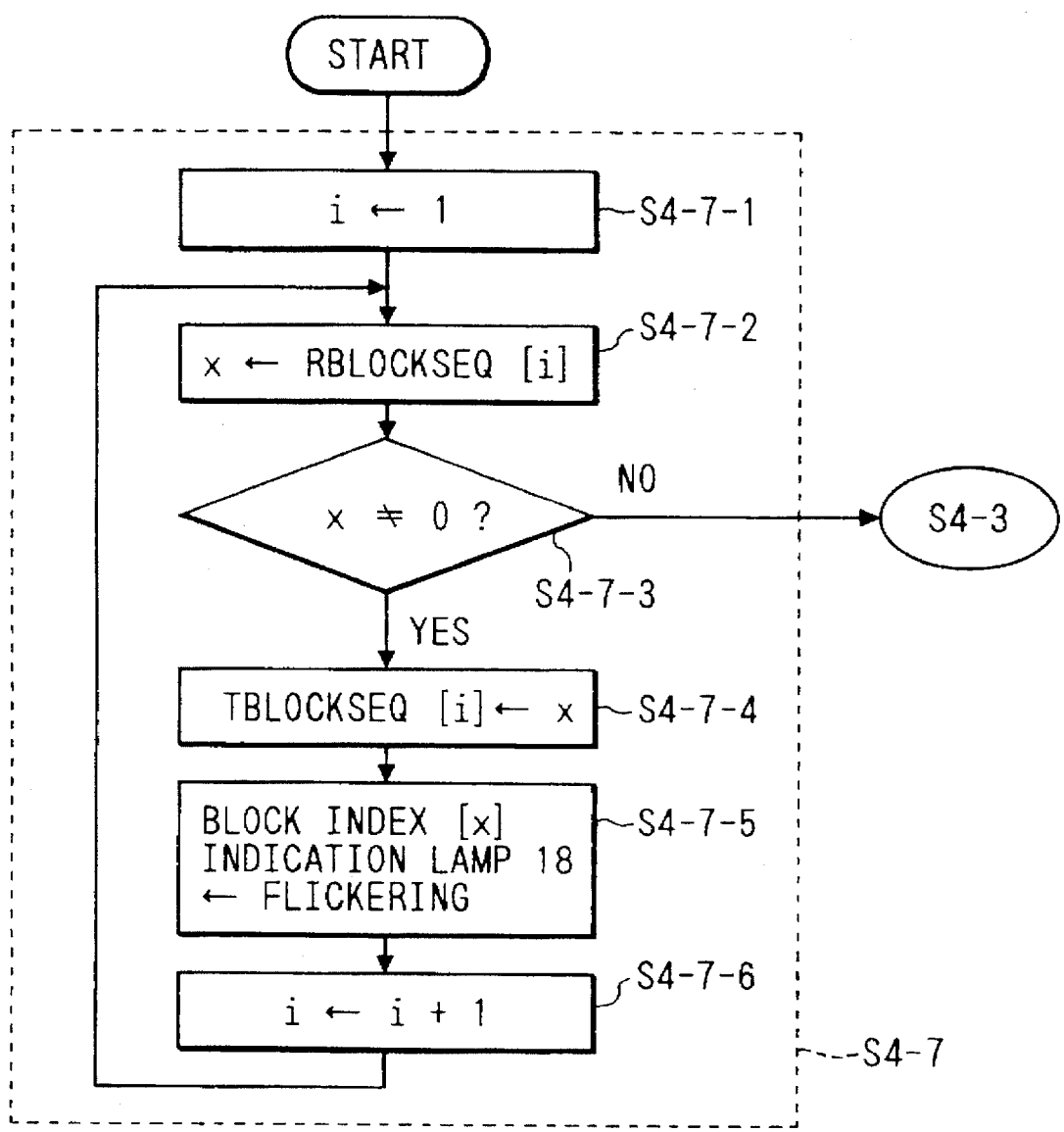
FIG. 41 is a flow chart of the control sequence in a step S4-7 for all block registration in FIG. 34.

FIG. 41 is a flow chart of the control sequence in the all block registration step S4-7 shown in FIG. 34.

As shown in FIG. 41, the content of the reception order table is copied in the transmission order table, thereby registering the received and registered block indexes in the transmission order table in the order of reception. Also the block index indicator lamps which have been turned on corresponding to all the received and registered data blocks are made to flicker, thereby informing the user that all the received and registered data blocks are selected for transmission. A step S4-7-1 sets an initial value "1" in a temporary counter "i" representing the sequence, and a step S4-7-2 reads the content of the i-th area RBLOCKSEQ [i] of the reception order table (said content being referred to as "x"). Thus the data block of the reception order i has a block index x. Then a step S4-7-3 discriminates whether the block index x, read in the step S4-7-2, is "0". If not "0", a step S4-7-4 copies the i-th area RBLOCKSEQ [i] of the reception order table in the i-th area TBLOCKSEQ [i] of the transmission order table. Subsequently a step S4-7-5 shifts a block index indicator lamp 18, corresponding to the block index x, from the turned-on state to the flickering state, then a step S4-7-6 adds "1" to the order i for selecting a next data block in the reception order, and the sequence returns to the step S4-7-2. On the other hand, the discrimination of the step S4-7-3 identifies "0", indicating the end of effective data in the reception order table, the step S4-7 is terminated. Thus the sequence returns to the step S4-3 to await the input of the input for selecting the block to be transmitted.

When the interruption button 9 is depressed in the waiting step S4-3, the sequence proceeds to a step S4-8 for discriminating whether the first area TBLOCKSEQ [1] of the transmission order table is "0", namely:

TBLOCKSEQ [1]≠0.

If this condition is satisfied, indicating that at least a block index has been registered in the transmission order table, the control sequence proceeds to a step S4-9 for effecting the transmission. On the other hand, if the above-mentioned condition is not satisfied, indicating that no block index has been registered in the transmission order table, the sequence returns to the step S4-3 for awaiting the input for selecting the block to be transmitted.

Figure 42:
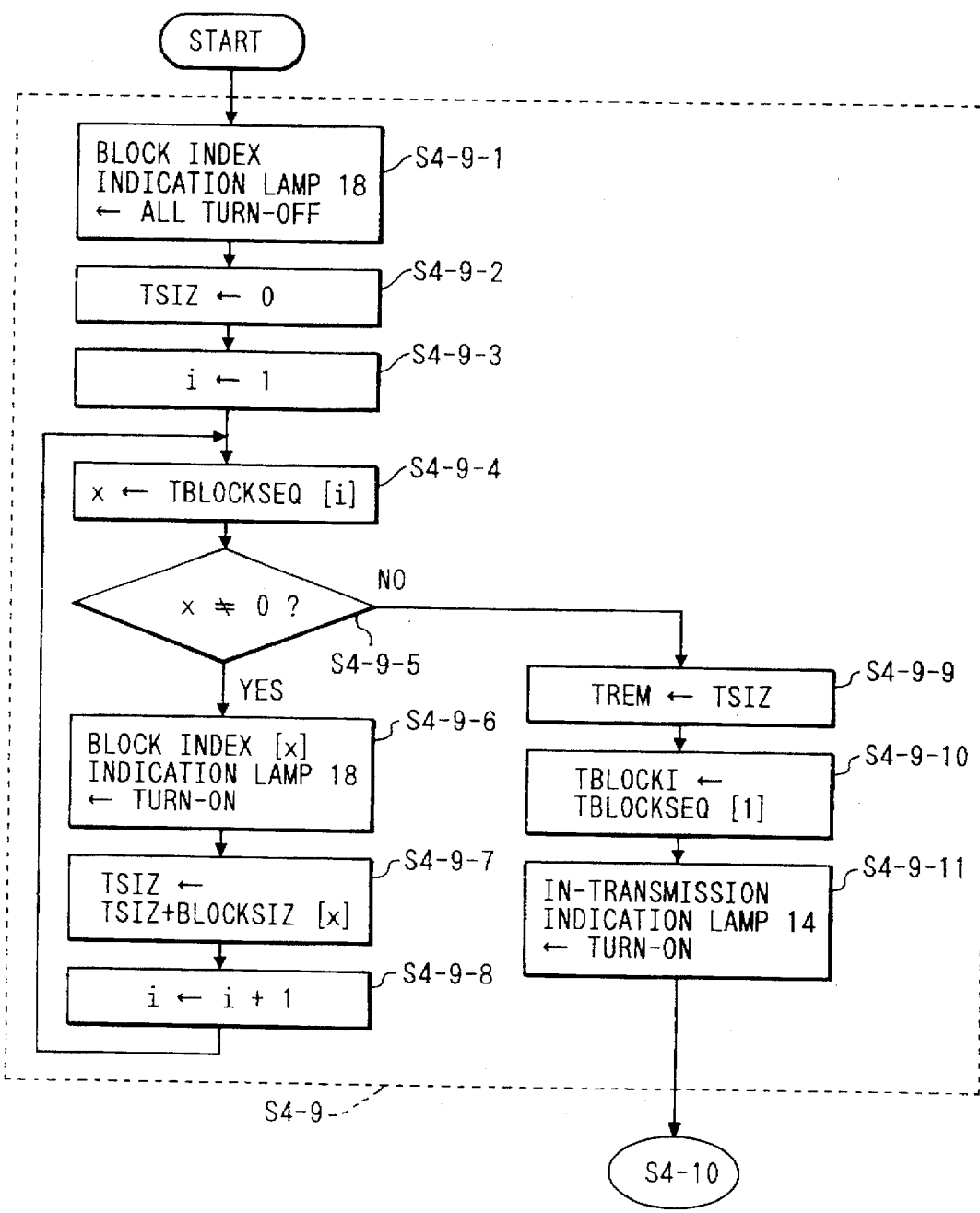
FIG. 42 is a flow chart of the control sequence in a step S4-9 for starting transmission in FIG. 34.

FIG. 42 is a flow chart of the control sequence of the transmission starting step S4-9 shown in FIG. 34.

The step S4-9 initiates the transmission operation. At first a step S4-9-1 turns off all the block index indicator lamps 18, and a step S4-9-2 clears the total size TSIZ of the transmitted data blocks to "0" Then a step S4-9-3 sets an initial value "1" in a temporary counter "i" representing the order of transmission, and a step S4-9-4 reads the content of the i-th area TBLOCKSEQ [i] of the transmission order table (said content being called x for the purpose of explanation). Thus the data block of the transmission order i has a block index x. Then a step S4-9-5 discriminates whether the block index x, read in the step S4-9-4, is "0". If not "0", a step S4-9-6 turns on a block index indicator lamp 18 corresponding to the block index x, then a step S4-9-7 adds the block size BLOCKSIZ [x] of the block index x to the total size TSIZ of the transmitted data blocks, and a step S4-9-8 adds "1" to the transmission order i for selecting a next data block. Subsequently the sequence returns to the step S4-9-4.

On the other hand, if the discrimination of the step S4-9-5 identifies "0", indicating the end of effective data in the transmission order table, the sequence proceeds to a step S4-9-9. In this manner the block index indicators 18 are turned on, corresponding to all the data blocks registered for transmission, thereby informing the user of the indexes of all the data blocks registered for transmission, and the total size of the data blocks currently registered for transmission is set in TSIZ. Then said step S4-9-9 copies the content of thus set TSIZ in the untransmitted data quantity TREM, because TSIZ=TREM as no data have been transmitted to the printer in this state. Then a step S4-9-10 sets, in the TBLOCKI, the block index of the data block to be transmitted first. More specifically, the content of the block index TBLOCKSEQ [1] of the block to be transmitted first is set as TBLOCKI. Then a step S4-9-11 turns on the flickering in-transmission indicator lamp 14, and the sequence proceeds to a step S4-10.

Figure 43B:
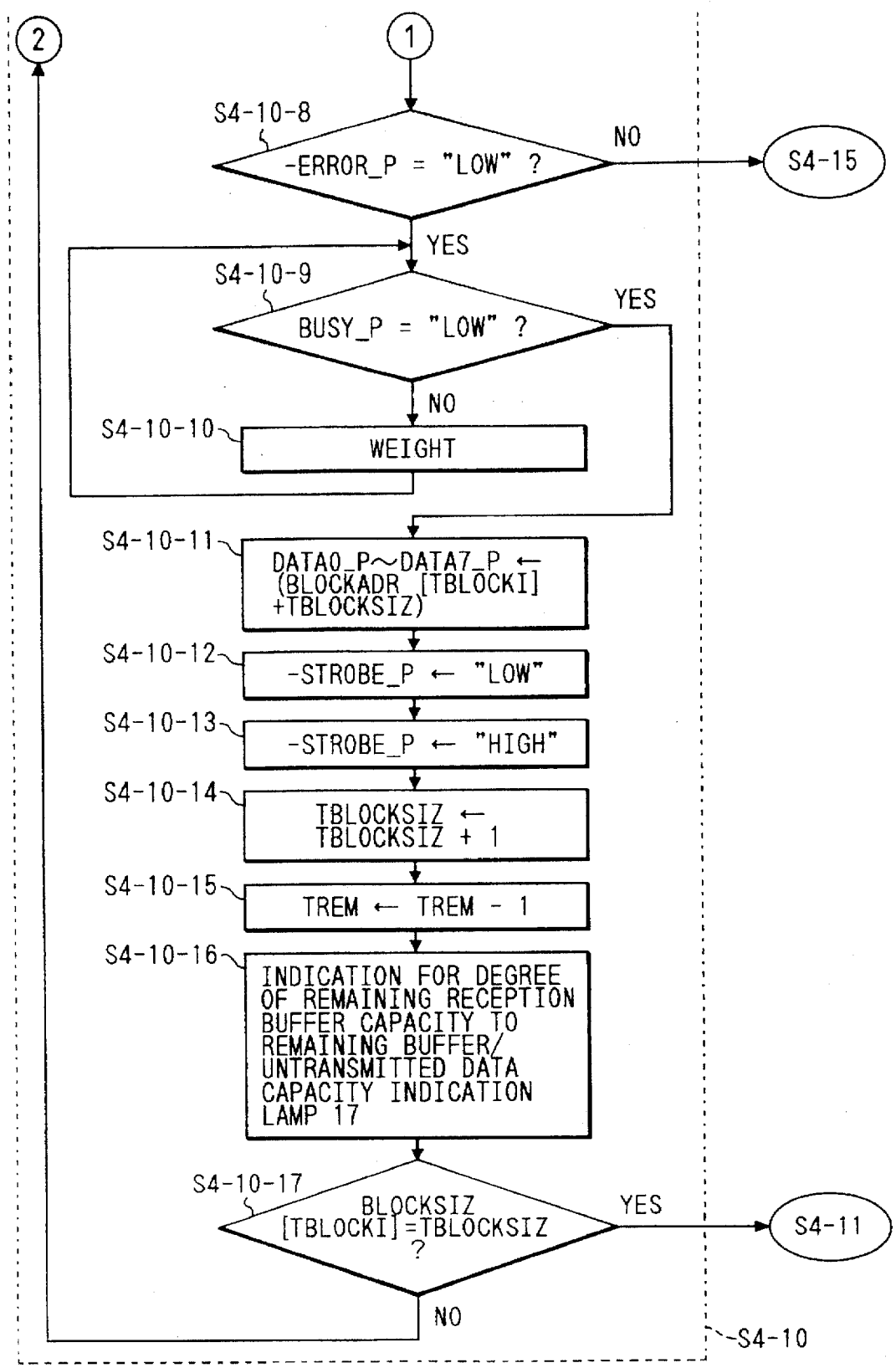

FIG. 43 is a flow chart of the control sequence of the data block transmission step S4-10 shown in FIG. 34.

Said step S4-10 effects the transmission of the data block of block index TBLOCKI. At first a step S4-10-1 adds "1" to the total number TBLOCKS of transmitted blocks, then a step S4-10-2 causes a block index indicator lamp 18 corresponding to the block index TBLOCKI to flicker, thereby informing the user that the data block of the block index TBLOCKI is in transmission, and a step S4-10-3 clears the transmitted byte number TBLOCKSIZ of the data block in transmission to "0". If the transmission start/end button 8 is depressed in this state (step S4-10-4), the transmission is regarded to have been cancelled and the sequence proceeds to a step S4-17 to terminate the transmission operation. If the interruption button 9 is depressed (step S4-10-5), the sequence proceeds to a step S4-15 to enter a state awaiting the input for interruption of transmission. If none of the buttons is depressed, the sequence proceeds to a step S4-10-6 for discriminating whether the printer, connected to the ports to printer, is in an error status, from the status of the control signal lines to printer. The conditions for said discrimination are that PE_P is in the negate state, namely:

PEP_="Low" (step S4-10-6);

that SELECT P is in the assert state, namely:

SELECT_P="High" (step S4-10-7);

and that -ERROR_P is in the assert state, namely:

-ERROR_P="Low" (step S4-10-8).

If all these conditions are satisfied, the control proceeds to a step S4-10-9. On the other hand, if any of said conditions is not satisfied, the control proceeds to the step S4-15 to enter a status awaiting the input for transmission interruption. The step S4-10-9 discriminates whether the printer, connected to the ports to printer, is in a state capable of reception, by inspecting the status of the control signal line BUSY_P of the ports to printer. If the BUSY_P in the assert state, indicating that the printer is incapable of reception, the control proceeds to a step S4-10-10 to enter a status for waiting for a unit time. Thereafter the control returns to the step S4-10-9 to repeat the discrimination. In this manner the sequence awaits that the printer becomes capable of reception. On the other hand, if the BUSY_P is in the negate state, indicating that the printer is capable of reception, the control proceeds to a step S4-10-11 to effect the data transmission.

The step S4-10-11 transmits the byte data, stored in the reception buffer, to the control signal lines DATA0_P-DATA7_P of the ports to printer. The address of the byte data to be transmitted is obtained by the sum of the start address BLOCKADR [TBLOCKI] of the data block of block index TBLOCKI currently in transmission and the number TBLOCKSIZ of transmitted bytes of the data block in transmission. Thus the address of storage of the byte data to be transmitted is represented by:

BLOCKADR [TBLOCKI]+TBLOCKSIZ, and the byte data stored in said address are sent to the control signal lines of the ports to printer.

Immediately thereafter the control signal line -STROBE_P of the ports to printer is asserted (step S4-10-12) and negated (step S4-10-13) to send a "Low" level pulse to the printer. As the transmission of data of a byte is completed, a step S4-10-14 adds "1" to the number TBLOCKSIZ of transmitted bytes of the data block in transmission, and a step S4-10-15 subtracts "1" from the untransmitted byte data quantity TREM.

A subsequent step S4-10-16 displays the percentage of the untransmitted byte data quantity TREM to the total size TSIZ of the data blocks to be transmitted, by the remaining buffer/untransmitted data capacity indicator lamps 17. Said percentage is calculated in the following manner:

When TREM=0;
Percentage of untransmitted data=0
When TREM≠0;

$$\text{Percentage of untransmitted data} = \text{integral part}\left(\frac{TREM}{TSIZ} \times 100\right) + 1$$

Then the control proceeds to a step S4-10-17 to discriminate whether the untransmitted data still remain in the data block under transmission, by comparing the size BLOCKSIZ [TBLOCKI] of the data block in the transmission with the transmitted byte number TBLOCKSIZ of the data block in transmission. If:

BLOCKSIZ [TBLOCKI]≠TBLOCKSIZ indicating that the untransmitted data still remain, the sequence returns to the step S4-10-4 to start the transmission of next byte data. On the other hand, if:

BLOCKSIZ [TBLOCKI]=TBLOCKSIZ indicating that all the data of the data block in transmission have been transmitted, the transmission of the data block is terminated and the sequence proceeds to a step S4-11 for a process for ending the data block transmission, by turning off the flickering block index indicator lamp 18 corresponding to the block index TBLOCKI, thereby informing the user that the transmission of the data block of block index TBLOCKI has been completed.

Subsequently the sequence proceeds to a step S4-12 for selecting a data block for next transmission.

Figure 44:
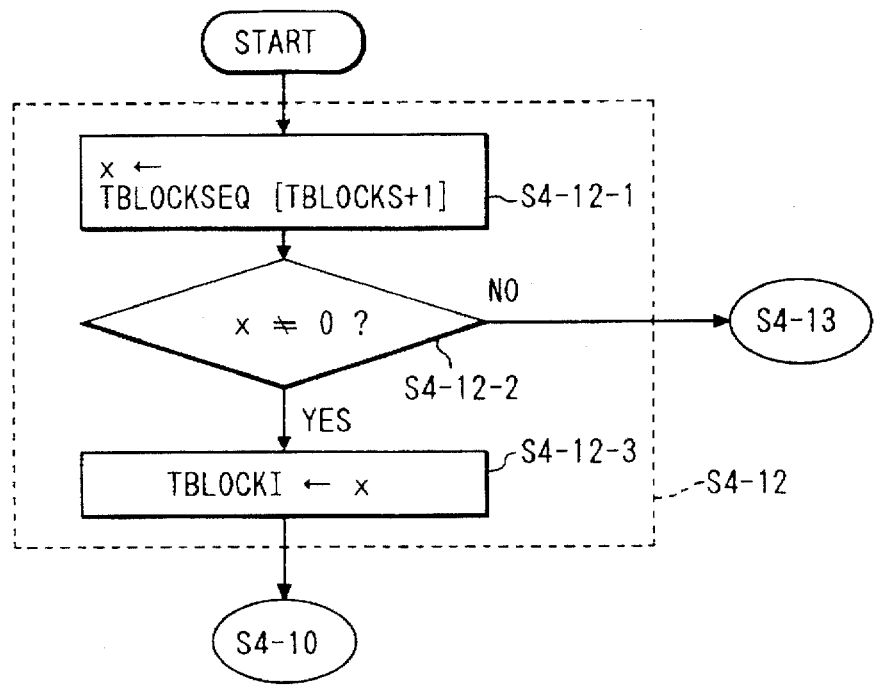
FIG. 44 is a flow chart of the control sequence of a step S4-12 for next block selection in FIG. 34.

FIG. 44 is a flow chart of the control sequence of the next block selecting step S4-12 shown in FIG. 34.

At first a step S4-12-1 reads the content of the (TBLOCKS+1)-th area TBLOCKSEQ [TBLOCKS+1] of the transmission order table (said content being represented as x for the purpose of explanation). Then a step S4-12-2 discriminates whether the read block index is "0". If said content is not "0", signifying that x is the index of the data block to be transmitted next, the sequence proceeds to a step S4-12-3 for storing the block index x in the TBLOCKI representing the index of the data block to be transmitted. Subsequently the sequence returns to the step S4-10 to start the transmission of next data block. On the other hand, if the discrimination of the step S4-12-2 identifies that x is "0", indicating that all the data blocks registered in the transmission order table have been transmitted so that no data block is present for next transmission, the sequence proceeds to the step S4-13 to enter a state for awaiting the input for interruption of transmission.

Figure 45:
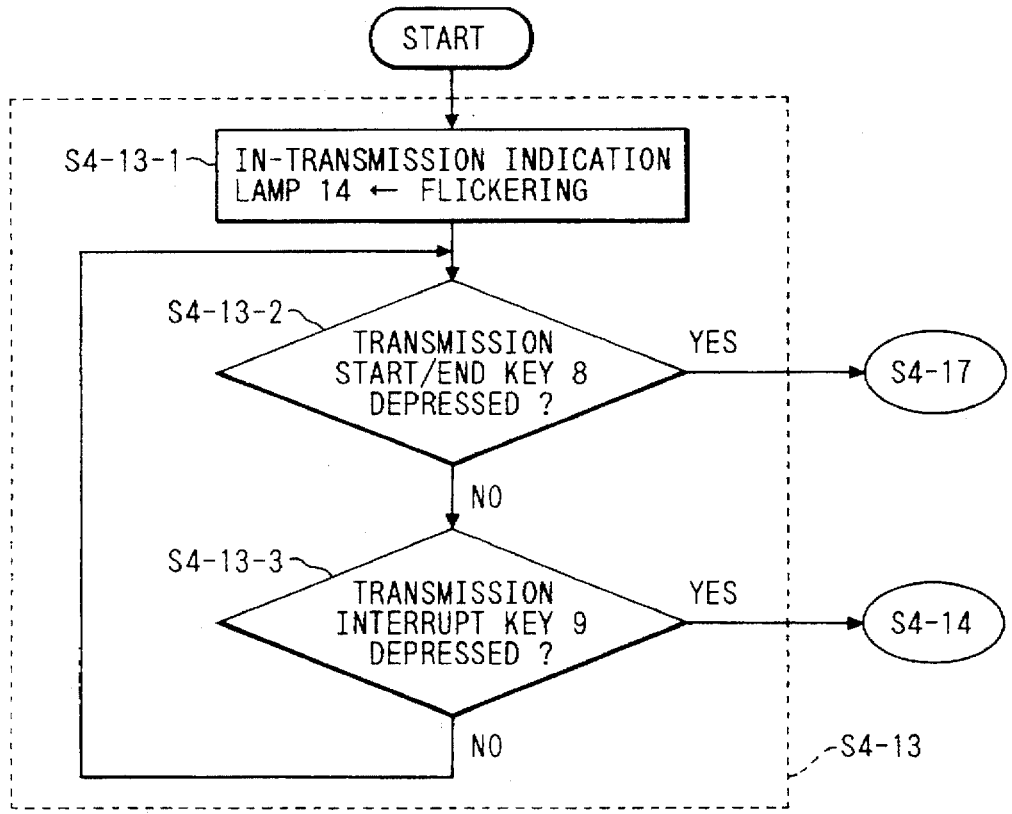
FIG. 45 is a flow chart of the control sequence of a step S4-13 for awaiting input for interrupting transmission in FIG. 34.

FIG. 45 is a flow chart of the control sequence of the step S4-13 for awaiting the input for interrupting transmission, shown in FIG. 34.

At first a step S4-13-1 shifts the transmission indicator lamp 14 from the turned-on state to the flickering state, thereby informing the use that the transmission operation is interrupted, and the sequence then waits until any of the operation instructing buttons is depressed. If the transmission start/end button 8 is depressed (step S4-13-2), the transmission operation is regarded to be interrupted and terminated, and the sequence proceeds to the step S4-17. If the interruption button 9 is depressed (step S4-13-3), the control proceeds to the step S4-14 for preparing for re-transmission.

Figure 46:
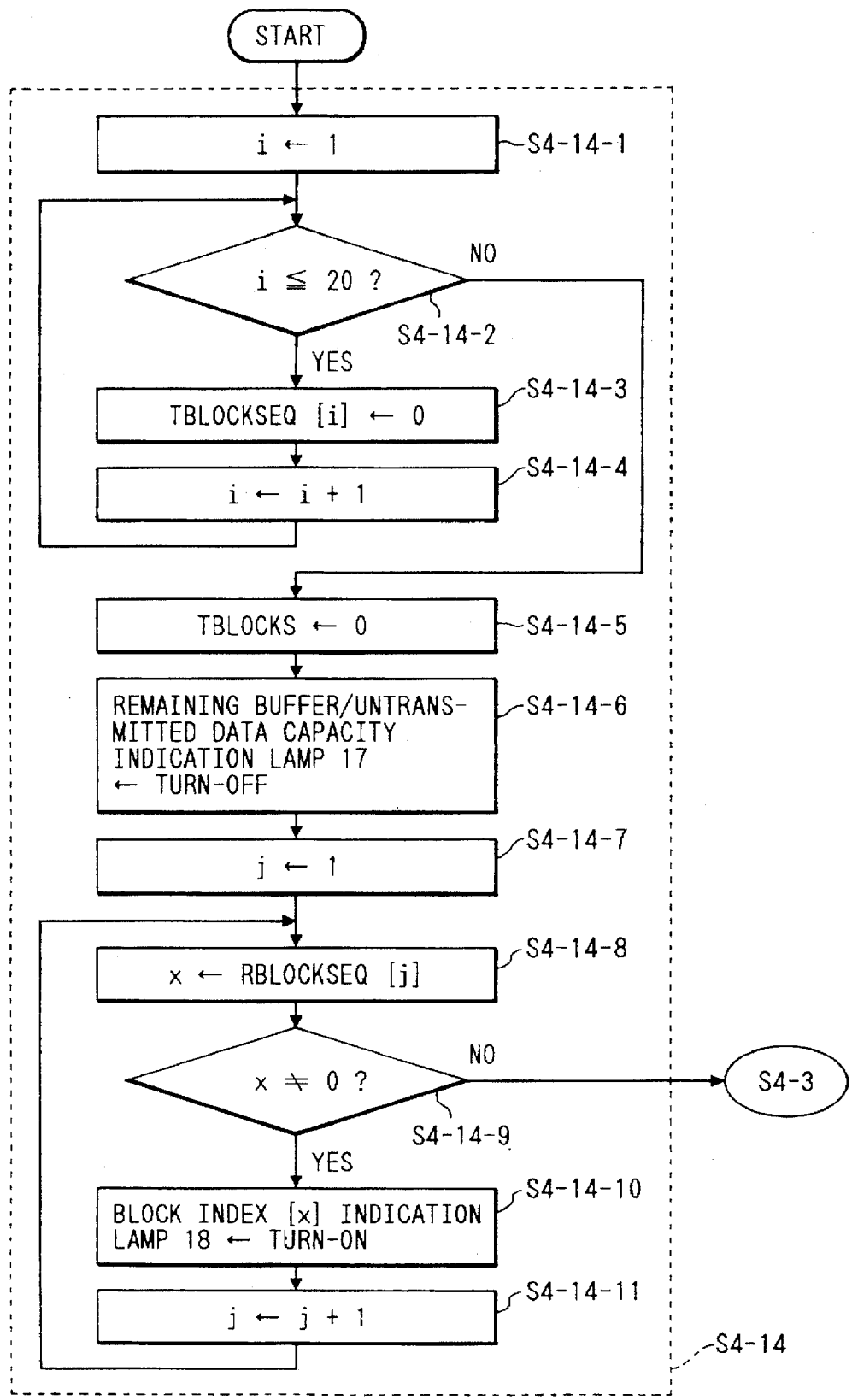
FIG. 46 is a flow chart of the control sequence of a step S4-14 for re-transmission preparation in FIG. 34.

FIG. 46 is a flow chart of the control sequence of the re-transmission preparation step S4-14 shown in FIG. 34.

As shown in FIG. 46, the transmission order table is cleared to "0" by executing:

TBLOCKSEQ [i]←0 (i=1, 2, ... , 20)

in steps S4-14-1 to S4-14-4. Then a step S4-14-5 clears the total number TBLOCKS of the transmitted data blocks to "0", and a step S4-14-6 turns off the remaining buffer/ untransmitted data capacity indicator lamps 17. Then steps S4-14-7 to S4-14-10 turn on the block index indicator lamps corresponding to all the currently received and registered data blocks, thereby informing the user of the indexes of all the received and registered data blocks. More specifically, the step S4-14-7 sets an initial value "1" in a temporary counter "j" representing the order of reception, and a step S4-14-8 reads the content of the j-th area RBLOCKSEQ [j] of the reception order table (said content being called x for the purpose of explanation). Thus the data block of the order j of reception has a block index x. Then a step S4-14-9 discriminates whether the block index, read in the step S4-14-8, is "0". If not "0", the sequence proceeds to a step S4-14-10 to turn on the block index indicator lamp 18 corresponding to the block index x. Then a step S4-14-11 adds "1" to the order j of reception, in order to select a data block of next order of reception, and the sequence returns to the step S4-14-8. On the other hand, if the step S4-14-9 identifies that x is "0", signifying the end of effective data in the reception order table, the step S4-14 is terminated and the sequence returns to the step S4-3 to enter a status for awaiting the input for selecting transmission.

If the interruption button 9 is depressed in the data block transmission step S4-10 or if an error status is detected in the printer connected to the ports to printer in said step S4-10, the sequence proceeds to the step S4-15 to enter a status for awaiting the input in transmission interruption.

Figure 47:
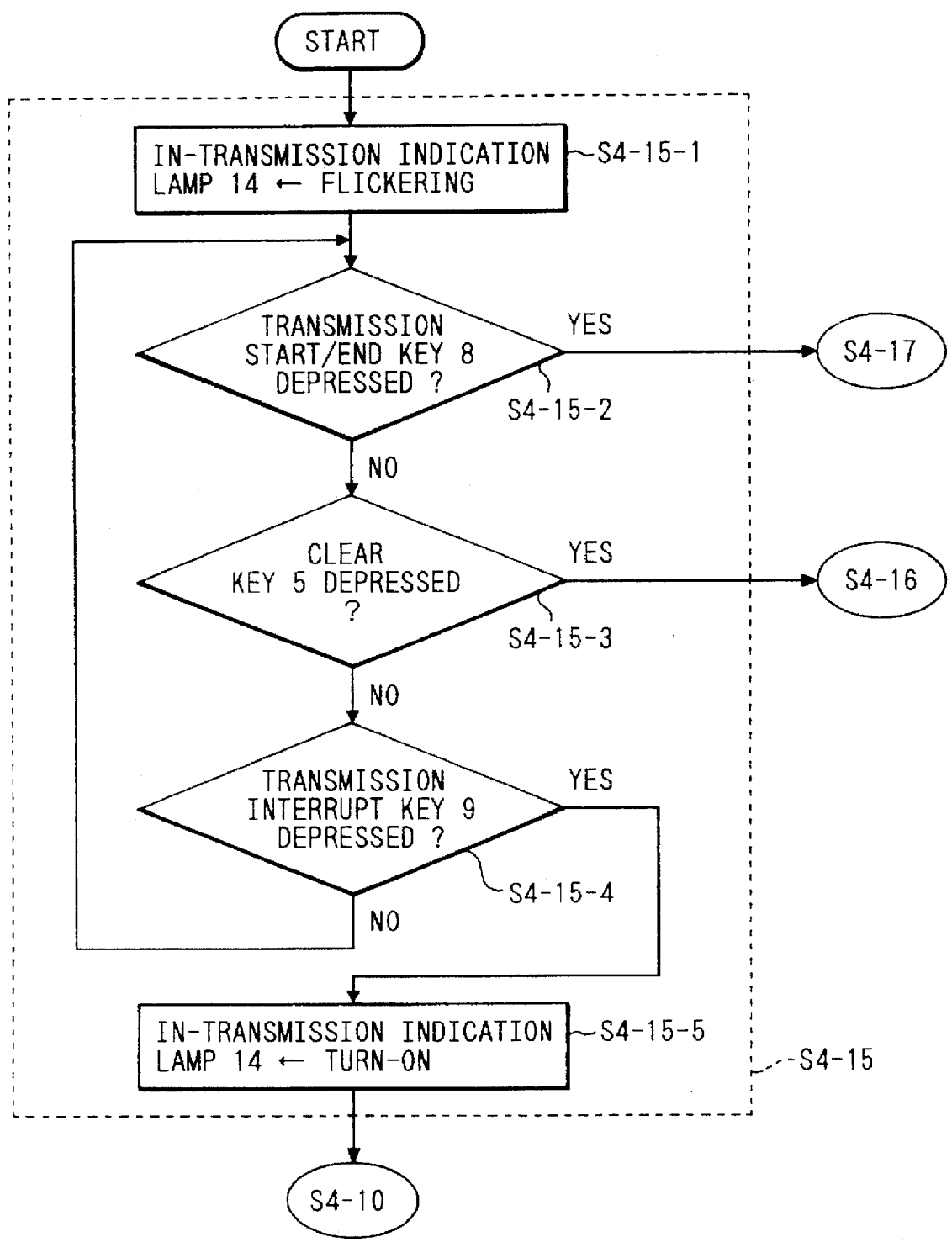
FIG. 47 is a flow chart of the control sequence of a step S4-15 for awaiting input for interrupting transmission in FIG. 34.

FIG. 47 is a flow chart of the control sequence of the step S4-15 for awaiting the input for transmission interruption.

At first a step S4-15-1 shifts the in-transmission indicator lamp 14 from the turned-on state to the flickering state, thereby informing the user that the transmission is interrupted, and the sequence then waits until any of the operation buttons is depressed. If the transmission start/end button 8 is depressed in this state (step S4-15-2), the transmission is regarded to be interrupted and terminated, and the sequence proceeds to a step S4-17. If the clear button 5 is depressed (step S4-15-3), the sequence proceeds to a step S4-16, thereby skipping the transmission of a data block of which transmission is interrupted. If the interruption button 9 is depressed (step S4-15-4), the sequence proceeds to a step S4-15-5 for turning on the flickering in-transmission indicator lamp 14, and the sequence then proceeds to the step S4-10 in order to re-start the transmission of the data block of which transmission has been interrupted.

If the clear button 5 is depressed in the step S4-15 for awaiting the input in transmission interruption, the sequence proceeds to the step S4-16 to skip the transmission of the data block of which transmission has been interrupted. Said skipping is conducted by calculating the number of bytes of the untransmitted data in said block of which transmission has been interrupted, and subtracting said number from the untransmitted data quantity TREM.

The quantity of untransmitted data in said data block of which transmission has been interrupted can be obtained by subtracting the number TBLOCKSIZ of transmitted bytes of the interrupted data block from the size BLOCKSIZ [TBLOCKI] thereof, namely by a calculation:

BLOCKSIZ [TBLOCKI]-TBLOCKSIZ.

Therefore the above-explained operation can be represented as:

TREM ←TREM−(BLOCKSIZ [TBLOCKI]−TBLOCKSIZ).

Thereafter the sequence proceeds to the step S4-10, thereby re-starting the transmission of the data block of which transmission has been interrupted.

In case the transmission start/end button 8 is depressed in the aforementioned data block transmission step S4-10, or in the step S4-13 for awaiting input after transmission interruption, or in the step S4-15 for awaiting input after transmission interruption, the sequence proceeds to the step S4-17 to suspend the transmission.

Figure 48:
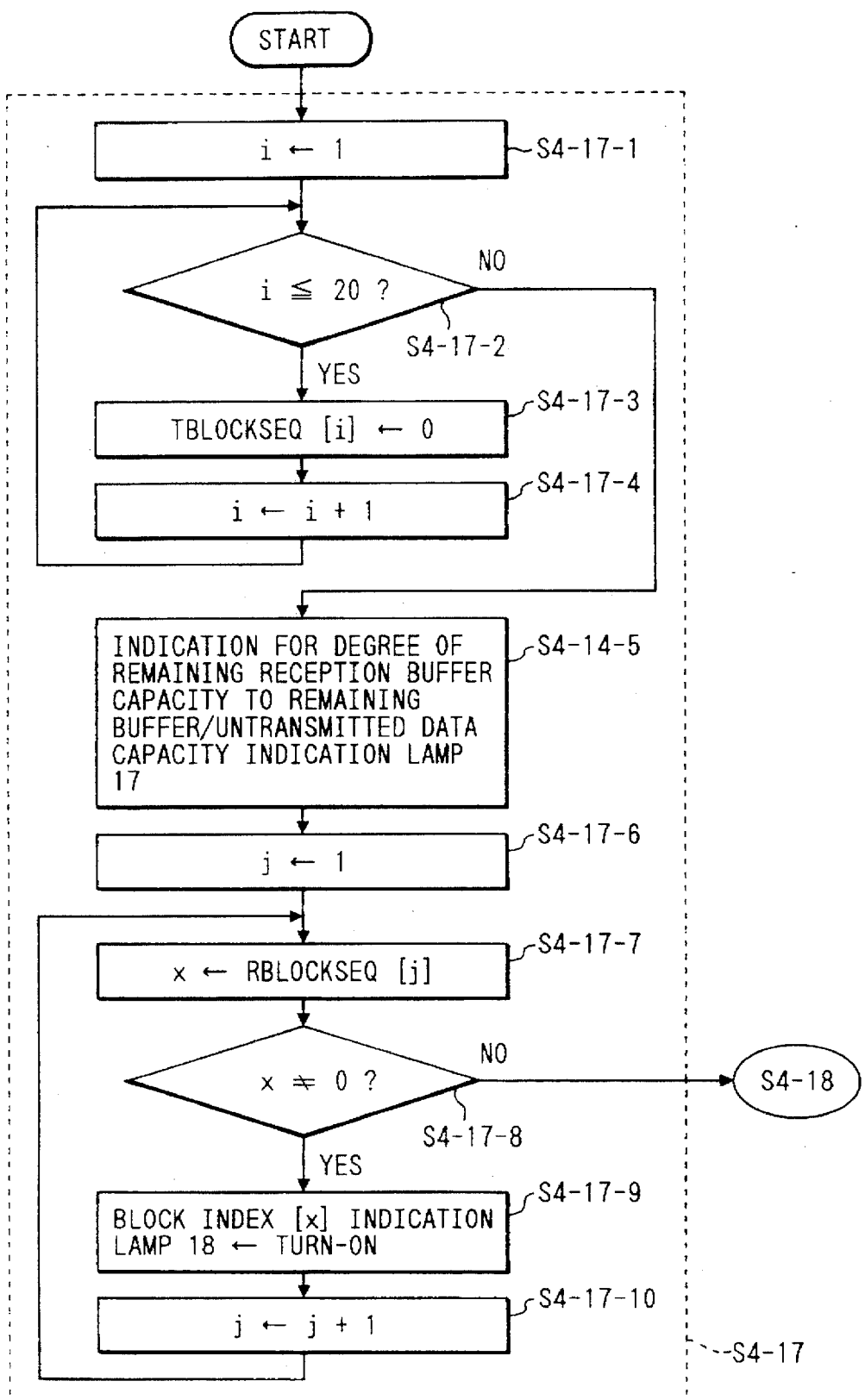
FIG. 48 is a flow chart of the control sequence of a step S4-17 for transmission suspension in FIG. 34.

FIG. 48 is a flow chart of the control sequence of the transmission suspension step S4-17 shown in FIG. 34.

As shown in FIG. 48, at first the transmission order table is cleared to "0" by executing:

TBLOCKSEQ [i]←0 (i =1, 2, ..., 20)

in steps S4-17-1 to S4-17-4. Then a step S4-17-5 displays the percentage of the remaining reception buffer capacity RREM to the reception buffer size UMEM, by the remaining buffer/untransmitted data capacity indicator lamps 17. Said percentage can be calculated in the same manner as in the aforementioned reception step S3-3-13. Then steps S4-17-6 to S4-17-10 turn on the block index indicator lamps corresponding to all the currently received and registered data blocks, thereby informing the user of the indexes of all the received and registered data blocks. This process is identical with that in the steps S4-14-7 to S4-14-11 in the re-transmission preparation step S4-14. Subsequently the sequence proceeds to a step S4-18 for turning off the in-transmission indicator lamp 14, whereby all the transmission operation is terminated.

FIG. 49 shows the outline of the step S5 for selective clearing of data blocks, shown in FIG. 14. In the selective clearing step S5, a step S5-1 at first discriminates the number of registered blocks. As the selective clearing step S5 explained in the following is conducted on the received and registered data blocks, there is required at least a registered block. Therefore said discrimination step S5-1 discriminates whether the number RBLOCKS of the registered blocks satisfies:

RBLOCKS >0 and, if this condition is satisfied, the sequence proceeds to a step S5-2, but, if said condition is not satisfied, the selective clearing step S5 is terminated.

Figure 50:
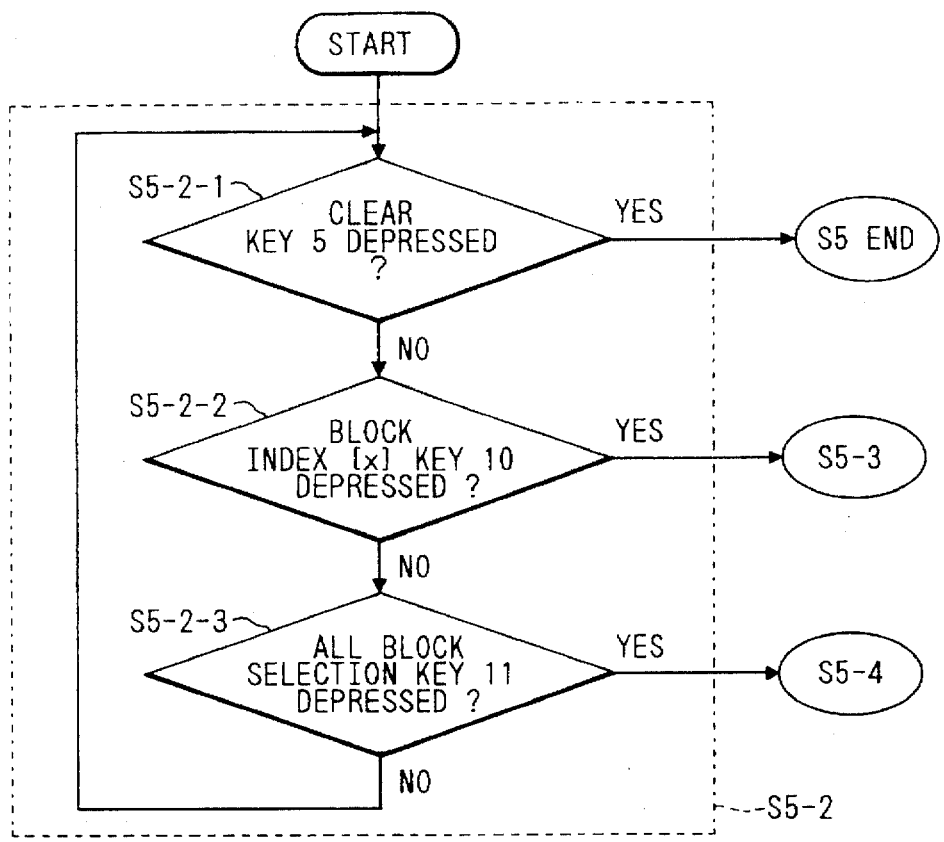
FIG. 50 is a flow chart of the control sequence of a step S5-2 for awaiting input of block index in FIG. 49.

FIG. 50 is a flow chart of the control sequence of the step S5-2 for awaiting input of block index.

The step S5-2 is a status awaiting the input of the index of a block to be erased, and, as shown in FIG. 50, waits until any of the operation instruction buttons is depressed. If the clear button 5 is depressed (step S5-2-1), said depression is regarded an instruction for terminating the selective clearing of data block, and the step S5 is immediately terminated. If one of twenty block index buttons 10 is depressed (step S5-2-2), the sequence proceeds to a step S5-3 (the block index corresponding to the block index button 10 depressed in the step S5-2-2 is represented by x for the purpose of explanation). If the all block selection button 11 is depressed (step S5-2-3), the sequence proceeds to a step S5-4.

The step S5-3 discriminates whether the data block, corresponding to the block index x entered by the block index button 10 in said step S5-2, has been registered, by checking whether the size BLOCKSIZ [x] of said data block is at least equal to 1 byte. Thus, if a condition:

BLOCKSIZ [x]<0 indicating that the data block of block index x has been registered, the sequence proceeds to a step S5-5 for effecting the erasure. On the other hand, if said condition is not satisfied, indicating that the data block of block index x has not been registered, the sequence returns to the step S5-2 for awaiting the input of block index.

The step S5-5 shifts the block index indicator lamp 18 from the turned-on state to the flickering state, thereby informing the user that the data block of block index x is selected for erasure. Thereafter the sequence proceeds to a step S5-6.

Figure 51:
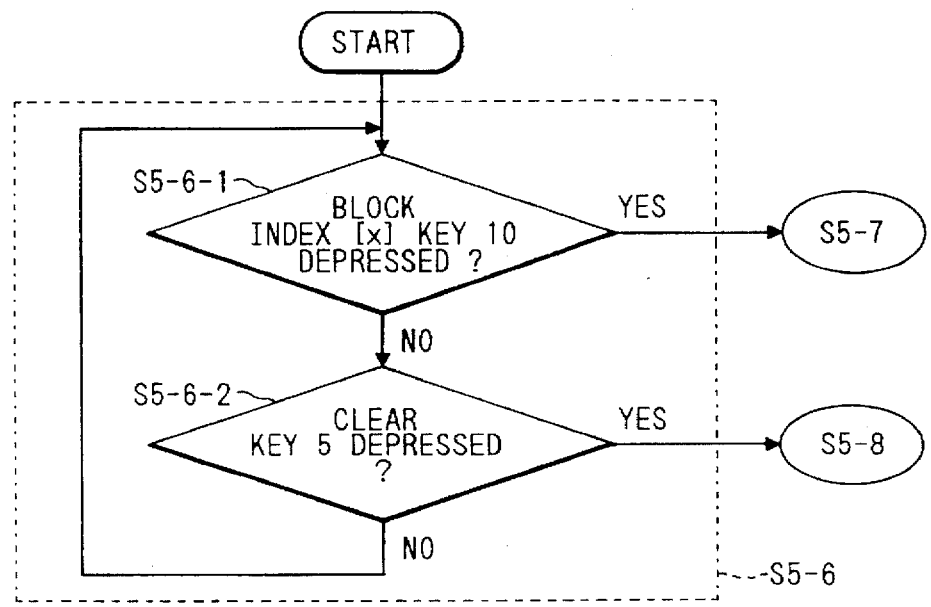
FIG. 51 is a flow chart of the control sequence of a step S5-6 for awaiting confirmation of erasure in FIG. 49.

FIG. 51 is a flow chart of the control sequence of the step S5-6 for awaiting erasure confirmation, shown in FIG. 49.

The step S5-6 is for awaiting confirmation for erasure, and continues the waiting state until the block index button 10 corresponding to the block index x or the clear button 5 is depressed. If the block index button 10 of block index x is depressed (step S5-6-1), said depression is regarded as an instruction for cancelling the erasure of the data block of block index x, and the sequence proceeds to a step S5-7. If the clear button 5 is depressed (step S5-6-2), said depression is regarded as an instruction for execution of erasure of the data block of block index x, and the sequence proceeds to a step S5-8.

The step S5-7 turns on the flickering block index indicator lamp 18 corresponding to the block index x, thereby informing the user that the data block of block index x is no longer selected for erasure, and the sequence returns to the step S5-2 for awaiting the input of block index.

When the clear button 5 is depressed in the step S5-6 for awaiting the confirmation for erasure, the sequence proceeds to a step S5-8 for effecting the erasure of the data block of block index x.

Figure 52B:
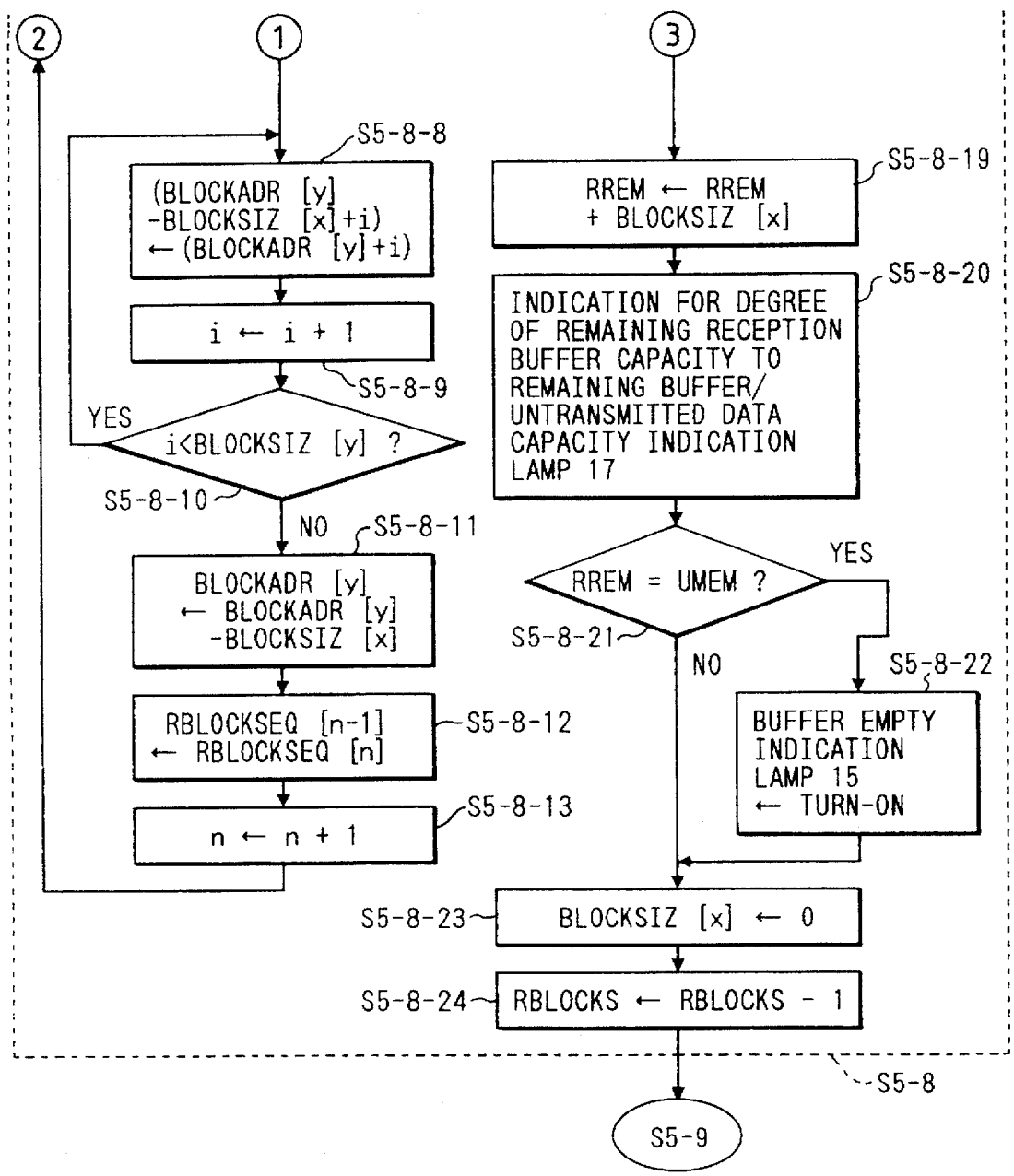

FIG. 52 is a flow chart of the control sequence of the data block erasing step S5-8 shown in FIG. 49.

At first, in order to identify the order (m-th) of reception, after the start of reception, of the data block of block index x selected for erasure, a step S5-8-1 sets "1" as an initial value for said order m of reception to be determined. Then a step S5-8-2 discriminates whether the content of m-th area RBLOCKSEQ [m] of the reception order table coincides with the block index x selected for erasure, and, in case of coincidence, indicating that m is the order of reception of the data block of block index x, the sequence proceeds to a step S5-8-4. In case of non-coincidence, a step S5-8-3 adds "1" to the order m and the step S5-8-2 repeats the discrimination, thereby searching the reception order table in succession. Said steps S5-8-1 to S5-8-3 always provide an order m of reception for the data block of block index x, since the aforementioned discrimination step S5-3 already identified that the data block of block index x was registered. A succeeding step S5-8-4 forms a temporary counter "n" representing the order of reception for certain data blocks received after the data block of block index x and sets an initial value "m+1" therein, as a preparation for a procedure down to a step S5-8-13 for displacing the storage positions of such later received data blocks toward the storage area of said data block of block index x to be erased. The maximum possible value of said reception order n is the total number RBLOCKS of the data blocks currently registered in the reception buffer, namely:

m+1<n<RBLOCKS.

In case the data block of block index x is the last in the reception order, namely in case:

m=RBLOCKS the procedure of correction of storage positions explained in the following is unnecessary, because there are no data blocks after the data block of index x in the order of reception. A step S5-8-5 discriminates whether the correction of storage positions of data blocks is necessary, by checking whether the order n of reception is less than the number RBLOCKS of registered blocks. The sequence proceeds to a step S5-8-6 or S5-8-14, respectively if said discrimination turns out affirmative or negative. In the above-explained case in which the data block of block index x to be erased is the last in the order of reception, the discrimination of the step S5-8-5 provides a negative result so that the sequence immediately proceeds to the step S5-8-14.

A step S5-8-6 reads the content of the n-th area RBLOCK-SEQ [n] of the reception order table, in order to obtain the block index "y" given to the data block of reception order n. Then a step S5-8-7 forms a temporary counter "i" for counting the stored bytes of the data block of block index y of the reception order n, and sets an initial value "0" therein. A next step S5-8-8 transfers the byte data, constituting the data block of block index y, toward the lower address in the reception buffer, by an amount corresponding to the size BLOCKSIZ [x] of the data block of block index x to be erased. The address of storage of the byte data to be transferred is obtained by the sum of the start address BLOCKADR [y] of the data block of block index y and the counter i, namely by:

BLOCKADR [y]+i and the new storage address (destination address) is obtained by subtracting, from the above-mentioned address, the size BLOCKSIZ [x] of the data block of block index x to be erased, namely by:

BLOCKADR [y]-BLOCKSIZ [x]+i.

Then a step S5-8-9 adds "1" to the counter i in order to address the next byte data, and a step S5-8-10 discriminates whether the counter is the less than the size BLOCKSIZ [y] of the data block of block index y in order to identify whether all the byte data constituting the data block of block index y have been transferred. If said discrimination turns out affirmative, indicating that byte data to be transferred still remain, the sequence returns to the step S5-8-8 for effecting the byte data transfer. If said discrimination turns out negative, indicating that all the byte data have been transferred, the sequence proceeds to a step S5-8-11. Said step S5-8-11 resets the start address BLOCKADR [y] of the transferred data block of block index y, by subtracting the size BLOCKSIZ [x] of the erased data block of block index x. A succeeding step S5-8-12 reduces the reception number, by one in the reception order table, of the transferred data block of block index y, namely:

RBLOCKSEQ [n-1]+RBLOCKSEQ [n].

The above-explained steps S5-8-6 to S5-8-12 have completed the correction of storage position of a data block of reception order n, that was received later than the erased data block of block index x. Then, in order to effect correction of the storage position of a data block positioned next in the order of reception, a step S5-8-13 adds "1" to the reception order n and the sequence returns to the step S5-8-5. Upon completion of corrections of storage positions for all the data blocks down to the last block in the order of reception, the discrimination of the step S5-8-5 turns out negative so that the sequence proceeds to the step S5-8-14. In case the erased data block of block index x is last in the order of reception, or after the above-explained correction of storage position for all the data blocks later than the erased data block of block index x in the order of reception, the sequence proceeds to the step S5-8-14, which clears an area RBLOCKSEQ [REBLOCKS] of the reception order table, which has stored the block index of the last data block in the reception order and has become empty. Then a step S5-8-15 discriminates whether the current remaining buffer capacity RREM is larger than zero, in order to identify whether the buffer full status has been avoided by the erasure of the data block of block index x. If said discriminations turns out affirmative, indicating that the buffer full status was not present even before the erasure of the data block of block index x, the sequence proceeds to a step S5-8-19. If said discrimination turns out negative, indicating that the buffer full status is prevented by the erasure of the data block of block index x, the sequence proceeds to steps S5-8-16 and S5-8-17 for respectively negating the control signal lines to computer -ERROR_C and PE_C, thereby informing the computer that the printer buffer has avoided the "paper empty" status. Then a step S5-8-18 turns off the buffer full indicator lamp 16, thereby informing the user that the buffer full status no longer exists, and the sequence then proceeds to the step S5-8-19. The step S5-8-19 resets the remaining buffer capacity RREM by adding the size BLOCKSIZ [x] of the data block of block index x to be erased. Then a step S5-8-19 displays the percentage of the remaining buffer capacity RREM, corrected in the step S5-8-19, to the reception buffer size UMEM, by the remaining buffer/untransmitted data capacity indicator lamps 17. A succeeding step S5-8-21 identifies whether the buffer empty status is reached by the correction of the remaining buffer capacity RREM in the step S5-8-19, by discriminating whether the remaining buffer capacity RREM is equal to the reception buffer size UMEM. If affirmative, indicating the buffer empty status, a step S5-8-22 turns on the buffer empty indicator lamp 15 and the sequence proceeds to a step S5-8-23. If negative, the sequence immediately proceeds to the step S5-8-23. Said step S5-8-23 clears the size BLOCKSIZ [x] of the data block of block index x, selected for erasure, to "0" in order to effect the erasure of said data block. Then a step S5-8-24 subtracts "1" from the number RBLOCKS of the registered blocks, whereupon the data block erasing step S5-8 is terminated and the sequence proceeds to a step S5-9.

Upon completion of the erasure of the data block of block index x in the step S5-8, the step S5-9 turns off the flickering block index indicator lamp 18 corresponding to the block index x, thereby informing the user of the erasure of the data block of block index x, and the sequence proceeds to a step S5-10.

Figure 53:
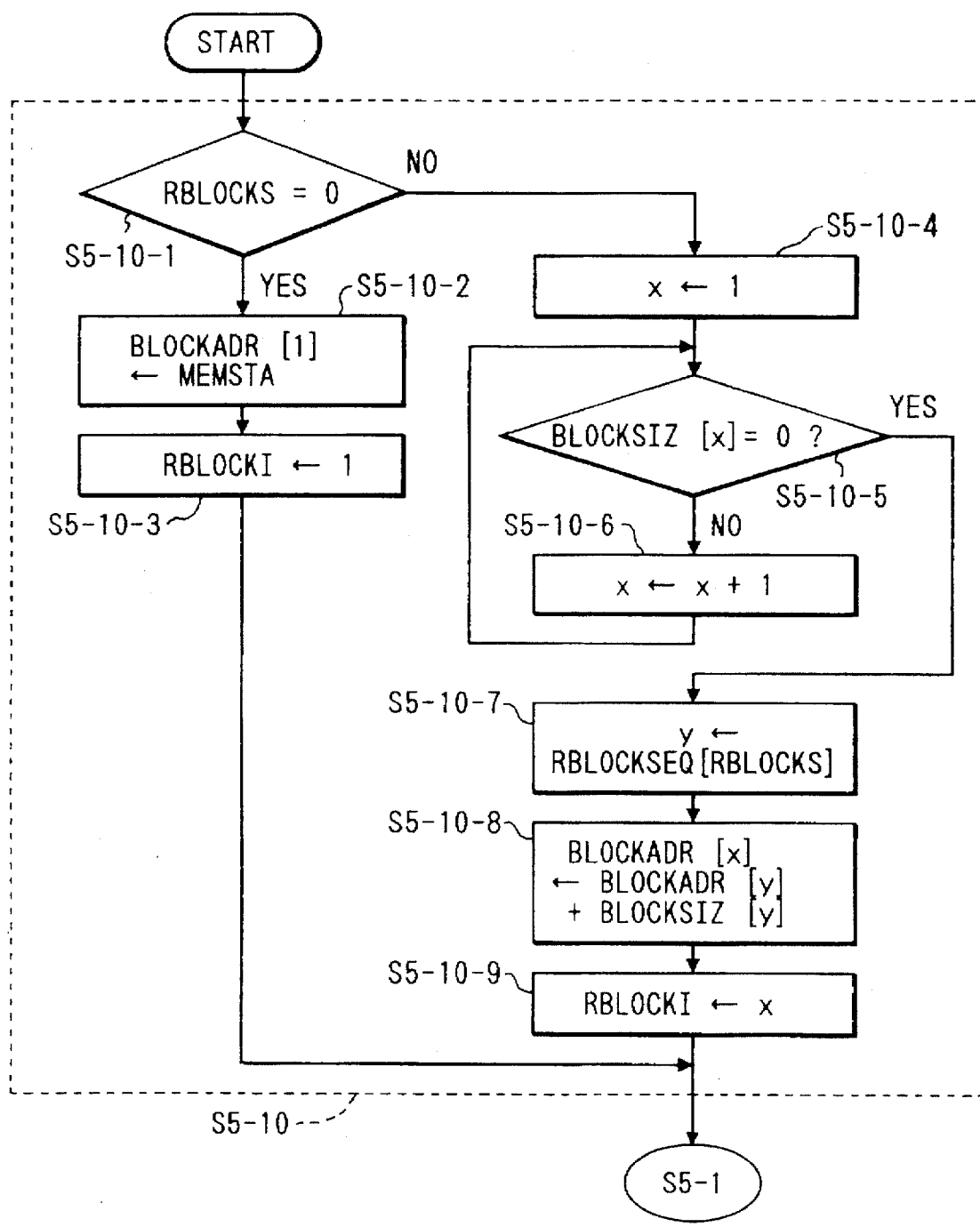
FIG. 53 is a flow chart of the control sequence in a step S5-10 for index setting for next block in FIG.49.

FIG. 53 is a flow chart of the control sequence of a next block index setting step S5-10 shown in FIG. 49.

Said step S5-10 sets a block index RBLOCKI to be given to a data block to be received next from the computer, in preparation for the reception step S3 to be conducted in the future. At first a step S5-10-1 discriminates whether the number RBLOCKS of currently registered blocks is "0", and the sequence proceeds to a step S5-10-2 or S5-10-4 respectively if said discrimination turns out affirmative or negative. In case no data block is currently registered, a step S5-10-2 sets the start address MEMSTA of the reception buffer as the start address BLOCKADR [1] for the data block of block index "1", in order to assign a default value "1" to the block index of a data block to be received and registered first, as in the aforementioned initializing step S1. Then a step S5-10-3 stores "1" as the block index RBLOCKI to be given to the data block to be received next. On the other hand, if the step S5-10-1 identifies presence of certain registered data blocks, the control is conducted along the sequence of the next block index setting step S3-9 in the reception operation S3 explained before. At first a step S5-10-4 sets "1" as an initial value for the candidate unused block index x. Then a step S5-10-5 discriminates whether the data block of block index x is already registered, by checking whether the size BLOCKSIZ [x] thereof is "0". If "0", indicating that the data block of block index x is not yet registered, the sequence proceeds to a step S5-10-7. On the other hand, if not "0", indicating that the data block of block index x is already registered, a step S5-10-6 adds "1"to the candidate block index x and the discrimination of the step S5-10-5 is repeated. This procedure always provides the block index x for an unregistered data block, since the aforementioned data block erasing step S5-8 indicates the presence of at least an unused block index. When an unused block index x is found in this manner, a step S5-10-7 reads the content of the RBLOCKS-th area RBLOCKSEQ [RBLOCKS] of the reception order table, in order to obtain the block index y corresponding to the last one in the reception order among certain data blocks currently registered in the reception buffer. Then a step S5-10-8 sets, as the start address BLOCKADR [x] of the unregistered data block of block index x, the sum of the start address BLOCKADR [y] of the last received and registered data block of block index y and the size BLOCKSIZ [y] thereof, namely:

BLOCKADR [x]+BLOCKADR [y]+BLOCKSIZ [y].

Subsequently a step S5-10-9 stores x as the block index RBLOCKI to be given to the data block to be received next. Upon setting of the block index RBLOCKI for the data block to be newly received from the computer in the step S5-10-3 or S5-10-9, the sequence returns to the step S5-1, and the data block erasing operation is repeated unless the total number of registered data blocks is zero.

When the all block selection button 11 is depressed in the aforementioned step S5-2 for awaiting the block index input, the sequence proceeds to a step S5-4 for shifting the block index indicator lamps 18, corresponding to all the currently registered data blocks, from the turned-on state to the flickering state, thereby informing the user that all the registered data blocks are selected for erasure.

Figure 54:
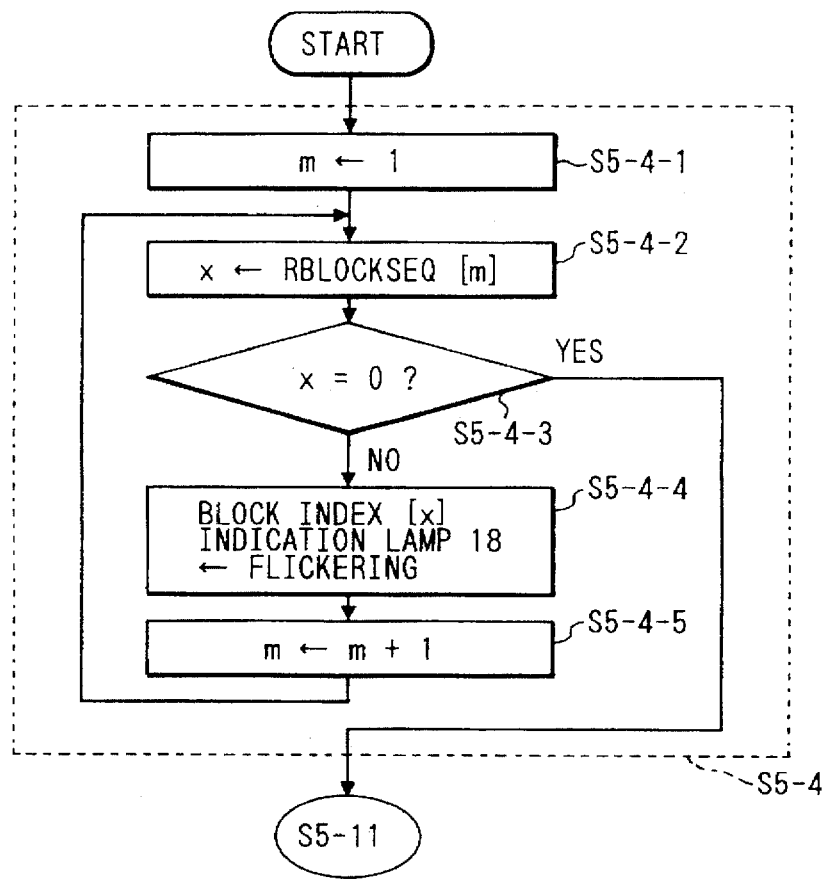
FIG. 54 is a flow chart of the control sequence in a step S5-4 for flickering index indicators 18 for all registered blocks, in FIG. 49.

FIG. 54 is a flow chart of the control sequence of the step S5-4 for flickering of block indicator lamps 18 of all registered blocks, shown in FIG. 49.

A step S5-4-1 sets an initial value "1" in a temporary counter "m" representing the order of reception, and a step S5-4-2 reads the content of an m-th area RBLOCKSEQ [m] of the reception order table (said content being represented as x for the purpose of explanation). Thus the data block of the reception order m has a block index x. A step S5-4-3 discriminates whether the block index x, read in said step S5-4-2 is "0". If not "0", a step S5-4-4 causes the block index indicator lamp 18 corresponding to the block index x to flicker, then a step S5-4-5 adds "1" to the reception order m in order to select a data block positioned next in the order of reception, and the sequence returns to the step S5-4-2. On the other hand, if the step S5-4-3 identifies "0", indicating the end of effective data in the reception order table, the step S5-4 is terminated. After the block index indicator lamps 18 corresponding to all the currently registered data blocks are shifted to the flickering state, the sequence proceeds to a step S5-11.

Figure 55:
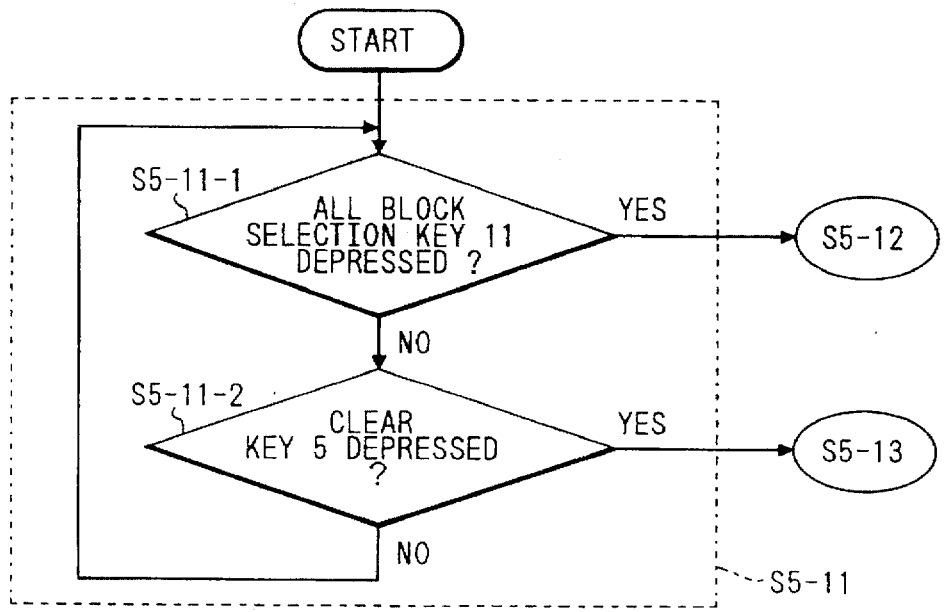
FIG. 55 is a flow chart of the control sequence in a step S5-11 for confirmation of erasure in FIG. 49.

FIG. 55 is a flow chart of the control sequence of the step S5-11 for awaiting erasure confirmation, shown in FIG. 49.

The step S5-11 is a status for awaiting the confirmation for erasure, and continues the waiting state, as shown in FIG. 55, until the all block selection button 11 or the clear button 5 is depressed. If the all block selection button 11 is depressed (step S5-11-1), said depression is regarded as an instruction for cancelling the erasure for all the data blocks, and the sequence proceeds to a step S5-12. If the clear button 5 is depressed (step S5-11-2), this is regarded as an instruction for executing the erasure for all the data blocks, and the sequence proceeds to a step S5-13.

Figure 56:
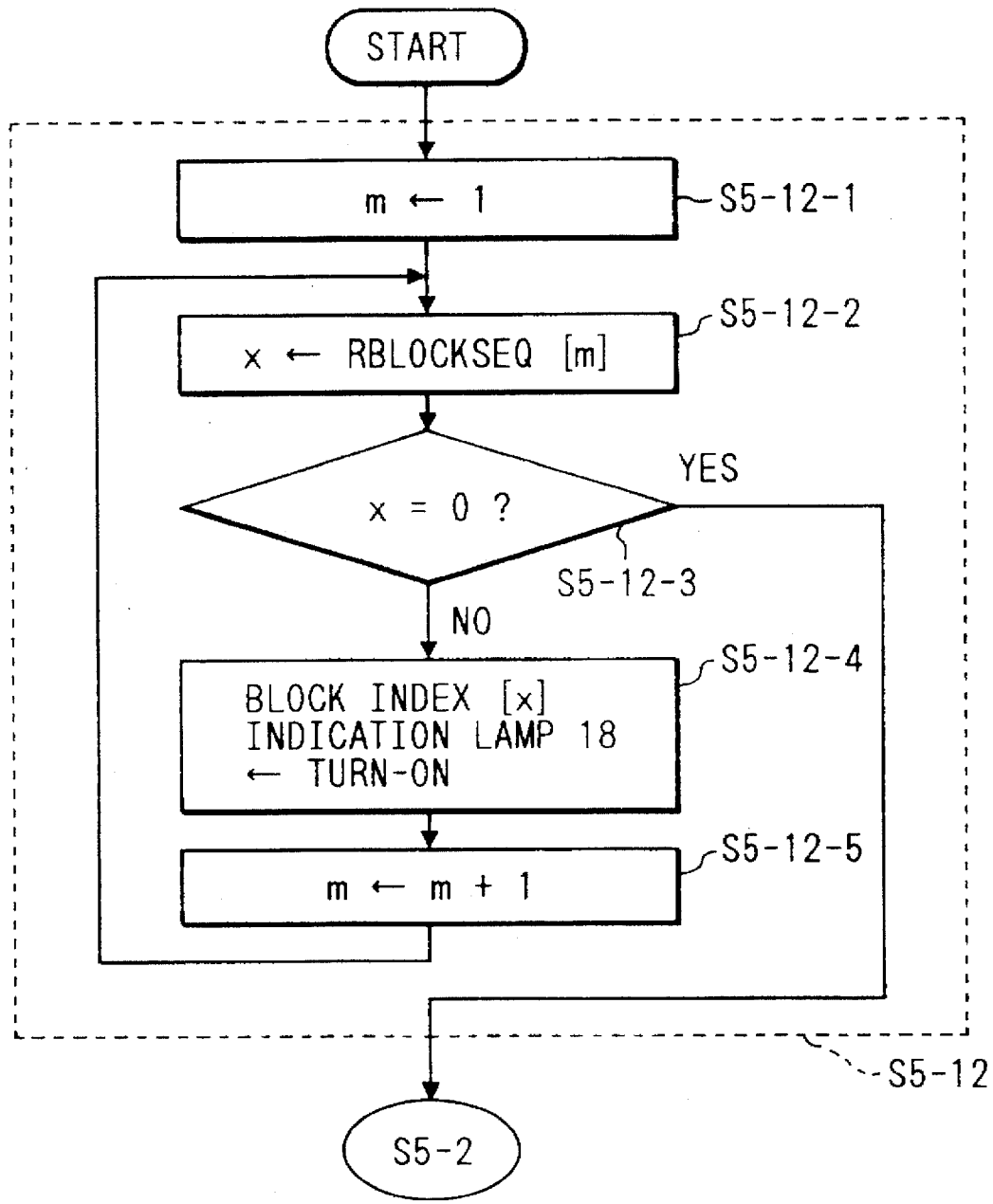
FIG. 56 is a flow chart of the control sequence in a step S5-12 for turning on index indicators 18 for all registered blocks, in FIG. 49.

FIG. 56 is a flow chart of the control sequence of a step S5-12 for turning on the block index indicator lamps 18 for all the registered blocks.

The step S5-12 turns on the flickering block index indicator lamps 18 corresponding to all the currently registered data blocks, thereby informing the user that no data block is selected for erasure. The flow of this step is basically same as that of the aforementioned step S5-4 for flickering of the block index indicator lamps for all the registered data blocks, and is conducted by setting an initial value "1" as the reception order m (step S5-12-1), reading the block index x corresponding to the data block of reception order m (step S5-12-2), discriminating whether said block index x is "0" (step S5-12-3), then, if not "0", turning on the flickering block index indicator lamp 18 corresponding to the block index x (step S5-12-4), adding "1" to the reception order m (step S5-12-5) and shifting the sequence again to the step S5-12-2. On the other hand, if the discrimination of the step S5-12-3 turns out "0", the step S5-12 is terminated. After the block index indicator lamps 18 are again turned on corresponding to all the currently registered data blocks in this manner, the sequence returns to the step S5-2 for awaiting the input of block index.

In case the clear button 5 is depressed in the step S5-11 for awaiting the input for confirmation of erasure, the sequence proceeds to a step S5-13 for erasing all the currently registered data blocks.

Figure 57:
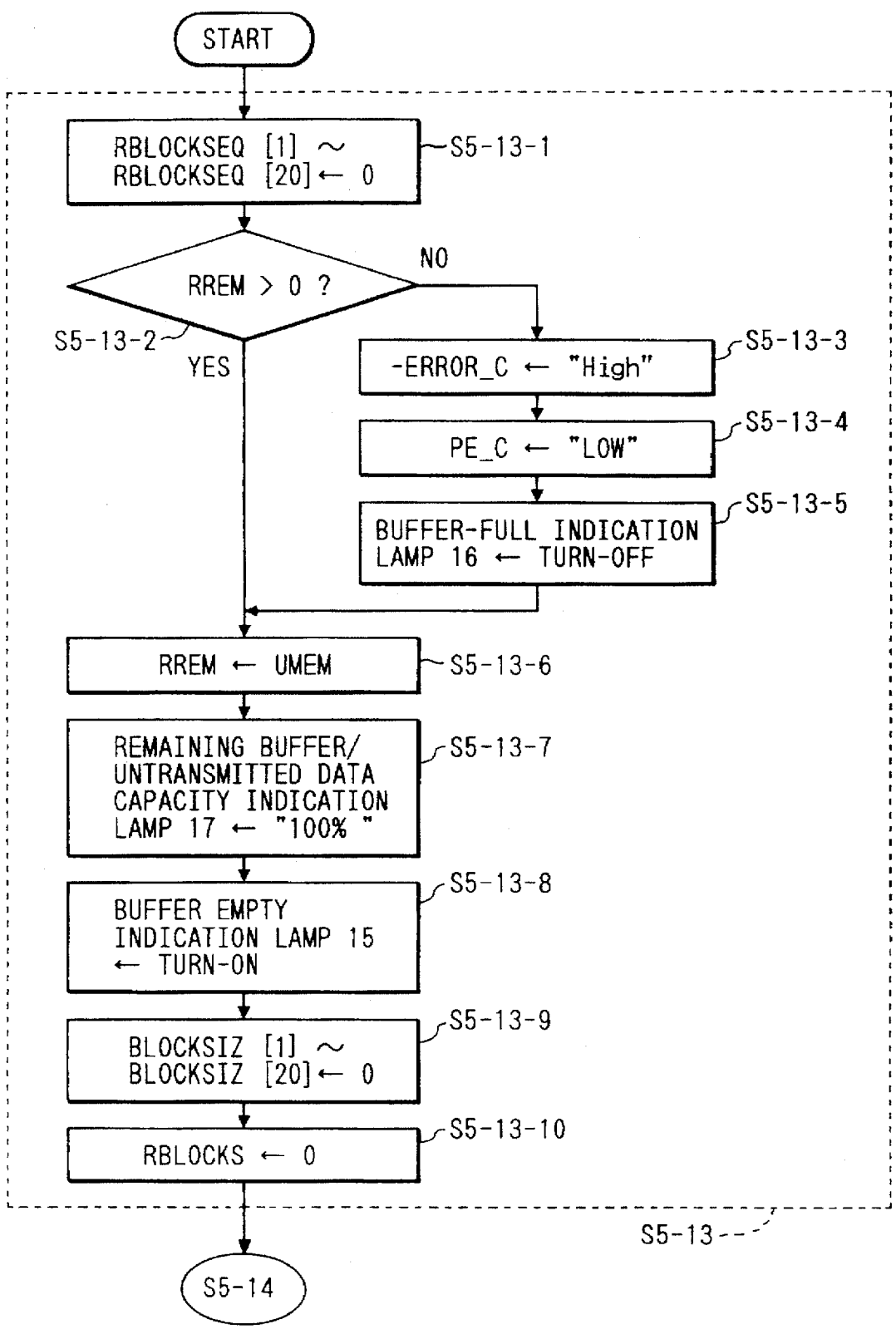
FIG. 57 is a flow chart of the control sequence in a step S5-13 for all data block erasure in FIG. 49.
Figure 58:
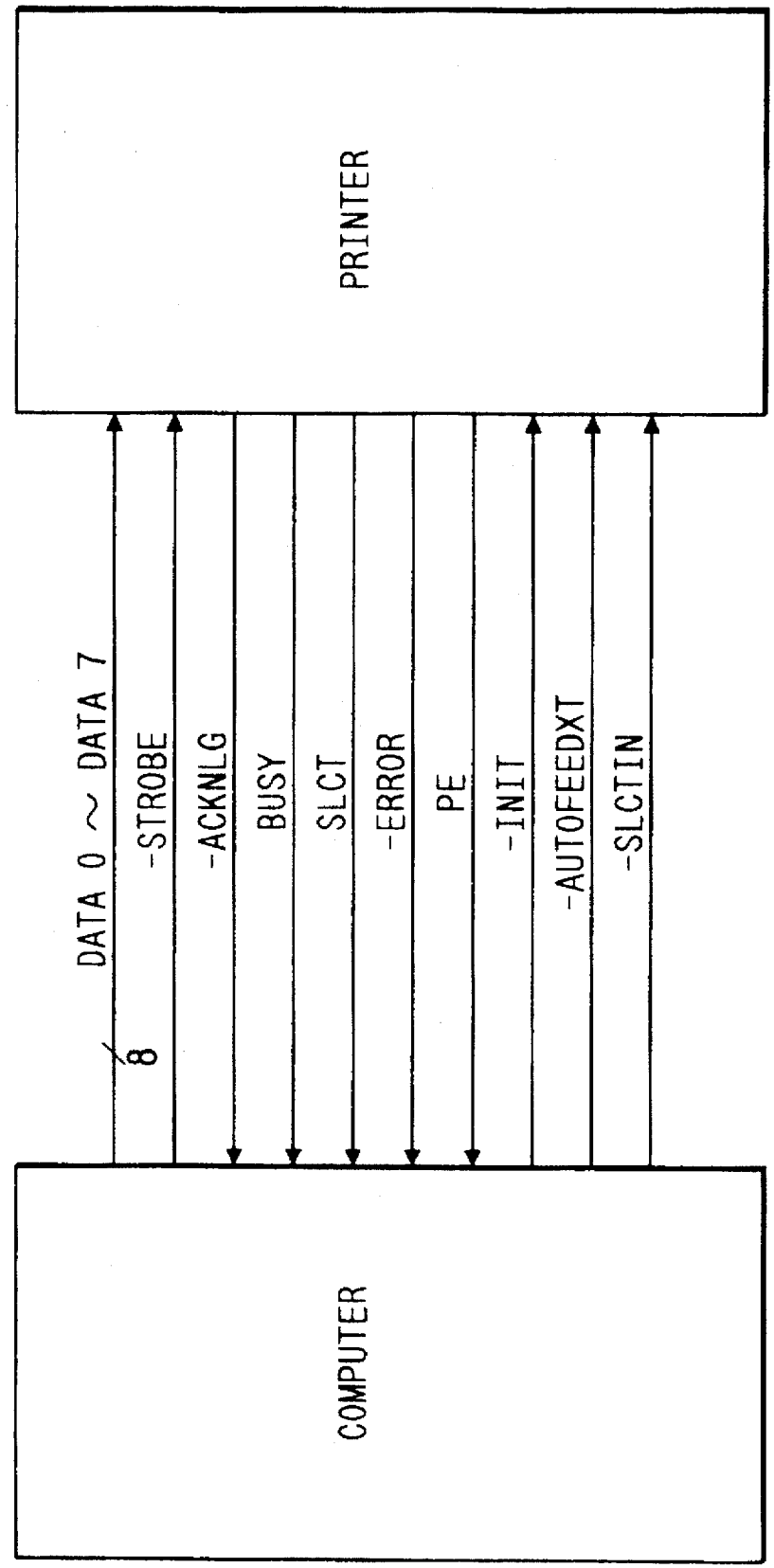
FIG. 58 is a schematic view of signal lines for data transfer between an ordinary computer and an ordinary printer.
Figure 59:
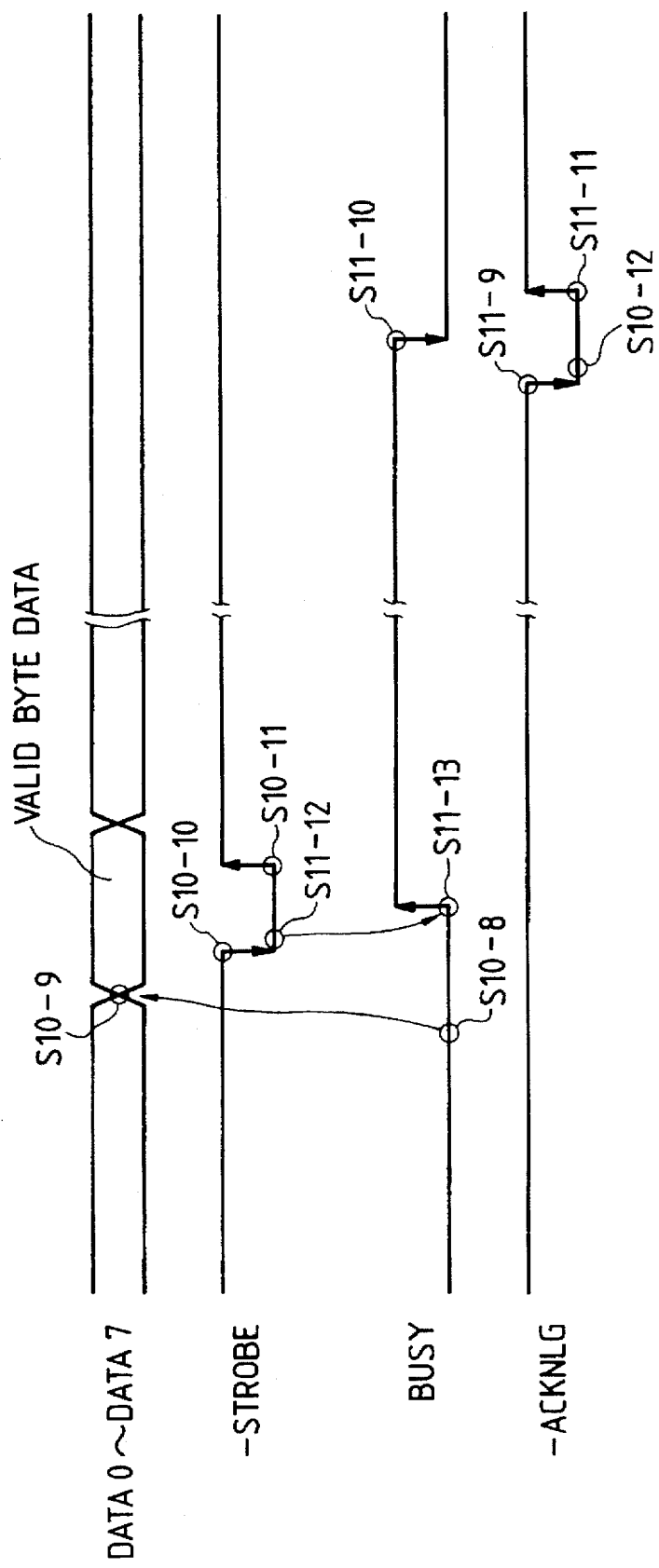
FIG. 59 is a timing chart of data transfer in principal signal lines between ordinary computer and printer.
Figure 60:
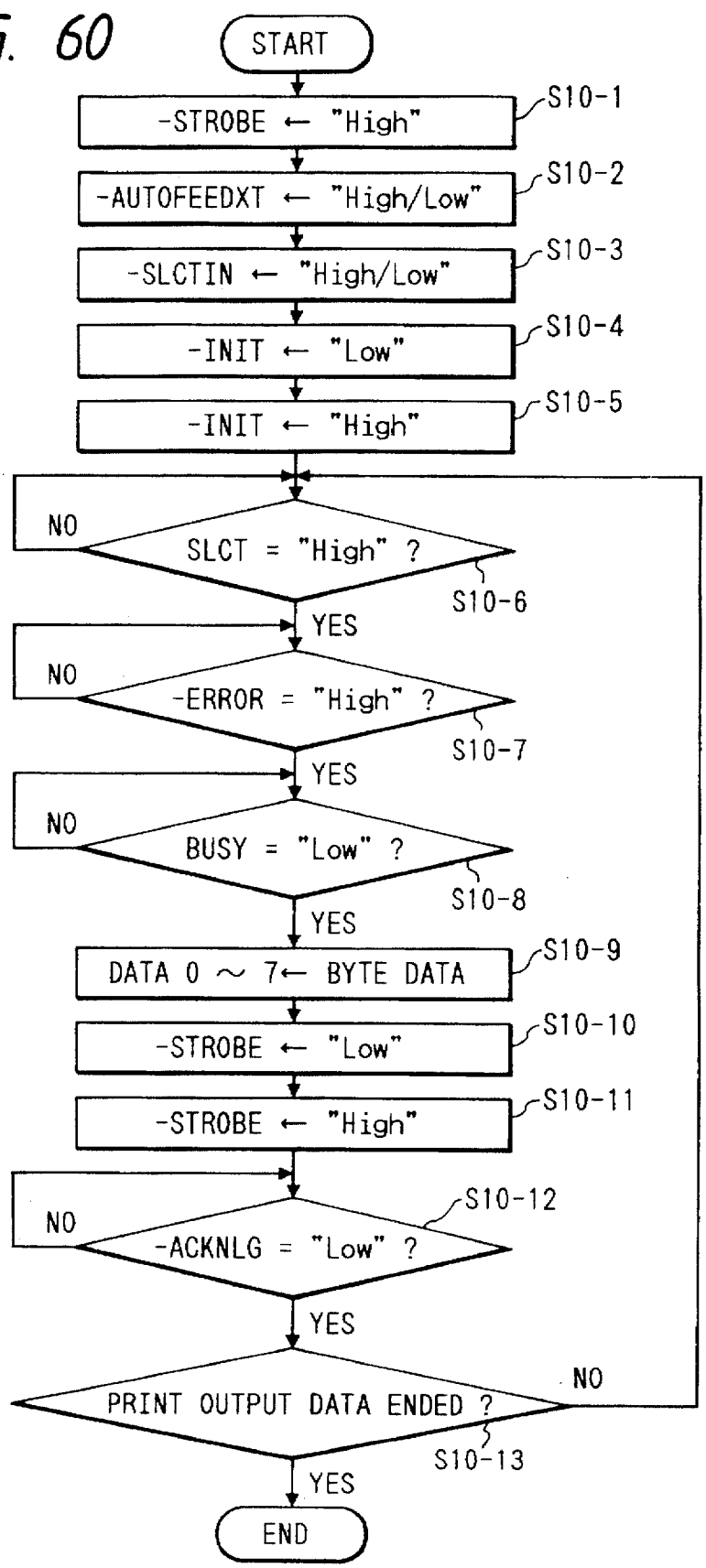
FIG. 60 is a flowchart of transmission of output print data from a computer, for data transfer between ordinary computer and printer.
Figure 61B:
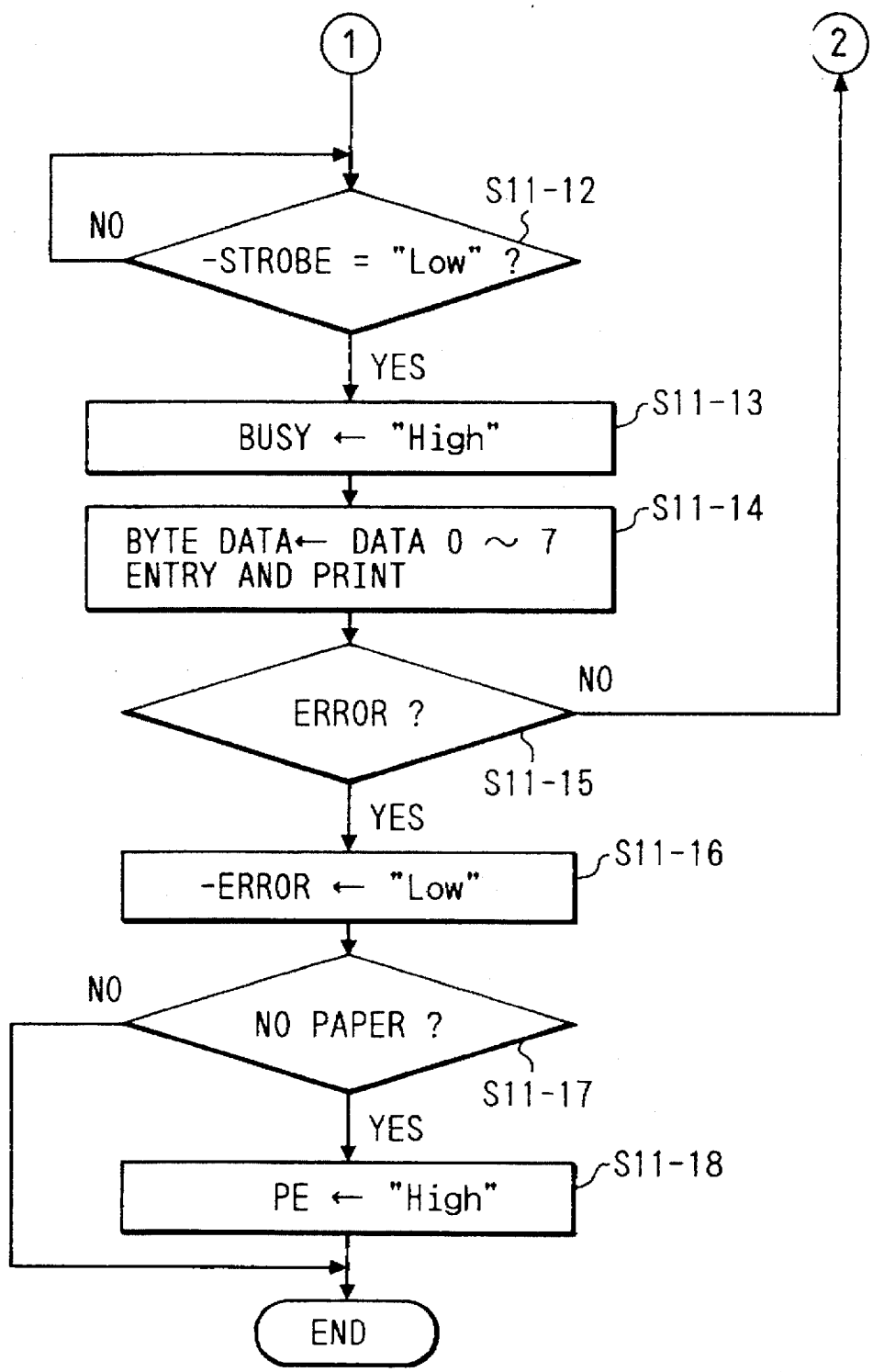
Figure 62:
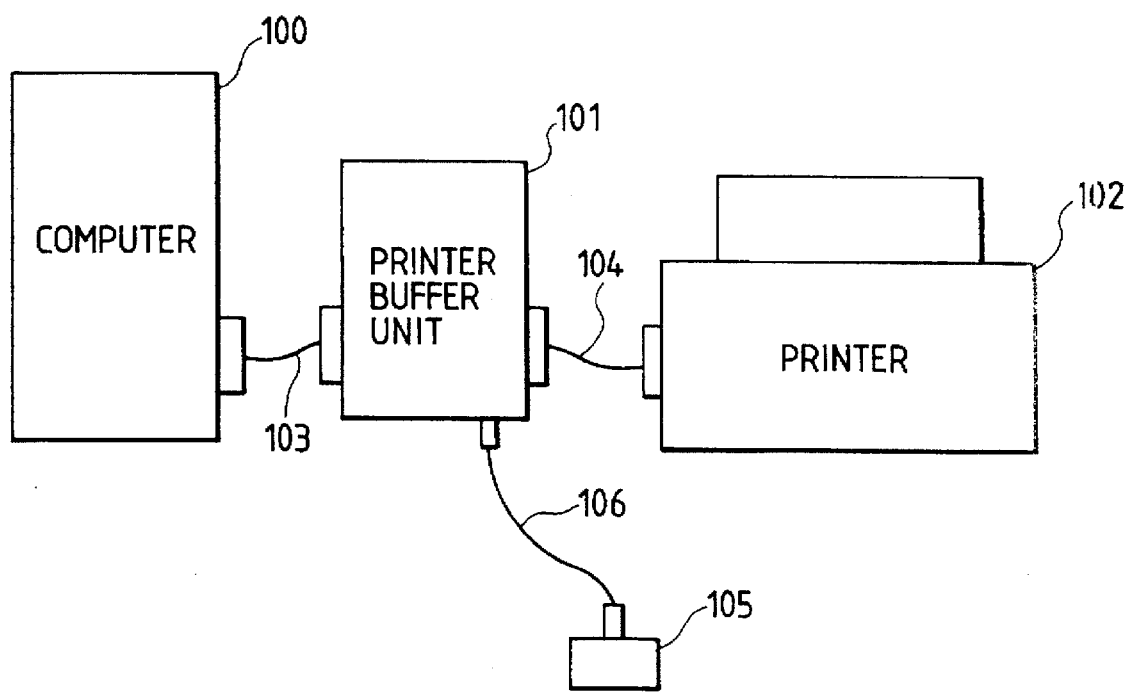
FIG. 62 is a view showing the mode of use of a conventional printer buffer apparatus.
Figure 63:
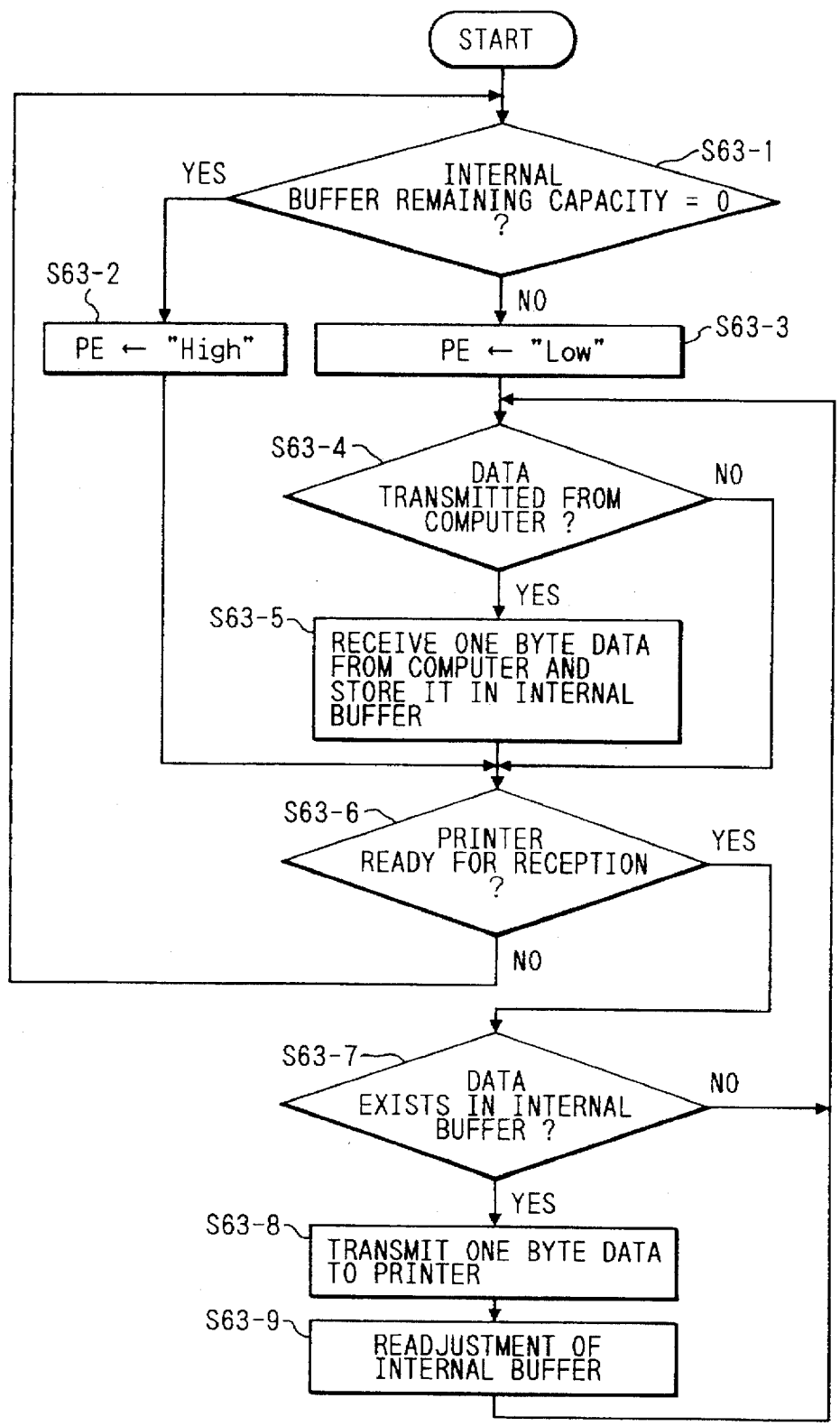
FIG. 63 is a flow chart of transmission and reception of output print data on a conventional printer buffer apparatus.

FIG. 57 is a flow chart of the control sequence of the all data block erasing step S5-13 shown in FIG. 49. At first a step S5-13-1 clears all the areas RBLOCKSEQ [1]–[20] of the reception order table to "0". Then a step S5-13-2 discriminates whether the remaining buffer capacity RREM is larger than "0", in order to identify whether a buffer full status is avoided by this erasing operation. If said capacity is larger than "0", indicating that the buffer is not full even before the erasing operation, the sequence proceeds to a step S5-13-6. If said capacity is "0", indicating that the buffer full status is avoided by the erasing operation, the sequence proceeds to steps S5-13-3 and S5-13-4 for respectively negating the control signal lines -ERROR_C and PE_C, thereby informing the computer that the printer buffer has avoided the "paper empty" state. Then a step S5-13-5 turns off the buffer full indicator lamp 16, thereby informing the user that the buffer full status has been resolved, and the sequence proceeds to a step S5-13-6. Said step S5-13-6 sets the remaining buffer capacity RREM in the buffer empty status as in the initialization, by setting the reception buffer size UMEM therein. A succeeding step S5-13-7 displays a percentage "100%" of the remaining buffer capacity RREM to the reception buffer size UMEM, by the remaining buffer/untransmitted data capacity indicator lamps 17. Then a step S5-13-8 turns on the buffer empty indicator lamp 15, and a step S5-13-9 clears the sizes BLOCKSIZ [1]–[20] of all the data blocks to "0". Then a step S5-13-10 clears the number RBLOCKS of registered blocks to "0", whereby the all data block erasing step S5-13 is terminated and the sequence proceeds to a step S5-14.

The step S5-14 turns off all the block index indicator lamps 18, thereby informing the user of the erasure of all the data blocks, and the sequence then proceeds to the next block index setting step S5-10 explained before.

The step S5-10 sets the block index RBLOCKI to be given to a data block to be received from the computer next, in preparation for the reception step S3 to be conducted in the future. In this case, however, since no data block is currently registered, a default value "1" is set as RBLOCKI as shown in FIG. 53 (step S5-10-3), and the start address MEMSTA of the reception buffer is set as the start address BLOCKADR [1] of the date block of block index "1" (step S5-10-2).

Subsequently the step S5-1 executes discrimination of the number of registered blocks, but, since no data block is currently registered, the selective clearing step S5 is immediately terminated.

The foregoing explanation covers the flow in the selective clearing operation S5 for data blocks.

Also in the foregoing there has been explained the control sequence of the printer buffer constituting an embodiment of the present invention.

(III) The printer buffer of the above-explained embodiment is equipped with an interface to computer, composed of ports 27 to computer and a connector 3 for the ports to computer and having a housing so shaped as to be directly fittable with a printer port connector of the computer; an interface to printer composed of ports 26 to printer and a connector 2 for the ports to printer and having a housing so shaped as to be directly fittable with a computer port connector of the printer; and a power supply unit 21 composed of a battery, whereby said printer buffer can be mounted to the computer for receiving and accumulating the output print data from said computer and can then be re-mounted to the printer for transmitting the accumulated output print data to said printer. It is thus rendered possible to transfer the output print data between mutually distant computer and printer by simple operations. It is also possible to print the outputs of plural computers with one or plural printers, by mounting the printer buffer in succession to said plural computers.

It is also possible to receive the output print data from the computer in the unit of a block, by the use of a reception step S3 and a control parameter table provided in the main memory 33, whereby the process (with blocking) and administration of said data can be easily achieved in arbitrary combination selected by the user.

It is also possible, by the block index indicator lamps 18 and a step S3-5 for flickering of said block index indicator lamps, to confirm the block index corresponding to the data block of the output print data in reception, in arbitrary combination of blocks selected by the user.

It is also possible for the user, by the reception interruption button 7, in-reception indicator lamp 13, a data block reception step S3-7, a step S3-11 for flickering of in-reception indicator lamp 13, an instruction awaiting step S312, and a step S3-13 for turning on in-reception indicator lamp 13, to easily interrupt or re-start the reception of the output print data by the printer buffer at the location of the computer, and to easily confirm that the receiving operation of the printer buffer is currently interrupted.

It is also possible, by an instruction awaiting step S3-12, a received data block erasing step S3-16, a received data block registering step S3-14, a next block index setting step S3-15, a reception interruption button 13, a clear button 5 and a reception start/end button 6, to erase only an unnecessary data block including the output print data currently in reception, without erasing all the output print data accumulated in the main memory 33.

It is also possible, by a start byte receiving step S3-3, a data block receiving step S3-7, a step S3-4 for flickering of in-reception indicator lamp 13, and a buffer full status notifying step S3-9, to receive the output print data from the computer as long as an empty area is available in the main memory 33, regardless of the status of the printer.

It is also possible, by an instruction awaiting step S3-20, a buffer full status notification terminating step S3-23, a received data block erasing step S3-16, a received data block registering step S3-21, a next block index setting step S3-22, a clear button 5 and a reception start/end button 6, to erase only a data block including the output print data that cannot be completely accumulated due to the lack of empty area in the main memory 33, without erasing all the output print data accumulated in said main memory 33.

It is also possible, by block index indicator lamps 18, a received data block registering steps S3-8, S3-14 and S3-21, to effect the reception in blocks in arbitrary combination selected by the user, and to easily confirm the block indexes corresponding to the registered data blocks.

It is also possible, by a step S5 for selective clearing of data blocks, to selectively erase only the currently registered unnecessary data blocks, without erasing all the output print data accumulated in the main memory 33.

It is also possible, by a data block erasing step S5-8, to constantly maximize the consecutive empty area in the main memory for accumulating the output print data from a data transmitting apparatus, thereby efficiently utilizing the main memory without waste.

It is also possible, by block index buttons 10, a step S4-3 for awaiting input for selecting block to be transmitted, a step S4-5 for discriminating block selected for transmission, and a step S4-6 for registering block selected for transmission, to transmit necessary output data, among those accumulated in the reception buffer, in arbitrary selection by the user.

It is also possible, by a transmission order table TBLOCKSEQ, a step S4-3 for awaiting input for selecting block to be transmitted, a step S4-5 for discriminating block selected for transmission, and a step S4-6 for registering block selected for transmission, to transmit necessary output data, among those accumulated in the reception buffer, in an arbitrary order selected by the user.

It is also possible, by block index indicator lamps 18 and a reception start step S4-9, to easily confirm the block index corresponding to a data block in transmission.

It is also possible, by remaining buffer/untransmitted data capacity indicator lamps 17 and a data block transmission step S4-10, to easily confirm the decrease of untransmitted data accumulated in the reception buffer, and to estimate the time required for the transmission of all the output data selected by the user for transmission.

It is also possible, by a transmission interruption button 9, an instruction awaiting step S4-13 after interruption of transmission, and a re-transmission preparation step S4-14, to transmit necessary output data, among the accumulated output data, to a data receiving apparatus by any number of times by the selection of the user.

It is furthermore possible, by a transmission interruption button 9, a clear button 5, a transmission start/end button 8, a control parameter table provided in the main memory 33, a data block transmission step S4-10, an input awaiting step S4-15 after interruption of transmission, and a block skipping step S4-16 after interruption of transmission, to terminate the transmission of only an unnecessary data block including the output data currently in transmission and to start the transmission of output data to be transmitted next, without terminating all the transmitting operation including the remaining untransmitted output data.

The present invention is not limited to the foregoing embodiment, but can be realized in various embodiments. Consequently the modifications and variations within the scope and spirit of the appended claims belong to the present invention.

What is claimed is:

1. A portable data buffer apparatus comprising:

reception means for receiving data transmitted from a separate data transmitting apparatus;

transmission means for transmitting data to a separate data receiving apparatus;

accumulation means for accumulating data;

means for, in response to a manual instruction operation by an operator, inhibiting transmission of data by said transmission means while enabling reception of data by said reception means;

means for, in response to a different manual instruction operation by an operator, inhibiting reception of data by said reception means while enabling transmission of data by said transmission means;

manually-actuated reception interrupting means connected to said reception means for interrupting a reception of data in accordance with a first control procedure of said apparatus; and manually-actuated reception re-starting means connected to said reception means for re-starting the interrupted reception in accordance with a second control procedure of said apparatus.

2. An apparatus according to claim 1, further comprising means connected to said reception means for displaying, when the reception is interrupted, that the reception is in an interrupted state.

3. An apparatus according to claim 1, further comprising:

a first connector directly fittable with a connector of the data transmitting apparatus and adapted to receive data from the data transmitting apparatus when fitted with the connector of the data transmitting apparatus; and a second connector directly fittable with a connector of the data receiving apparatus to transmit data to the data receiving apparatus when fitted with the connector of the data receiving apparatus.

4. A portable data buffer apparatus comprising:

reception means for receiving data transmitted from a separate data transmitting apparatus;

transmission means for transmitting data to a separate data receiving apparatus;

accumulation means for accumulating data, means for, in response to a manual instruction operation by an operator, inhibiting transmission of data by said transmission means while enabling reception of data by said reception means; and means for, in response to a different manual instruction operation by an operator, inhibiting reception of data by said reception means while enabling transmission of data by said transmission means.

5. An apparatus according to claim 4, wherein data from the data transmitting apparatus is formatted into predetermined units and is transmitted in said predetermined units, said apparatus further comprising means for assigning identification data for identifying each said unit of data respectively.

6. An apparatus according to claim 5, further comprising means for displaying said identification data corresponding to a unit including data under reception.

7. An apparatus according to claim 4, wherein the data accumulated in said accumulating means are maintained by pack-up with a battery.

8. A data buffer apparatus according to claim 4, comprising:

manually-actuated transmission interruption means for interrupting a transmitting operation of the data in accordance with a first control procedure of said apparatus; and manually-actuated transmission re-start means for re-starting the interrupted transmitting operation in accordance with a second control procedure of said apparatus.

9. An apparatus according to claim 8, further comprising display means for displaying that the transmitting operation is in an interrupted state when the transmitting operation is interrupted.

10. An apparatus according to claim 8, further comprising:

a first connector directly fittable with a connector of the data transmitting apparatus and adapted to receive data from the data transmitting apparatus when fitted with the connector of the data transmitting apparatus; and a second connector directly fittable with a connector of the data receiving apparatus to transmit data to the data receiving apparatus when fitted with the connector of the data receiving apparatus.

* * * * *

UNITED STATES PATENT AND TRADEMARK OFFICE
CERTIFICATE OF CORRECTION

PATENT NO. : 5,729,708
DATED : March 17, 1998
INVENTOR(S) : MAKOTO SATOH, ET AL.

It is certified that error appears in the above-identified patent and that said Letters Patent is hereby corrected as shown below:

COLUMN 3

Line 13, "step S63-2" should read --step S63-3--.

COLUMN 6

Line 15, "state STATE" should read --STATE--.

COLUMN 10

Line 64, "$0 \geq TBLOCKS \geq RBLOCKS \geq 20.$"
should read --$0 \leq TBLOCKS \leq RBLOCKS \leq 20.$--.

COLUMN 12

Line 10, "[N+1]=0." should read --[N+1]=0,--;
Line 32, "IN[+2]=TBLOCKSEQ"
should read --[N+2]=TBLOCKSEQ--; and
Line 67, "ports" (first occurrence)
should read --ports 27--.

COLUMN 15

Line 17, "Percent" should read --Percentage--.

COLUMN 16

Line 58, "BLOCKADR[x]←BLOCKADR[i]←BLOCKSIZ[i]." should
read --BLOCKADR[x]←BLOCKADR[i]+BLOCKSIZ[i].--.

UNITED STATES PATENT AND TRADEMARK OFFICE
CERTIFICATE OF CORRECTION

PATENT NO. : 5,729,708

DATED : March 17, 1998

INVENTOR(S) : MAKOTO SATOH, ET AL.

It is certified that error appears in the above-identified patent and that said Letters Patent is hereby corrected as shown below:

COLUMN 22

Line 52, "step 54-7-5" should read --step S4-7-5--.

COLUMN 24

Line 3, "SELECT P" should read --SELECT_P--.

COLUMN 28

Line 51, "m+1<n<RBLOCKS." should read
--m+1$\leq$n$\leq$RBLOCKS.--

COLUMN 31

Line 20, "BLOCKADR[x]+BLOCKADR[y]+BLOCKSIZ[y]." should read --BLOCKADR[x]$\leftarrow$BLOCKADR[y]+BLOCKSIZ[y].--.

COLUMN 33

Line 47, "S312," should read --S3-12,--.

COLUMN 35

Line 43, "data," should read --data;--.

UNITED STATES PATENT AND TRADEMARK OFFICE
CERTIFICATE OF CORRECTION

PATENT NO. : 5,729,708
DATED : March 17, 1998
INVENTOR(S) : MAKOTO SATOH, ET AL.

Page 3 of 3

It is certified that error appears in the above-identified patent and that said Letters Patent is hereby corrected as shown below:

<u>COLUMN 36</u>

Line 18, "pack-up" should read --back-up--.

Signed and Sealed this

Twenty-second Day of December, 1998

Attest:

BRUCE LEHMAN

Attesting Officer   Commissioner of Patents and Trademarks